United States Patent [19]

Ticcioni et al.

[11] Patent Number: 5,351,199

[45] Date of Patent: Sep. 27, 1994

[54] PROGRAMMABLE WATER TREATMENT CONTROLLER FOR PROGRESSIVE FLOW SYSTEMS

[75] Inventors: James E. Ticcioni, Mequon; Robert W. Colburn, Green Bay, both of Wis.

[73] Assignee: Brun Corporation, Milwaukee, Wis.

[21] Appl. No.: 721,180

[22] Filed: Jun. 26, 1991

Related U.S. Application Data

[63] Continuation-in-part of Ser. No. 371,546, Jun. 26, 1989, Pat. No. 5,060,167.

[51] Int. Cl.⁵ .............................................. G06F 15/20
[52] U.S. Cl. .................................... 364/510; 364/500
[58] Field of Search ............... 364/509, 510, 562, 565, 364/551.01, 500; 210/143, 141, 190; 134/10, 18, 26; 137/624.11

[56] References Cited

U.S. PATENT DOCUMENTS

| | | | |
|---|---|---|---|
| 4,300,909 | 11/1981 | Kromhansl | 364/500 |
| 4,396,435 | 8/1983 | West et al. | 134/10 |
| 4,897,797 | 1/1990 | Frgo, Jr. et al. | 364/500 |
| 4,969,991 | 11/1990 | Valadez | 210/143 |
| 5,000,858 | 3/1991 | Manning et al. | 210/143 |
| 5,058,032 | 11/1991 | Farrell et al. | 364/510 |
| 5,060,167 | 10/1991 | Ticeioni et al. | 364/509 |
| 5,068,038 | 11/1991 | Fischer et al. | 210/143 |
| 5,069,779 | 12/1991 | Brown et al. | 210/143 |

OTHER PUBLICATIONS

Miyajima et al.; "A Knowledge-Based Water Purification Control System"; IEEE Int. Workshop on AI for Industrial Applications 1988.

Primary Examiner—Ellis B. Ramirez
Attorney, Agent, or Firm—Christie, Parker & Hale

[57] ABSTRACT

The Electronic Programmable Water Treatment Controller provides an integrated initiator and sequencer for controlling regeneration of water softening and filtering systems. The controller or associated external device(s) initiates the regeneration sequence or, in the alternative, an alarm based on a programmable prediction time, total volume through the water treatment device or combinations of the foregoing. The sequence of regeneration is controlled in response to selected parameters programmable by the user for valve actuation and timing. Multiple water treatment systems may be controlled in alternating, parallel, or progressive control schemes through communication between controllers, attached to each system, which employ the present invention.

8 Claims, 13 Drawing Sheets

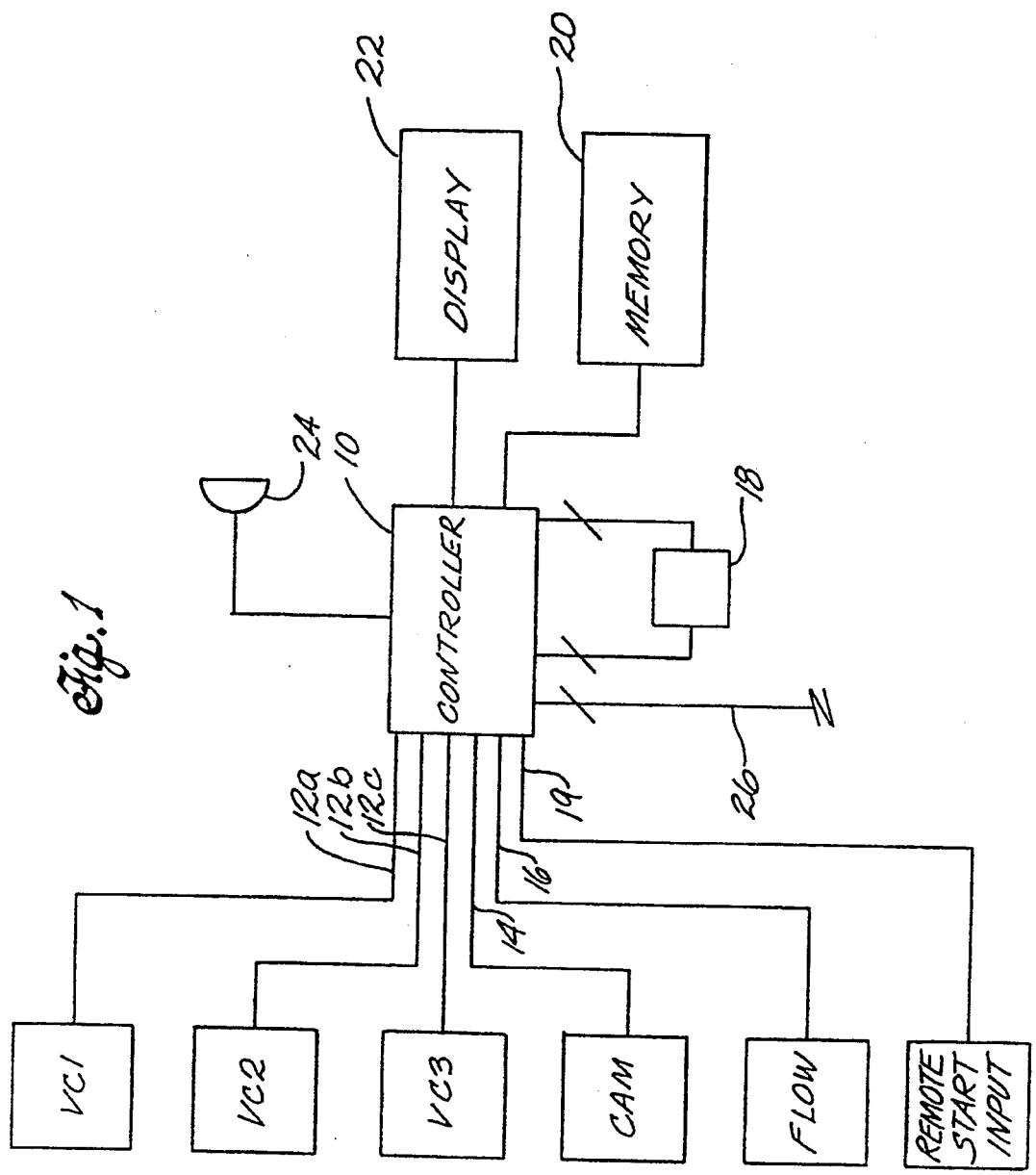

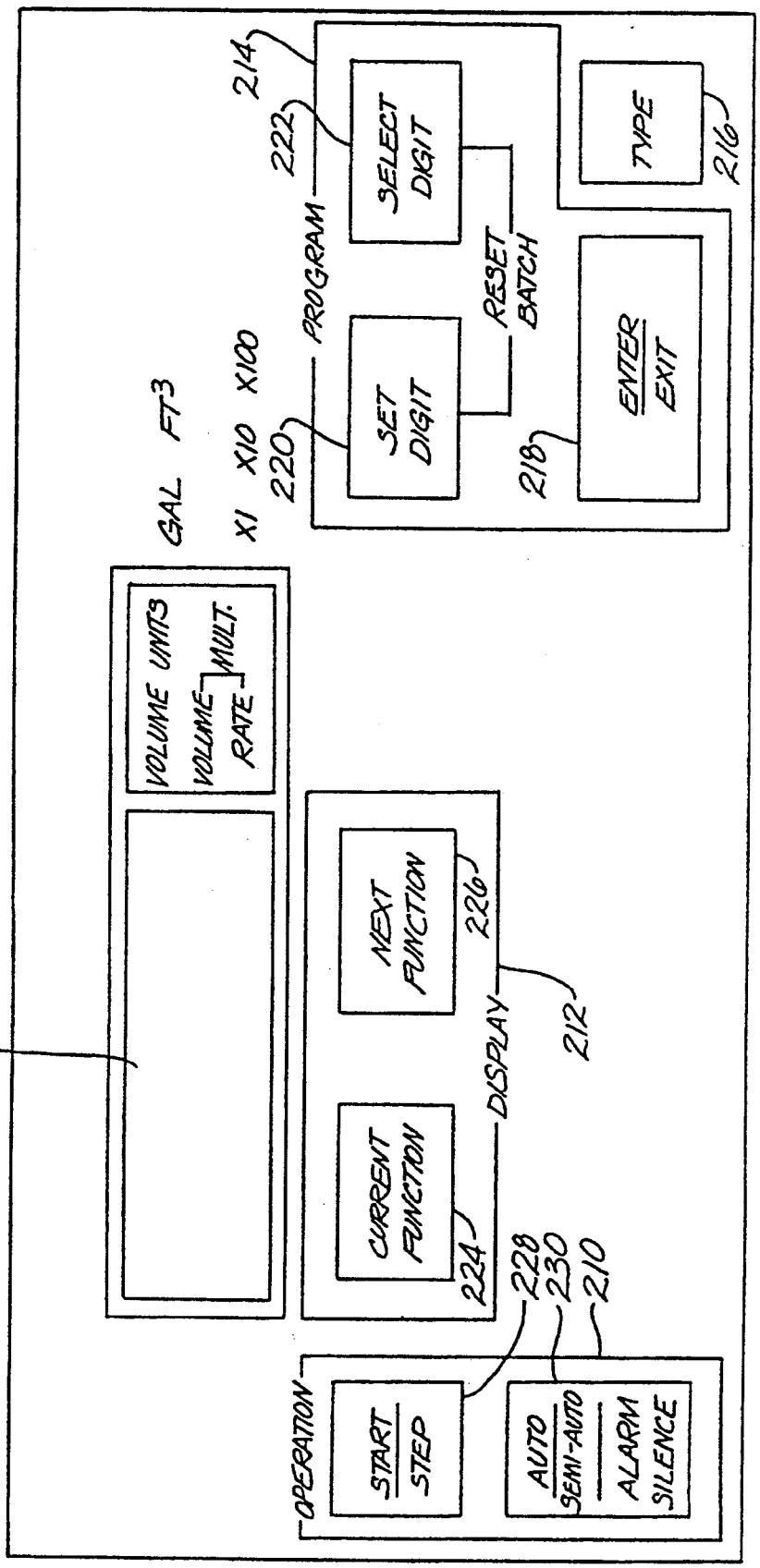

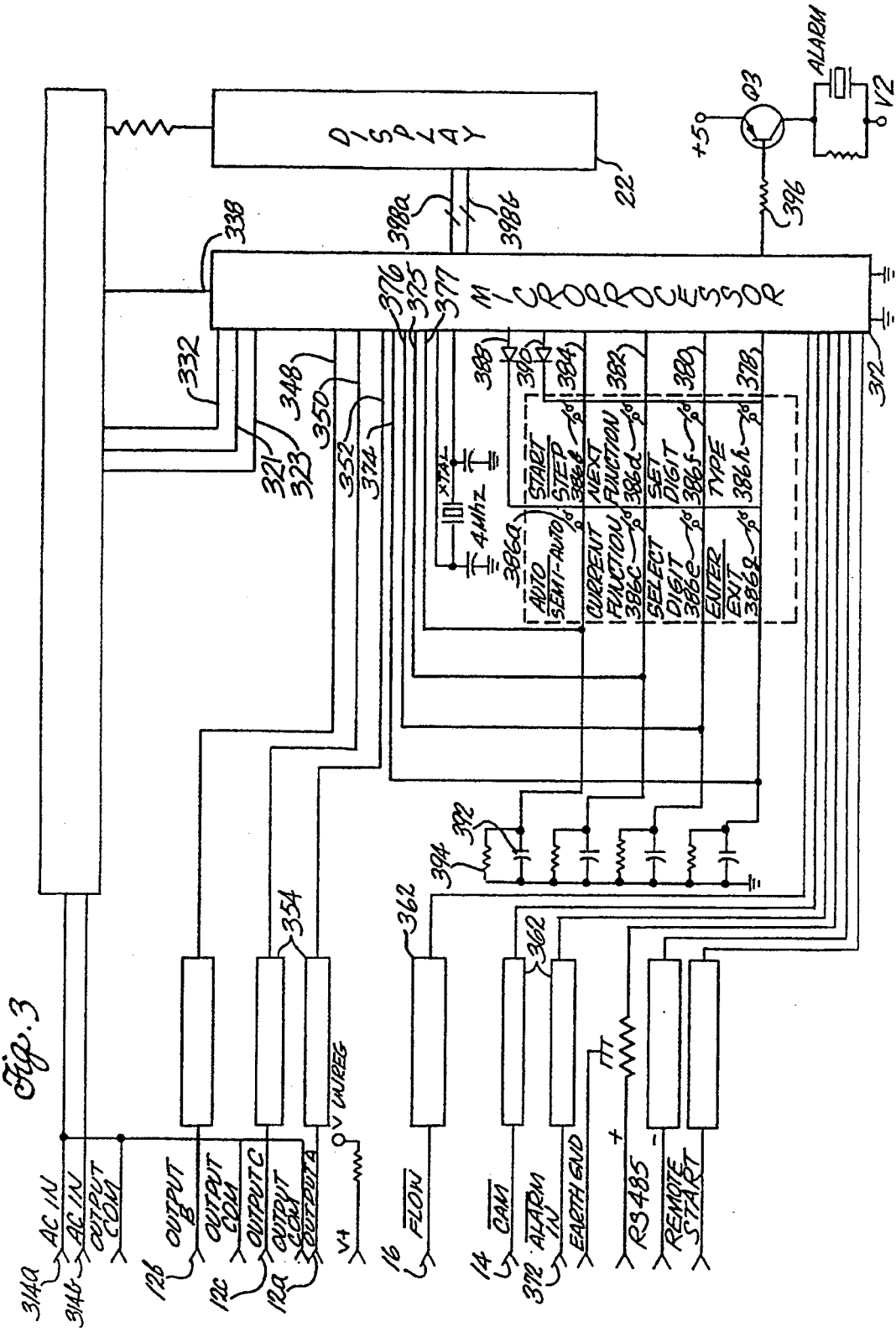

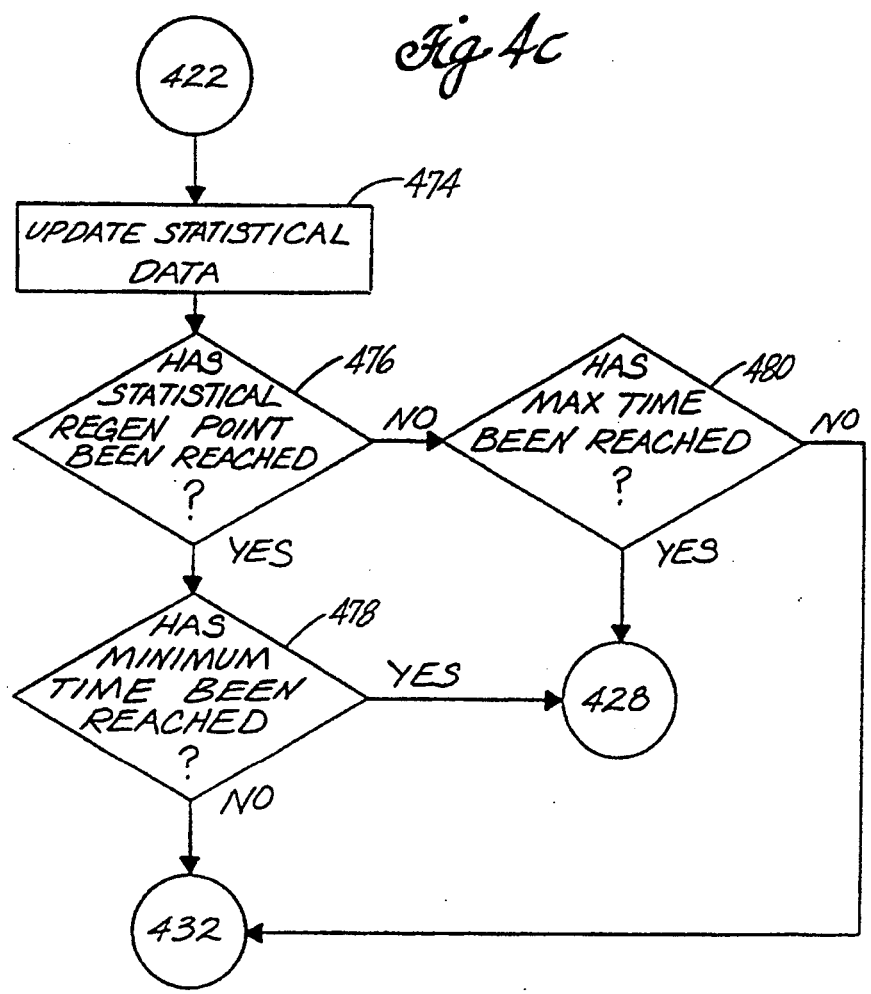

TYPICAL PARALLEL FLOW

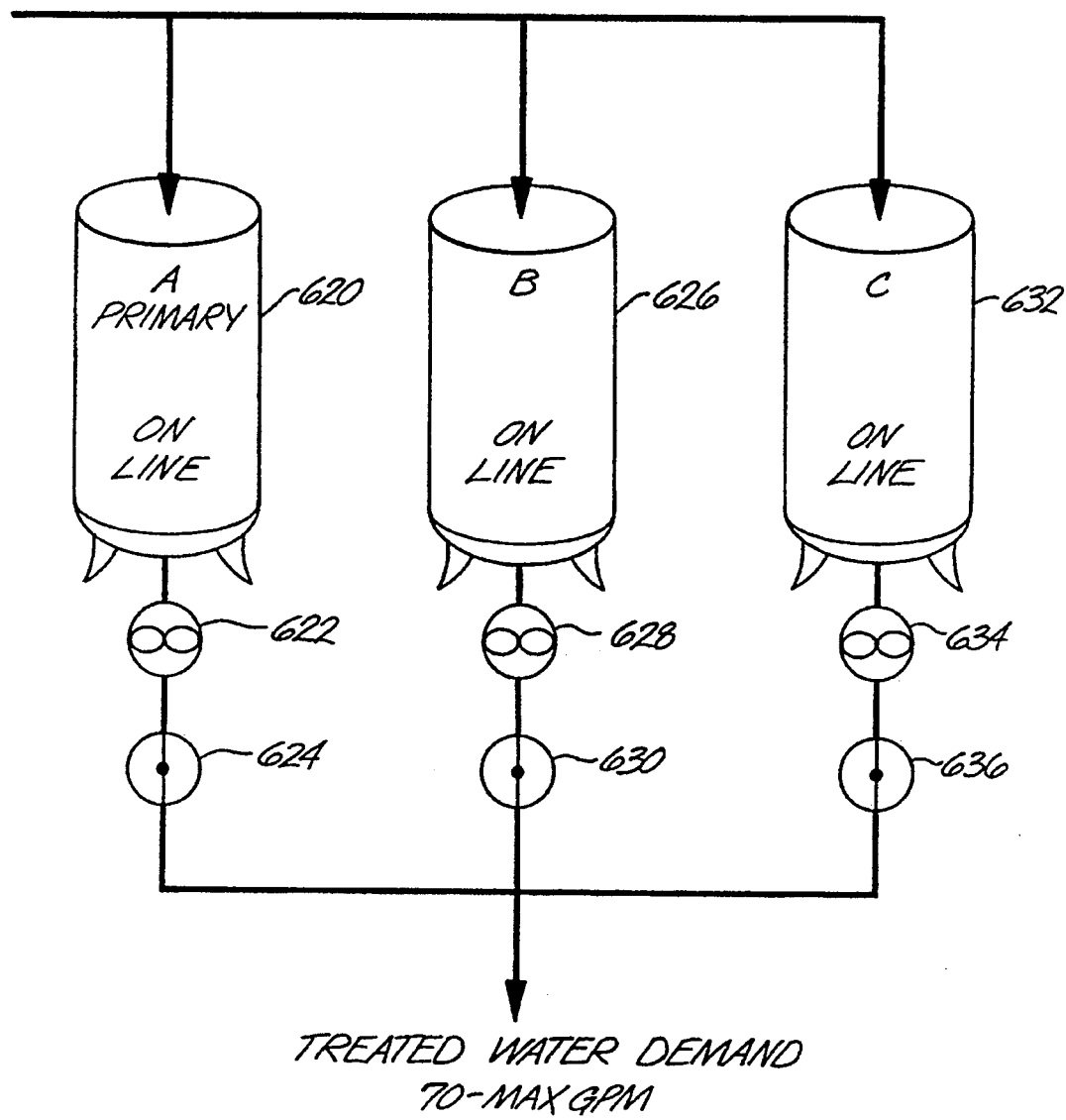

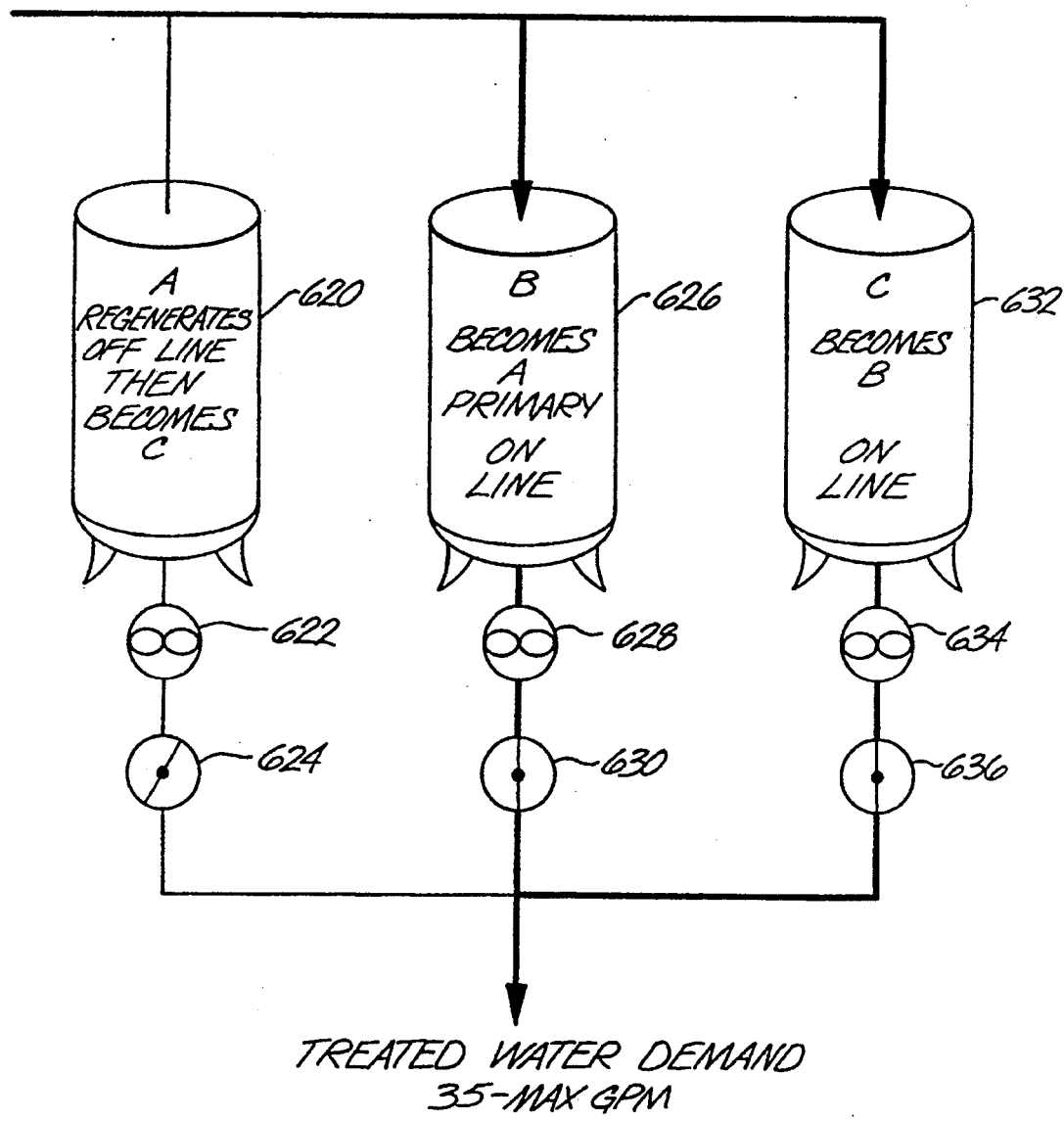

PROGRAMMABLE WATER TREATMENT CONTROLLER FOR PROGRESSIVE FLOW SYSTEMS

CROSS-REFERENCE TO RELATED APPLICATION

This application is a continuation-in-part of prior U.S. patent application Ser. No. 07/371,546 filed on Jun. 26, 1989 now U.S. Pat. No. 5,060,167, wherein a system for a new and superior programmable water treatment controller is described.

BACKGROUND OF THE INVENTION

1. Field of the Invention

The present invention relates generally to controllers for water softening and filtering systems. In particular, the invention provides a controller for initiating an alarm or regeneration sequence based on a programmable prediction time, total flow through the water treatment device, or combinations thereof, and controlling the sequence of regeneration in response to selected parameters for valve actuation and timing. The invention further provides the capability for integrating multiple water treatment systems for alternating, parallel or progressive water flow through each of the respective systems.

2. Prior Art

Water treatment systems for softening or filtration of hard water typically require regeneration after the treatment of a quantity of water. Apparatus and methods for the softening of water for residential or commercial applications use are exemplified by U.S. Pat. Nos. 3,815,747; 3,960,721; 4,298,468; 4,239,621; and 4,421,652.

In typical water softening systems, hard mineral ions are removed from the water by passing the hard water through a cation exchange resin. These resins are typically in granular form and remove the hard mineral ions and replace them with other cations, typically sodium.

After treatment of a large enough volume of hard water, the resins become exhausted. The resin may be regenerated by passing a sodium chloride solution or brine through the resin. Steps to loosen the resin, typically known as back-washing, and rinsing of the brine from the resin are additional steps taken in the regeneration cycle. Multiple back-washing steps, rinsing steps, and flushing steps may be performed in an optimized cycle to regenerate the resin.

Control of a prior art regeneration system was typically accomplished first through the use of an initiator which monitored time or total flow of hard water through the system and generated a signal upon reaching a preset limit. The signal from the initiator was received by a separate sequencer which mechanically or electrically activated valving to accomplish the regeneration sequence. A lack of compatibility between initiators and sequencers produced by different manufacturers has often prevented consumers from optimizing regeneration of water softening systems to meet individual needs. Further, use of multiple water softening units in alternate configurations where one unit produces soft water while the other unit is in regeneration or on standby, parallel operation where multiple water treatment units are operated in parallel, but undergo regeneration at different times, or progressive operation where multiple water treatment units are available and placed on line only as demand requires and individually regenerating when off line, has not been possible due to lack of a controller capable of coordination of multiple systems.

SUMMARY OF THE INVENTION

The present invention overcomes the shortcomings in the prior art by integrating an initiator and sequencer in a single control unit. Further, the invention provides for communication between control units for coordinated operation of multiple water treatment systems. The invention provides a plurality of valve control signal outputs, one of which controls the service valve allowing treated water to pass through the system. A first status input receives a valve position signal which allows comparison of the actual condition of regeneration valving with the control outputs from the invention. Rate of flow for water from the water treatment system is received by the invention on a flow rate input for calculation of current and total flow through the water treatment system. An input means is provided for selection of the operational type of the invention, interrogation of the status or manual control of the operation of the water treatment system. In the present embodiment, the input means comprises an input keypad for input of control parameters for the regeneration sequence as well as interrogation of the controller status, control parameters, and manual operation of the water treatment system regeneration. A memory is provided for storage of control parameters received from the input means. A display unit is employed for alpha numeric display of the status during normal operation, an alarm indication during abnormal operation, and display of mode programing step or regeneration step responsive to signals from the input means. An audible alarm, which may be selectably delayed or silenced, augments the display unit for notification of abnormal conditions.

A plurality of timing means programmable through the input means are connected to the valve control signal output means for activation thereof. An additional timing means programmable through the input means, and a means for calculating the total flow selectably initiate a regeneration cycle, thereby initiating the plurality of timers. Means for communication between two or more controllers, including means for recognizing a master/slave status allows simultaneous coordinated operation of two or more water treatment systems.

DESCRIPTION OF THE DRAWINGS

FIG. 1 is a general block diagram schematic representation of the invention;

FIG. 2 is a pictorial representation of the front panel of the invention;

FIG. 3 is an electrical schematic of a first embodiment of the invention;

FIG. 4c is a supplemental flow diagram for operation of the invention with a statistical prediction technique;

FIG. 9 is a three tank illustration of a progressive flow water treatment system with the water demand at or above twice the programmed flow rate; and, FIG. 10 is a three tank illustration of a progressive flow water treatment system regeneration mode.

DETAILED DESCRIPTION OF THE INVENTION

Figure 4A:
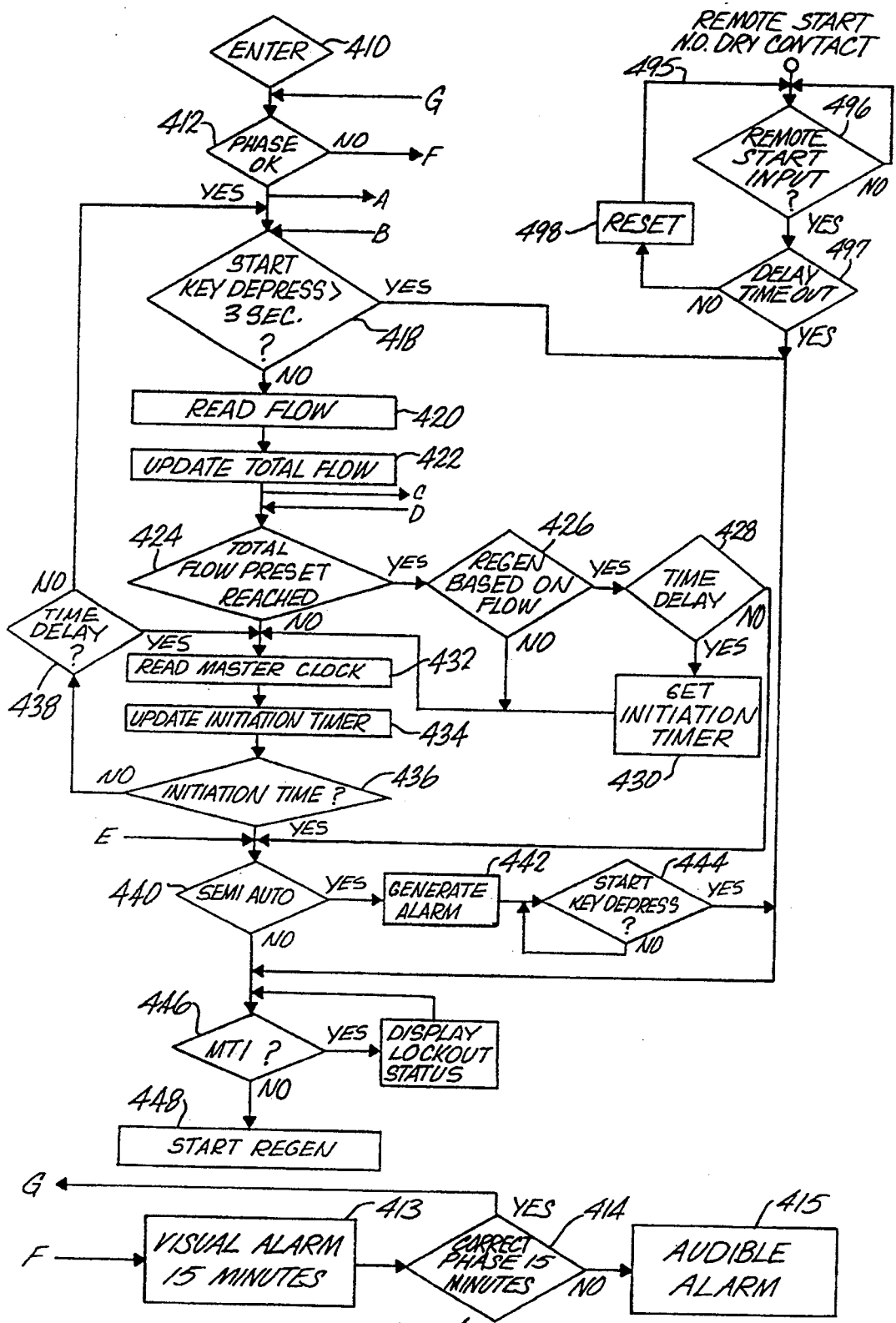
FIG. 4a is a flow diagram of the operation of the invention.

The overall architecture of a present embodiment of the invention is shown in FIG. 1. The controller 10 has three control signal outputs 12a, 12b and 12c. The configuration shown in FIG. 1 connects each of the output signals to a valve controller labeled VC1, VC2 and VC3, respectively. Each of the outputs may provide a high or low (on or off) signal. Those skilled in the art will recognize that two of the output lines in combination may be used for operation of regeneration valve packages requiring multiple signal inputs such as that described in U.S. Pat. No. 3,797,523. For example, the first output could provide an enabling signal when high, with the second output providing a strobe when high to clock a multiple-position valve through various positions. As an alternative, the first and second outputs combined could provide a two-bit decodable signal corresponding to four positions in a multi-position valve controller.

In the embodiment shown, the third output signal is connected to valve controller VC3, which controls position of the service valve on the water treatment system. The service valve in the open position allows water flow from the treatment system for use while the service valve in the closed position precludes use of water from the treatment system. Typically, the service valve is closed during regeneration of the water treatment system to prevent the regeneration brine or water employed in backwash and flush of the system from being drawn into the user's water system. The service valve may also be closed when the treatment capability of the system has been exhausted to prevent drawing of untreated water into the user's system. In multiple-treatment system applications, the service valve will be closed when the particular treatment system controlled by the service valve is not on line or in a standby condition. A status input 14 on the controller receives a position signal from the service valve. Typically, the position signal is obtained through a micro-switch engaged by a cam mechanically connected to the valve. Connection of the cam switch to the status input allows comparison by the controller of the commanded service valve position, based on the actual position of the valve as indicated by the cam switch.

A flow rate input 16 to the controller is connected to a flowmeter in the present embodiment, as will be described in greater detail subsequently. The flowmeter may be one of four types: a hall effect flow transducer, a flow induced sine wave generator, a flow induced square wave generator, or a dry contact flow transducer. Calculation of total volume from the last regeneration and current flow rate is accomplished by the controller.

An input means 18 allows the user to select, set and monitor the various functions of the invention. In the present embodiment, the controller is configured for seven regeneration initiation schemes and for six regeneration sequence schemes for individual water treatment systems or multiple systems operating alternately, in parallel or parallel progressive.

A remote start input 19 allows the start of a regeneration from an external source through an integral delay reset timer which overrides any selected regeneration initiation scheme.

As shown in FIG. 2, a portion of the input means comprises an input keypad having keys grouped by function into an operation group 210, a display group 212, a program group 214, and a type key 216. The operation of these key groups will be described in greater detail subsequently. A memory 20 is connected to the controller to provide storage for user selected parameters input from the key pad.

A display 22 provides readout, in an alphanumeric format, of various information regarding status of the controller. During the input of various control parameters, the display provides prompts for the necessary input followed by display of the parameter in the default condition or as input from the key pad. In the RUN mode, the display provides a readout of the volume remaining for water which may be treated before exhaustion of the system alternating with a current flow rate of the treated stream. If an abnormal condition, as will be described subsequently, is present, the display will show an alarm condition. During regeneration of the water treatment system, the display indicates the particular cycle of regeneration presently active and time remaining in that cycle.

An audible alarm 24 is connected to the controller for activation in conjunction with an alarm condition on the display. The audible alarm is selectably operable immediately upon determination of an alarm condition or after a user selected time delay. In the alternative, the alarm may be silenced.

A multiline communications means 26 is provided for connection of multiple controllers in applications requiring multiple water treatment systems. Communications between the controllers allows coordinated operation of the water treatment systems to avoid interfering regeneration sequences which would deprive the user of treated water.

Details of the structure of the present embodiment are shown in FIG. 3. The primary element of the controller is a microprocessor 312. AC power is provided to the controller on inputs 314a and b. In the present embodiment 24 volt AC power at 47 to 63 Hz provided by a transformer (not shown) from standard line AC received at the AC inputs is provided to a power supply circuit 316 for conversion regulated 24-volt pick off V2, a +5-volt pick off, and an unregulated pick off VUN-REG. A first regulated voltage is provided to the microprocessor on input 321, and a second regulated voltage is provided to the microprocessor on input 323. A master clock circuit provides a real time clock input 338 for the microprocessor. Those skilled in the art will recognize alternative power supply configurations for use in the present invention.

Valve control outputs are provided by the microprocessor on lines 348, 350 and 352. Output buffers 354 convert the output signal of the microprocessor to a 24-volt signal off pick off V2 for operation of the valve controllers.

Inputs to the microprocessor are received through input buffers 362. Input signals to the controller are asserted by drawing down the respective input line as designated by signals FLOW BAR and CAM BAR for the flow input and valve position input respectively. In the embodiment shown, an additional input 372 is provided as a supplementary system status signal. As an example, an external alarm designating a condition such as low brine level in the water treatment system represented by ALARM BAR IN for evaluation by the microprocessor in overall system control.

In the present embodiment the keyboard portion of the input means employs a matrix decoding scheme from four strap outputs 374, 376, 375, and 377 from the microprocessor to four return inputs 378, 380, 382 and 384 to the microprocessor. The individual keys on the keyboard 386a through 386h releasably connect strap outputs 388 and 390 to the four return inputs 378, 380, 382 and 384. The signals resulting from keystrokes are maintained by capacitors 392 for a read cycle time on returns and are bled to ground through resistors 394.

As shown in FIG. 2 the key pad is arranged to group keys with similar functions. The program key group includes an enter/exit key 218 which toggles the controller between the two operating modes RUN or PROGRAM. In the PROGRAM mode a prompt is momentarily visible on the display followed by a numeric display with at least one digit flashing or a flashing word display. The flashing word or digit is altered using the set digit key 220. Selection of the next digit for alteration is accomplished by depressing the select digit key 222. If the prompt was not seen, the current function key 224 may be depressed to momentarily recall the prompt to the display. Selection of the next programming step is accomplished by depressing the next function 226 which then causes a momentary display of the prompt for the next programming step followed by the flashing word or numerical value with flashing digits.

With the controller in the RUN mode, depressing the START/STEP key 228 will initiate a regeneration sequence. In addition, an external dry contact closure applied to the remote start input 19 will initiate an adjustable reset off delay timer. Closures exceeding the delay time will also start a regeneration sequence. Closures shorter than the delay time will reset the delay timer. Steps in the regeneration sequence to be described in greater detail subsequently may be terminated prior to programmed completion by depressing the START/STEP key. The START/STEP key must remain depressed for three seconds to initiate or step through the regeneration sequence. The second key in the operation group is the AUTO/SEMI-AUTO and ALARM SILENCE key 230. Depressing this key for three seconds toggles the controller between AUTOMATIC mode in which the controller initiates and accomplishes regeneration automatically, or SEMI-AUTOMATIC mode in which the controller calculates all functions of RUN sequence but generates an alarm condition notifying the operator of the requirement for regeneration as opposed to automatically initiating regeneration. The regeneration sequence is then accomplished manually by depressing the START/STEP key. Key 230 also allows silencing of the audible alarm when activated by momentarily depressing the key. The extended depression time required in the operation group keys avoids inadvertent initiation of a regeneration sequence or toggling of the controller into the SEMI-AUTOMATIC mode.

Continuing the description of details in the embodiment shown in FIG. 3, the communications means between controllers comprises two wire RS485 interface in the embodiment shown in the drawings. Those skilled in the art will recognize that communications may be accomplished using other standard techniques such as a four-wire serial interface having a ground connection, a buffered serial clock, a serial output, and a buffered serial input. The remote start input of FIG. 1 is also provided through an input buffer to the microprocessor.

In an alarm condition as will be described subsequently, the microprocessor provides an output through resistor 396 to bias transistor Q3 to activate an alarm horn, 397. As previously described, the microprocessor may be programmed to inhibit activation of the alarm horn.

In the present embodiment of the invention the alphanumeric display 22 is a 16 segment vacuum fluorescent display providing 8 digits with alpha and numeric capability. The microprocessor communicates with the display through a plurality of control lines 398a for digit selection and a second plurality of control lines 398b for segment activation. Alternative display techniques may be employed.

The microprocessor in the preferred embodiment provides a plurality of timers keyed to the master clock for cycle timing during the regeneration sequence. Six timers are employed to provide three alternating cycle times for output A and output B respectively. One or more additional initiation timers are employed in several capacities to initiate the regeneration sequence. Selection of the regeneration sequence may be based on a specific timed cycle such as a specific time in each selected period (1 minute to 99 days), a specific time on a specific day in each weekly period and so on, depending on size and flow rate in the water treatment system being controlled.

As previously described, the microprocessor receives flow rate information for calculation of current flow rate and total flow. A preset total flow value may be employed to initiate the regeneration sequence and the initiation timer may be employed to delay initiation of regeneration for a predetermined period of time after reaching the preset total flow condition.

In the present embodiment, implementation of the timers and flow calculation is accomplished through software control of registers in the microprocessor or equivalent virtual registers in the memory. Operation of the microprocessor in controlling the various functions previously described is best understood with reference to FIG. 4. Programming of the individual attributes in the operation of the system will be described subsequently.

Upon power up the controller is reset as previously described and enters the run mode at box 410. The microprocessor polls the CAM input to determine the service valve position. This is designated a phase comparison as shown in box 412. If the CAM signal indicates the service valve is closed, output C will energize, thus commanding the service valve to close and a visual alarm will be energized as shown in block 413. Outputs A and B will simultaneously energize to correct the out of phase condition until the CAM input is satisfied or a 15 minute period of time has lapsed as shown in block 414, after which an audible alarm will be generated as shown in box 415. The microprocessor polls the input means to determine if a multiple water treatment system is present as shown in box 416. Multiple system operation will be discussed subsequently. If the input means indicates a single treatment system, the microprocessor next polls the input means for depression of the START key as shown in box 418. As previously described, depression of the START key initiates a regeneration sequence. If the START key has not been depressed, the microprocessor reads the flow rate on input 16 as shown in box 420. The microprocessor updates the total flow since reset as shown in box 422 in the present embodiment the microprocessor outputs to the display the flow rate at 10 second intervals, alternating with the treatable water volume remaining based on a preset capacity of the treatment system less the total volume treated. The microprocessor then determines if the preset total volume indicating exhaustion of the treatment system has been reached as shown in box 424. If total volume has been reached, the microprocessor determines if regeneration is to be commanded based on total volume or a preset time as shown in box 426. If regeneration is based on total volume, the microprocessor then determines if a time delay after reaching total volume has been imposed as shown in box 428. If a time delay has been specified by the user, the microprocessor then sets the delay value in the initiation timer as shown in box 430. The microprocessor then reads the master clock as shown in box 432 and updates (decrements) the initiation timer as shown in box 434.

If regeneration is to be initiated on a timed basis as opposed to total volume, the microprocessor would pass directly from block 424 to block 432 and a preset value would exist in the initiation timer which would be decremented on the master clock cycle by the microprocessor. Based on the initiation timer as shown in block 436, the microprocessor will continue flow monitoring and time update or begin the regeneration sequence. If timing is in process on a time delay as shown in block 438, the microprocessor will cycle the clock until time out.

After the microprocessor determines that regeneration is required by total volume with or without time delay or timed initiation, the microprocessor will determine if the SEMIAUTO switch has been depressed as shown in block 440. If the switch has been depressed placing the system in semiauto mode, the microprocessor will generate an alarm as shown in block 442. The microprocessor will then monitor for depression of the START key as shown in block 444. If the system is not in the semiautomatic mode, the microprocessor will poll the communications means to determine if the multiple tank interlock (MTI) is set as shown in block 446 which will be described in greater detail subsequently. If the MTI is not set, a regeneration will be initiated as shown in block 448.

Figure 5:
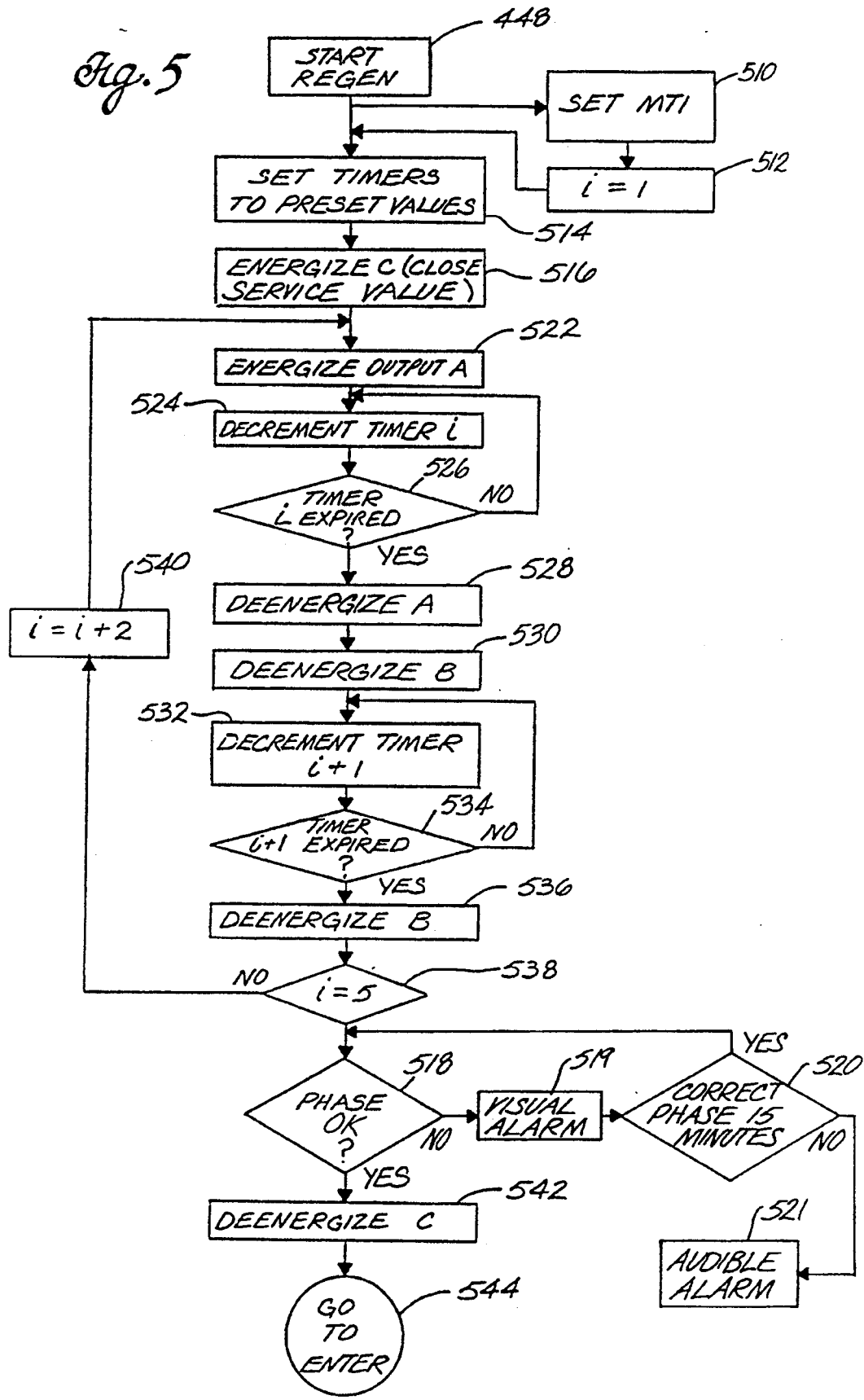
FIG. 5 is a flow diagram of the regeneration control sequence of the invention.

The regeneration sequence is shown in FIG. 5. Once a regeneration has been initiated, the microprocessor will set the MTI as shown in block 510. In the embodiment shown in FIG. 5, a counter, i, is set to one as shown in block 512. The microprocessor then sets the six timers of the present embodiment to the preset values selected by the user as shown in block 514. The service valve is then closed by energizing output C as shown in block 516. Output A is then energized as shown in block 522. The first timer is decremented by the microprocessor as shown in block 524. The microprocessor continues to decrement the first timer in response to the master clock as indicated by block 526 until the timer has expired. Output A is then deenergized as shown in block 528 and output B is energized as shown in block 530. The second timer is then decremented and monitored as shown in blocks 532 and 534 until the second timer has expired at which time output B is deenergized as shown in block 536. If counter i does not equal 5, as shown in block 538, the counter is incremented by 2 as shown in block 540, and blocks 522 through 536 are repeated for timers 3 and 4 and again for timers 5 and 6.

Those skilled in the art will recognize that the quantity of timers and valve control outputs may be modified to accommodate any desired configuration.

Upon completion of the regeneration cycle as determined by the six timers, the microprocessor verifies via the CAM input that the valve control has returned to "home" position thus assuring the electromechanical and electronic element are in phase as shown in block 518. If the valve control fails to "home", a visual alarm is generated as shown in block 519. Outputs A and B will energize simultaneously for 15 minutes to force the valve control home thereby attempting to correct the phase as shown in block 520. Failure to reach home in that time will result in an audible alarm condition as shown in block 521. The microprocessor then deenergizes output C as shown in block 542, reopening the service valve to reenter service as shown in block 544. Those skilled in the art will recognize that additional logic may be required prior to deenergizing output C in block 542 if a multiple system, as will be described subsequently, is present.

Figure 4B:
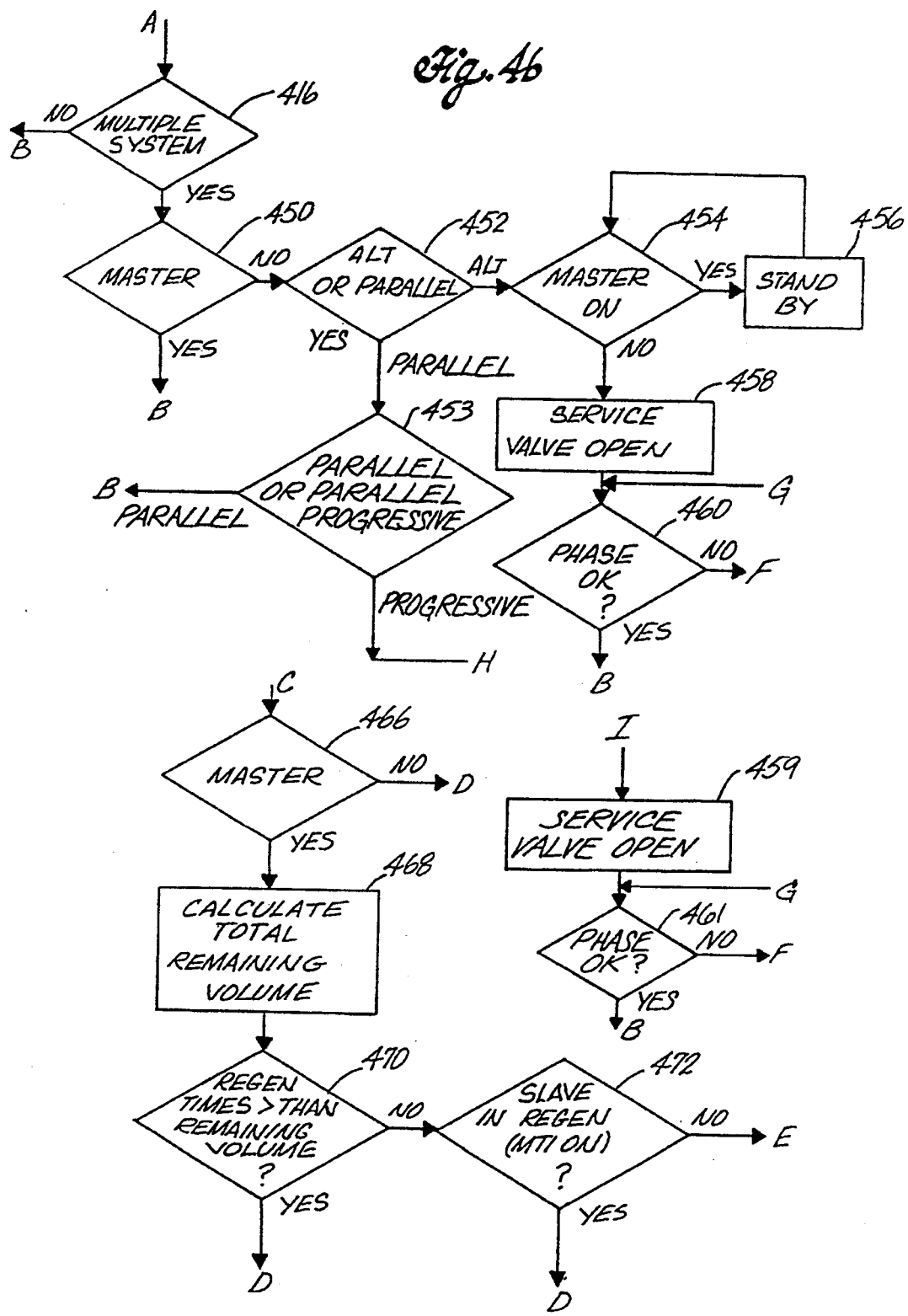
FIG. 4b is a supplemental flow diagram for operation of the invention in multiple water treatment system applications.
Figure 4D:
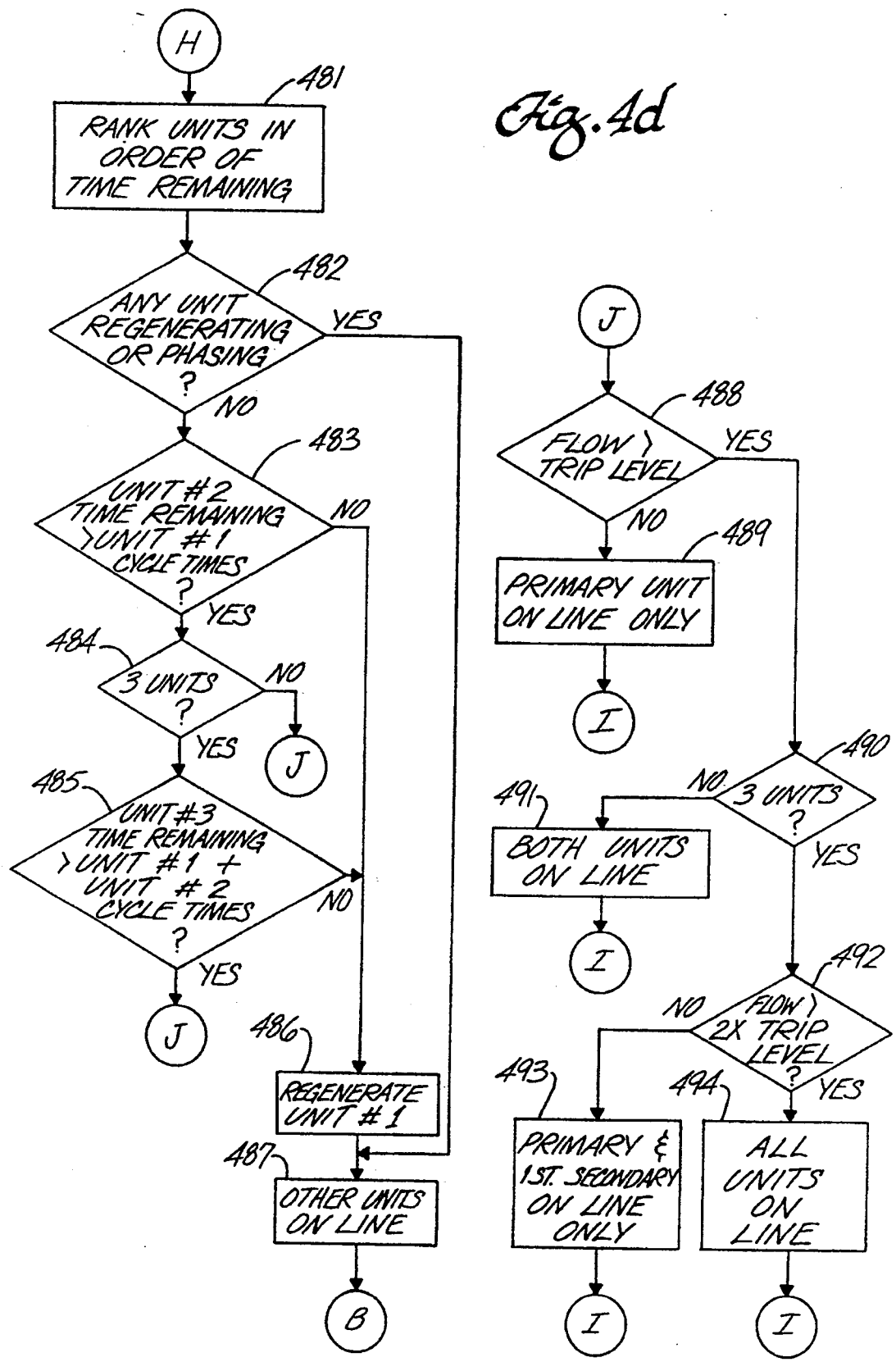
FIG. 4d is a supplemental flow diagram for progressive operation of the invention.

When employed in a multiple treatment system configuration, operation of the microprocessor is shown in FIG. 4b. If polling of the input means in block 416 indicates a multiple treatment system, the microprocessor polls the input means to determine a status as master or slave as shown in block 450. If the controller is in a master configuration, the microprocessor continues at entry point B in FIG. 4a. If the status of the controller is that of a slave, the microprocessor determines the program type as alternate or parallel operation as shown in block 452. If the water treatment systems are operating in parallel, the microprocessor determines if the program type is parallel progressive as shown in block 453. If the water treatment systems are operating in parallel, the microprocessor continues operation at entry point B in FIG. 4a. If the water treatment systems are operating in parallel progressive, the system operates as shown in FIG. 4d which will be described subsequently.

If the systems are operating in an alternate configuration, the microprocessor on the master device polls the communication means to determine if the slave controller is in the flow mode as shown in block 454. The master controller determines the status and then notifies the slave controller. If the master is flowing, the slave controller remains in the standby condition as shown in block 456. If the master is not flowing, the microprocessor on the slave will open the service valve as shown in block 458, verify phase of the valve as shown in block 460 issuing an alarm if phase is improper as shown in block 462, and enter operation at entry point B of FIG. 4a.

Those skilled in the art will recognize that position of the service valve by the controllers of a multiple water treatment system configuration will be determined by the master/slave status at the entry point in block 410 of FIG. 4a. Similarly, a slave controller operating in the standby mode of block 456 will continue monitoring for START key depression for manual regeneration initiation.

In a multiple treatment system configuration, after updating total volume as shown in block 422, the microprocessor will poll for multiple system configuration as shown in block 464 at exit point C of FIG. 4a. If a multiple system is not present, the microprocessor continues operation at entry point D in FIG. 4a. If a multiple system is present, the microprocessor again determines master or slave status as shown in block 466 and if not a master reenters at point D of FIG. 4a. If the micro controller is a master, total remaining volume is calculated as shown in block 468 and a determination of time remaining to regeneration at the present flow rate compared to a regeneration time is made as shown in block 470. This determination avoids depletion of several systems simultaneously thereby staggering regeneration and avoiding the requirement for simultaneous regeneration. If sufficient flow volume remains to continue operation, the microprocessor reenters at entry point D in FIG. 4a. If insufficient time remains, the master microprocessor will poll the communication means to determine if the slave microprocessor is currently undergoing regeneration. If regeneration of the slave is in process, the slave will return on line prior to exhaustion of the master and the master microprocessor reenters at entry point D of FIG. 4a. If the slave is not undergoing regeneration, the master will initiate a regeneration sequence in the controller with the least available "on line" time remaining at entry point E of FIG. 4a.

As an alternative to user preset volumes or times for regeneration initiation, the microprocessor may operate as shown in FIG. 4c. Flow data obtained in block 422 may be employed to update a statistical data base as shown in block 474 for monitoring of water usage on a volume and time basis. Regeneration may then be based on a mathematically calculated prediction factor for exhaustion of the system as demonstrated in block 476. A volume initiation override timer is employed supplementally to start a regeneration even if the preset volume has not been reached as shown in block 478. Such a minimum time period may be established, for example, as a 24 hour block. In the alternative or in addition, a maximum time between regenerations may be established and regeneration initiated based on that maximum time as shown in block 480. Continued monitoring of the initiation timer or initiation of the regeneration sequence is then accomplished by transitioning to blocks 428 or 432, respectively.

Operation of the system in a progressive flow mode is shown in FIG. 4d. If the determination that the system is operating in progressive mode is made in block 453 of FIG. 4b, the units are ranked in order of time remaining before regeneration is required as shown in block 481 of FIG. 4d. If any unit is regenerating or phasing before or after regeneration, as determined in block 482, the other units of the system remain on line as shown in block 487 and the system reenters at entry point B of FIG. 4a. If no unit is regenerating or phasing, a determination is made as to which unit has the greatest remaining time as shown in block 483. If the time remaining on unit number 2 is less than the time remaining on unit number 1, a regeneration of unit number 1 is initiated as shown in block 486 and the other unit(s) are brought on line as previously described, in block 487.

If the time remaining on unit number 2 exceeds time remaining on unit number 1 in the block 483 test, determination of the presence of three units is made as shown in block 484. If three units are present, a determination is made in block 485 whether the time remaining prior to required regeneration on unit number 3 exceeds the combined remaining time on unit numbers 1 and 2. If not, a regeneration of unit number 1 is initiated.

If three units are not present in the test of block 484 or if the unit number 3 time remaining is satisfactory in block 485, a determination is made whether the flow exceeds the trip level as shown in block 488. A detailed description of the trip level is provided subsequently. If the flow does not exceed the trip level, the primary unit only remains on line as shown in block 489. The service valve of the unit on line is made as shown is energized as shown in block 459 of FIG. 4b and verification of the phase of the valve is made in block 461, and with proper phase the system reenters at entry point B of FIG. 4a. If the valve phase is not correct the alarm sequence of blocks 413 through 415 is accomplished beginning at entry point F of FIG. 4b as previously described.

If the flow is greater than the trip level in the test of block 488 a determination of the number of units is made in block 490. If only two units are present, both units are brought on line in block 491 with the system reentering at entry point I of FIG. 4b for phase verification and further processing as previously described.

If three units are present in the test of block 490, a determination if the flow exceeds twice the trip level is made in block 492. If not, the primary and first secondary units are brought on line only as shown in block 493 and system processing continues and entry point I as previously described. If the flow does exceed twice the trip level value in block 492 all three units are brought on line as shown in block 494 and system processing again continues at entry point I.

Returning to FIG. 4a, the remote start input described with respect to FIG. 2 is implemented for each unit through a normally open dry contact switch 495. Sensing of the switch is accomplished as shown in block 496 and if closure of the switch is detected a determination is made if the switch remains depressed sufficiently long to overcome the delay timer in block 497. If sufficient, a regeneration is initiated at block 446 as previously defined. If the switch was depressed for an insufficient time, the delay timer is reset in block 498.

Figure 6:
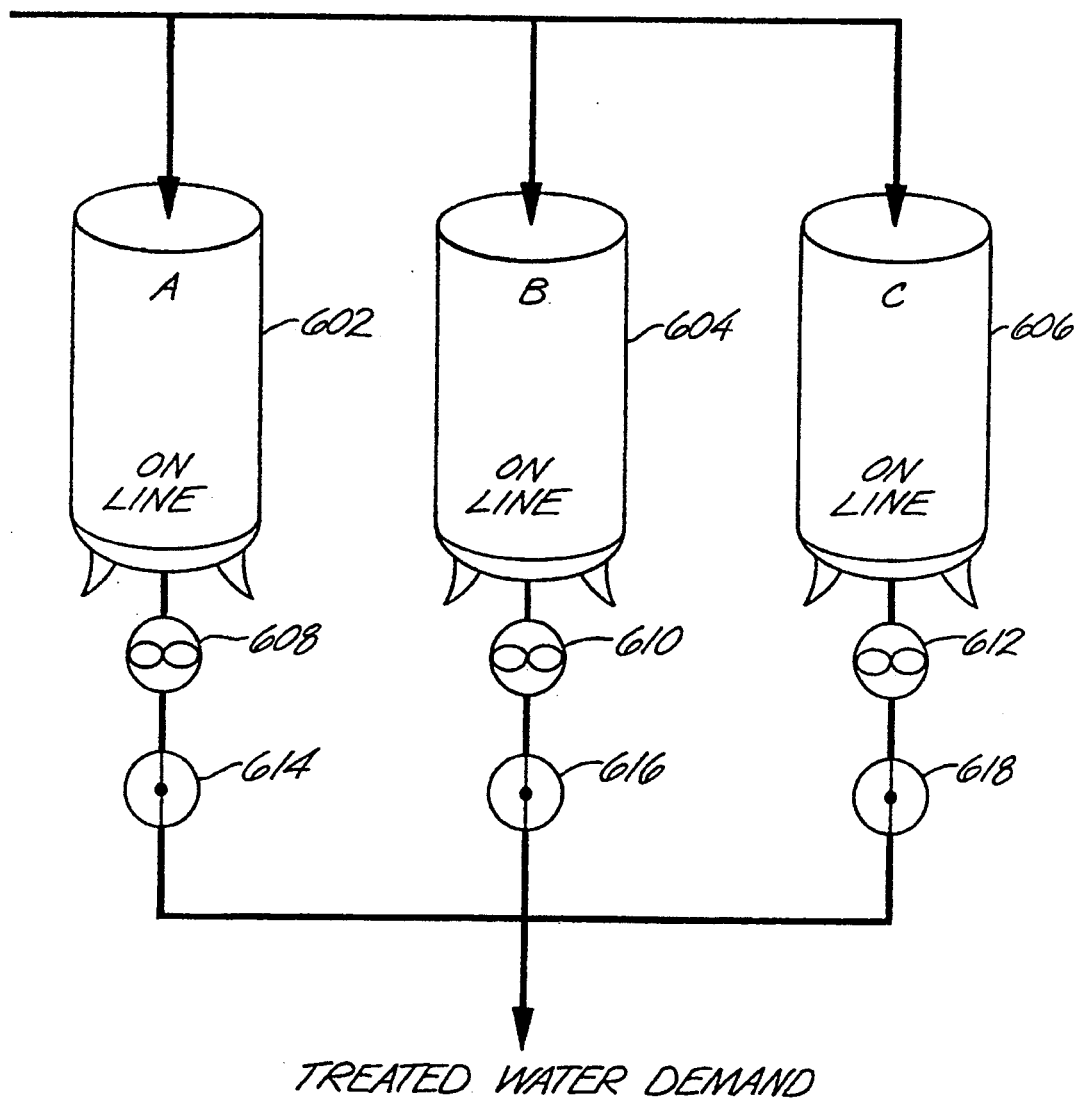
FIG. 6 is a three tank illustration of parallel flow water treatment system.

By way of diagrammatical illustration FIG. 6 represents prior technology for operating multiple treatment systems, while FIGS. 7-10 represent applicant's novel method for operating multiple treatment systems. FIG. 6 illustrates a triple treatment system 600 utilizing a parallel flow pattern. All three tanks 602, 604 and 606 are on-line thus providing treated water simultaneously. Flow sensors 608, 610 and 612 monitor the water flow from each of the systems. In a parallel configuration the outlet valves 614, 616 and 618 are all in the open position.

The greatest advantage of parallel configured water treatment systems is to provide high flow rates at low pressure loss. Conversely, at low flow rates there are several operational problems being poor water quality and inaccuracy of flow sensing devices.

A new feature called progressive flow can be implemented to maintain the minimum number of tanks on-line to assure good water quality and meter accuracy. Progressive flow can be utilized in either twin or triple water treatment systems. The progressive flow configuration can be utilized in program types 23/25 and 24/25/26 of which will be more fully discussed subsequently.

In these program types a flow rate value called a trip level is incorporated to activate the progressive flow feature. Only one trip level value is required for either a twin or triple water treatment system. The selection of the trip level is based upon two factors being the resin volume of the largest softener in the system and pipe size of the installed water meters. A combination of these two factors is used to obtain a minimum trip level, while just the resin volume is considered to select the maximum trip level value.

The value selected has a significant effect on how the system will operate. A minimum trip level value will allow the greatest number of tanks on-line with relatively low flows. This will provide low pressure loss and excellent water quality. Conversely, a maximum trip level value will limit the number of on-line tanks at relatively high flows. The advantage of this type of operation will be the more even spacing of regenerations. This prevents the controller from having to prematurely force regenerations to maintain spacing.

Figure 7:
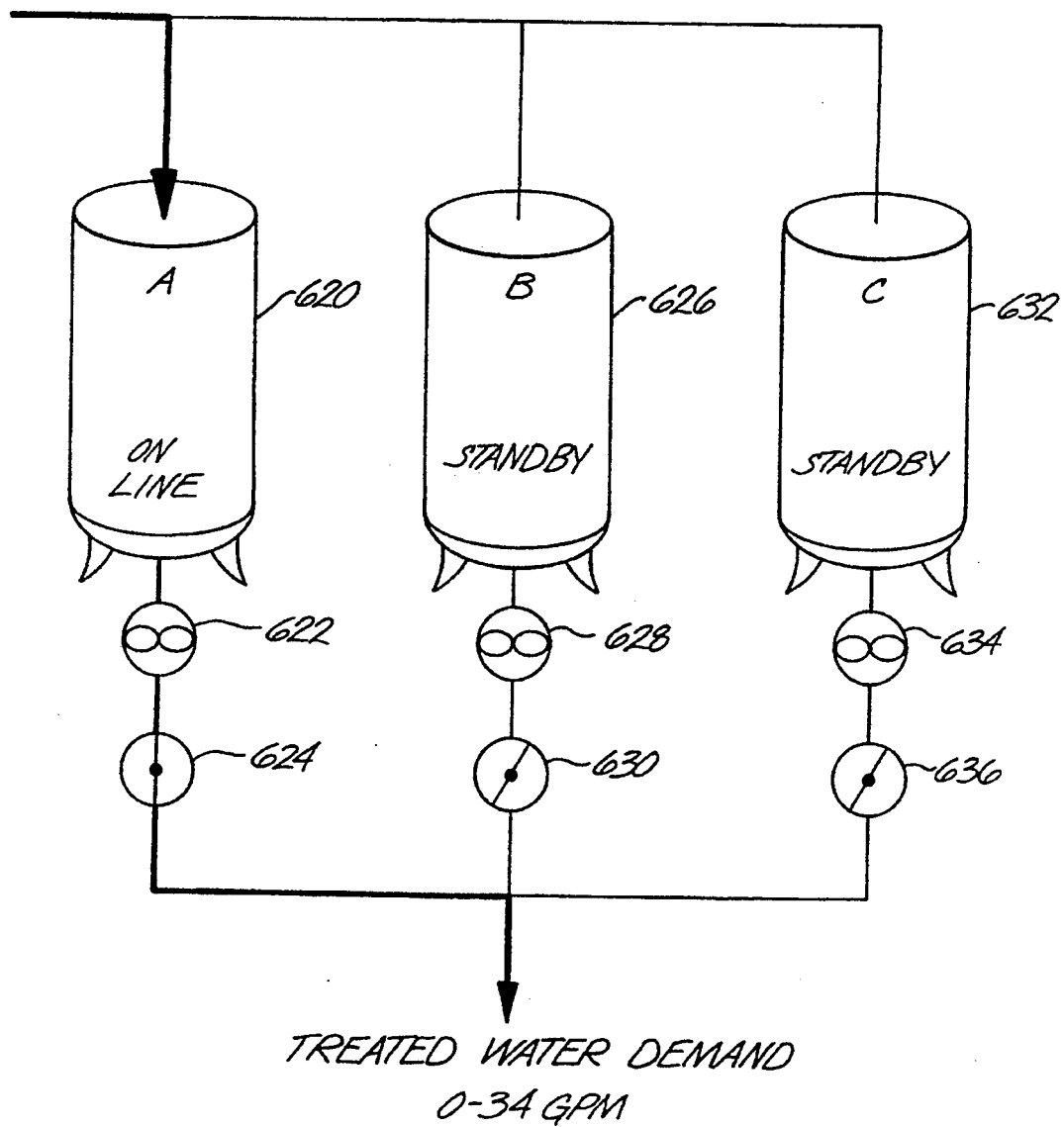
FIG. 7 is a three tank illustration of a progressive flow water treatment system with the water demand less than a programmed flow rate.

FIG. 7 illustrates triple water treatment system utilizing the progressive flow method. In this system the trip level value has been chosen to be 35 gallons per minute, and has been programmed into the controller. When the treated water demand is less than the trip level value only water treatment system 620 is on-line providing treated water. Flow sensor 622 monitors the water flow and outlet valve 624 is open. System 620 is the primary system while systems 626 and 632 are standby and outlet valves 630 and 636 respectively maintain the standby status.

Figure 8:
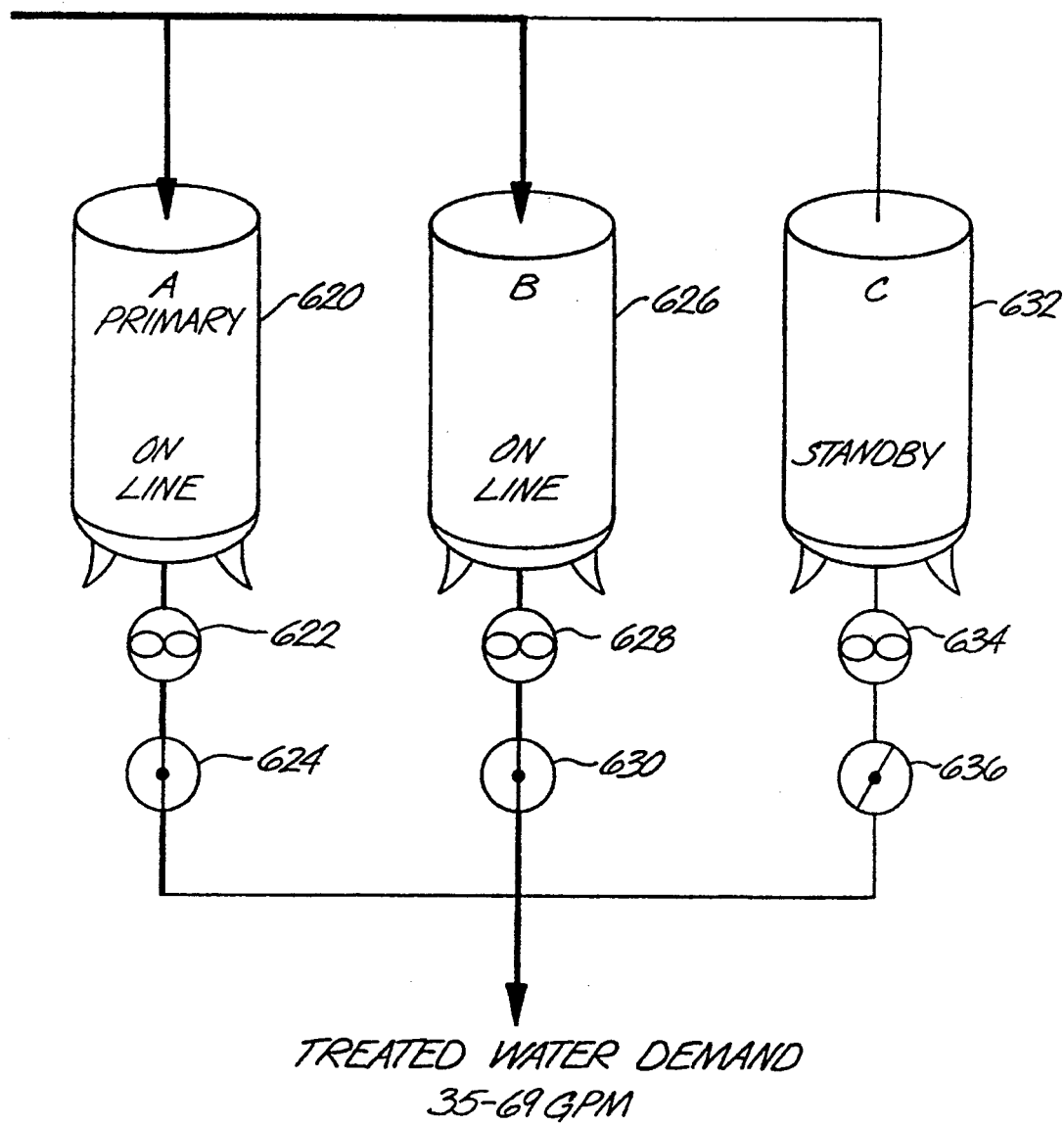
FIG. 8 is a three tank illustration of a progressive flow water treatment system with the water demand above but less than twice the programmed flow rate.

FIG. 8 illustrates the same system however the treated water demand has exceeded the trip level value. Once the treated water demand exceeds the trip level value outlet valve 630 is opened and system 626 is placed on-line joining system 620 in providing treated water. Flow sensor 628 is now monitoring the flow also. System 632 remains in the standby position.

In FIG. 9 the treated water demand has exceeded twice the trip level value. When this condition occurs outlet valve 636 is opened placing system 632 on-line and in service joining system 620 and 626. These systems continue to operate in parallel while the demand for treated water remains above twice the trip level.

FIG. 10 illustrates the regeneration process for the progressive flow configuration. When the treated water supply of system 620 has been exhausted flow sensor 622 will trigger the controller to close outlet valve 624 taking system 620 off-line to begin the regeneration process. System 626 then becomes the primary system and along with system 632 continue to operate while the demand for treated water remains above the trip level value. Once regeneration has been completed, system 620 will return on-line if the treated water demand is greater than twice the trip level value. If the water demand is less than twice the trip level value, system 620 will remain in the standby position.

When the treated water supply of system 626 has been exhausted flow sensor 628 will signal the controller and outlet valve 630 will be closed. System 632 will become the primary system and will provide treated water along with system 620 when the demand exceeds the trip level value. Systems 620, 626 and 632 will rotate as being the primary as the demand for treated water and the regeneration of the systems dictate. The primary flow unit rotates in sequence following a regeneration.

It should be noted that arbitrary trip levels set between the recommended minimum and maximum values can be used to cause one tank of either a parallel twin or parallel triple configuration to be held off line as a standby. Only during periods of unusually high flow will the standby tank share the flow load. For example a trip level of 185 GPM may be employed for systems having a treated water demand of 185 to 369 GPM.

The system operates identically for a twin system configuration. To deactivate the progressive flow mode of operation while in programs 20-26, the operator need only key in 000 into the electronic controller.

As previously described, a memory is associated with the microprocessor for storage of the control parameters and interim calculations within the microprocessor for the various control functions. A present embodiment of the invention employs a combination of volatile and non-volatile memory and provides three power failure memory retention means. A first capacitive means retains sufficient voltage for total memory integrity (data retention) for short periods of power failure. A battery backup system may be employed to further extend memory integrity beyond the decay time of the capacitive protection means for continued data processing. In the present embodiment, failure of the 24 volt AC power input inhibits the output control means for the regeneration sequence valves and service valves. While this feature conserves power to allow maximum memory retention and microprocessor function, initiation of a regeneration sequence is not possible. Consequently, upon power failure, an alarm condition is generated by the microprocessor notifying the user that regeneration was not possible if the initiation sequence has been reached during a power failure.

The non-volatile portion of the memory provides configuration and program type retention for restart after power failure.

In addition to the alarm indications for power failure, phase inconsistency and inhibited regeneration START based on placement of the controller in the SEMIAUTO mode, an alarm condition is asserted by the microprocessor in response to the communication means if improper connection of the communication means between controllers is present. In multiple tank applications, the microprocessor polls the communication means including the serial output and serial input, for communication with the other controllers. If no communication signals are present, the alarm is asserted.

In the present embodiment as described above, the invention executes 17 program types within 8 basic program options. The programs are located on a memory chip located within the electronic program module in the microprocessor. Each program type has a code number and operates the system by being selected by the user through programming steps at the controller through a series of prompts requesting the program desired, the phase and the type. The first program type, designated type 00, a single water treatment system is regenerated a maximum of once per 24 hour period based on treated water used. The regeneration schedule is determined automatically by the controller through the use of a mathematical formula which calculates a prediction factor as previously described with respect to FIG. 4c. The factor is affected by water usage patterns of both a daily and weekly nature. Also included is a calendar override feature which allows the user to force regenerations to occur on a fixed time interval basis should an extended length of time occur between water usage periods. This prevents organic contamination buildup in the media of the treatment device. The fixed calendar override interval is programmable from one to 99 days. The regeneration sequence may be delayed to a user set time. The unit returns to service immediately following regeneration.

Program types 01 and 02 are the same as type 00 except that the system will operate with two water treatment systems, one of which will be on line while the other is regenerated and standing by. Only one system will regenerate each 24 hour period as determined by the controller. The pair will alternate as each is calculated to be exhausted. Simultaneous regeneration is prevented by the multiple tank interlock as previously described.

Program type 10 is unlike any of the other programs because it is not used with conventional water softening equipment. Its primary purpose is to provide the user with an alarm based on the amount of water treated by a device and the length of time the treatment device has been in service.

Two audible, visual and electrical signal user setpoints are available for both time and volume conditions. An audible alarm silence feature permits the user to cancel the tone but not the continuous electrical output signal or intermittent visual display for all setpoints. Two separate sets of continuous electrical signals are available for each alarm point. One could be used to reduce flow while the other could be used to totally stop flow.

The user can set the display to show the remaining volume of treated water available to each of the two volume alarm setpoints, or to the number of days remaining to each of the two alarm setpoints. The time duration can be set from 1 to 999 days and the volume can be from 1 unit (gallon, litre, etc.) to 9.9 million units.

The user can cancel the time and volume batch at any time, which automatically resets all alarms to off, and the volumes and times back to their user set values.

Program type 20 is employed for a single water treatment system regenerating based on a user set volume or total volume. The only limiting factor on the number of regenerations is the speed at which the brine system of the water treatment system can produce brine. In most cases the treatment system should be sized to allow brine makeup. Regeneration will be initiated immediately upon reaching the user set volume. The system returns to service immediately upon regeneration. Program types 21 and 22 are the same as type 20 except the system operates with two water treatment systems, one of which is on line while the other is regenerated and standing by. Each tank may regenerate independently as the user set volume of each tank is reached. Simultaneous regeneration is not possible based on setting of the MTI as previously described.

Program type 23 and 25 are the same as type 20 except the system will operate two water treatment systems, both of which are on line simultaneously (parallel) or operate in the parallel progressive mode as shown in FIG. 4b block 453. As each tank's user set volume is treated, it will be taken off line immediately, regenerated and placed back on line immediately. However, to preclude the possibility of one system reaching exhaustion during the regeneration of the second system, premature regeneration of the tank having the least volume remaining will occur if the tank having greater volume remaining is not capable of providing treated water for the duration of a regeneration as previously described with respect to FIG. 4b, blocks 470 and 472.

Program type 24 and 25 and 26 are the same as type 20 except the system will operate three water treatment systems, all of which are on line simultaneously (parallel) or operate in the parallel progressive mode as shown in FIG. 4b block 453. As each tank's user set volume is treated, it will be taken off line immediately, regenerated and placed back on line immediately. However, to preclude the possibility of one system reaching exhaustion during the regeneration of the other systems, premature regeneration of the tanks having the least volume remaining will occur if the tanks having greater volume remaining are not capable of providing treated water for the duration of the regeneration as previously described.

Program type 30 employs a single water treatment system regenerating a maximum of once per 24 hour period based on a user set volume of treated water with the regeneration sequence delayed to a user set time. The unit returns to service immediately following regeneration.

Program type 31 and 32 operate similarly to type 30 except the system will operate with two water treatment systems, one of which is on line while the other is regenerated and standing by. Only one tank will regenerate in each 24 hour period as needed. The user set regeneration start time can be different for each system. The pair will alternate as each system is regenerated. Simultaneous regenerations are not possible.

Program type 40 employs a single water treatment system regenerating on the basis of equal 24-hour time intervals set by the user. Regeneration is initiated at the user set time with the unit returning to service immediately following regeneration.

Program type 41 and 42 are identical to type 40 except that two water treatment systems are employed, one of which is on line while the other is regenerated and standing by. Only one system regenerates in each user set interval. The pair alternates as each interval begins and simultaneous regeneration is not possible.

Program type 50 employs a single water treatment system regenerating on a day or days of the week schedule set by the user. The regeneration sequence initiates at the user set time. The unit returns to service immediately following regeneration.

Program types 51 and 52 are identical to type 50 with two water treatment systems operating on an alternate basis. Only one of the two media tanks will regenerate on the user selected day(s) and the pair will alternate as each regeneration occurs. Simultaneous regeneration is not possible.

Program type 60 employs a single water treatment system regenerated after a user set number of 1 minute intervals has occurred with a minimum number of 1 minute intervals being 1 minute and a maximum of 9,999 minutes. The regeneration sequence is initiated immediately after the time interval. The system goes back on-line immediately following the regeneration.

Programs types 61 and 62 are identical to type 60 except that the system will operate with two water treatment systems, one of which will be on-line while the other is regenerated and placed in standby. Only one system will regenerate immediately after each user set interval. The pair will alternate as each new interval period begins. Simultaneous regenerations are not possible.

Program type 70 employs a single water treatment system with the regeneration sequence initiated by an external signalling device (hardness monitor, external push buttons, batching devices, differential pressure switch, turbidimeter etc.). A user set time delay interval (minimum 3 seconds, maximum 999 minutes) can be programmed to delay a regeneration sequence from starting until a continuous external signal of a desired length occurs. External signals of a shorter than desired duration will be ignored. Should the external signal not be cancelled after a regeneration sequence another time delay will occur. Should the external signal continue beyond that point an alarm condition will be displayed and additional regenerations will be inhibited. The display will indicate the presence of a signal and the remaining time in minutes before a regeneration will occur.

Program types 71 and 72 are identical to type 70 except that the system will operate with two water treatment systems, one of which will be on-line while the other is regenerated and placed in standby. Only one system will regenerate immediately after each user set external signal duration occurs. The pair will alternate as each new external signal duration is reached. Simultaneous regenerations are not possible. Those skilled in the art will recognize that the program types defined are examples typical of regeneration control sequences which may be achieved using the present invention.

Programming of user selected times and volumes as well as regeneration cycle times and sequence are similar for all program types. "Programming required-type 30". If the numerical value is present on the display, the unit is in the run mode. Transition to the program mode is accomplished by depressing the ENTER/EXIT key. Depressing the TYPE key results in a display of the controller type designated by the program selected. Type 30 should appear. The display should show one of the following "phase", a numeric value, or "enter time" followed by a flashing display segment. "Phase" is an alarm condition indicating the valve operator on the service valve is not properly synchronized as previously described. Operator action to correct the unsynchronized condition is required. If the numeric value appears as previously described, the controller is in the run mode and the ENTER/EXIT key must be depressed. If the "enter time" display is present, the controller is in the program mode and programming may begin. If the controller previously was displaying the "phase" alarm condition after correction of the condition, the CURRENT FUNCTION key may be depressed to obtain the "enter time" prompt. Upon obtaining the flashing display segment presentation, the SELECT DIGIT key is depressed to alter the selected (flashing) segment while the SET DIGIT key is employed to alter the value. For example, in the enter time display a day, hour, minute and am/pm segments will appear on the display with one flashing. The SET DIGIT key is employed to alter the flashing segment while the SELECT DIGIT key alters the flashing segment between the day, hour, minute and am/pm designation. Upon completion of the time entry, the NEXT FUNCTION key is depressed and the display will prompt "enter START time". The display will then show digits denoting the hour of day, minute of hour, and am or pm. The SET DIGIT and SELECT DIGIT keys are employed as previously described to enter the desired START time for the regeneration sequence.

The user then depresses the NEXT FUNCTION key, resulting in a prompt "enter alarm time". The set digit and select digit keys are employed to enter a desired alarm time. The next function key is again depressed resulting in a prompt "enter alarm mode" followed by a flashing word "silent". The SET DIGIT key may be then used to select one of three options, silent, instant, or delayed. The NEXT FUNCTION key is again depressed resulting in a prompt "enter desired volume". The SELECT DIGIT and SET DIGIT keys are employed to enter the desired volume. The NEXT FUNCTION key is again depressed resulting in a prompt "enter cycle time". The display indicates "CYC1" with two digits flashing. The SET DIGIT key is employed to set the number of minutes desired in the cycle 1 timer. Each of the six cycle timers is then set employing the NEXT FUNCTION key as described. Cycle timers which are not employed in the desired regeneration sequence have a zero time entered.

Upon completion of entry of the cycle times, the NEXT FUNCTION key is again depressed, resulting in a prompt "enter meter factor". The SET DIGIT and SELECT DIGIT keys are employed to enter a meter factor to properly calibrate the flow meter input at FLOW for the volume per count. As previously described, a Hall effect, flow induced square wave generator, or dry contact flow meter may be employed. Upon depressing the next function key, a prompt "DONE" will appear. The system will automatically leave the PROGRAM mode and begin the RUN mode.

The invention as previously described may be employed to control various water treatment systems with different regeneration requirements.

After programming of the system for the desired program type, the microprocessor monitors flow and time as previously described. The user may initiate a regeneration sequence at any time by depressing the START/STEP key as previously described. In addition, the volume and initiation timer may be reset to the initial programmed values by simultaneously depressing the SET DIGIT and SELECT DIGIT keys. A regeneration sequence operation may be verified by stepping through a regeneration sequence manually depressing the START/STEP key to initiate each step.

The present invention provides a highly flexible water treatment system controller for single or multiple water treatment systems. The invention combines the initiator and sequencer functions of the prior art employing sophisticated calculation means for sequence initiation based on user programmable input or statistically derived mathematical prediction. Sequence control is achieved with multiple cycle timers activating a plurality of valve control outputs.

Having now described the invention in detail as required by the patent statutes, those skilled in the art will recognize modifications to the embodiments disclosed, both as previously suggested and as otherwise required for specific implementations. Such modifications fall within the scope and intent of the invention as defined in the following claims.

APPENDIX A

This appendix comprises a printout of the source program employed in an embodiment of the present invention. The source code is written for use with a commercial version microprocessor Model No. uPD78C10 manufactured by NEC Corporation.

```
TITLE 'Pensar Corp  Proprietary Information  Confidential'
;******************************************
;*      Raytec - Water Softener III       *
;*                                        *
;*      Copyright (C) 1990                *
;*      Pensar Corporation                *
;*      2222 E. Pensar Drive              *
;*      Appleton, WI  54914               *
;*                                        *
;*      By:    Robert W. Colburn          *
;*                                        *
;*      Version:       1.5                *
;*      Last Update:   12/21/90           *
;*                                        *
;******************************************

; Update history:

; V1.1  -       I Forgot, look it up
; V1.2  -       Made tint and line interupts non-re-entrant
;               Fixed TOTALIZER overflow
;               Deleted ontune, reduced song buffer from 12 to 6 bytes
;               Select Program option text, long beep for illegal entry
;               Output C not automatically turn on after recharge
; V1.3  -       External start delay is programmable in all types
; V1.4  -       Fixed bug with cnts & cntss being shared by different
;               counters
; V1.5  -       Fixed bug with predict (demand) algorithm going into
;               brine delay after recharge. Also found found bugs
;               that did not affect operation using decbcd and incl
;               (rets). Rewrote xseg to eliminate need for segdat
;               buffer (free 16 bytes).

;******************************************
;*    uPD78C10 Hardware Environment       *
;*    PLCC Package                        *
;******************************************

;       Pin Name       Pin #   Signal I/O

;       /NMI    28     N/C
;       /INT1   29     60 Hz
;       /RESET  31     RESET   Input ;       X1      34     7.3728 MHz XTAL
;       X2      33     7.3728 MHz XTAL ;       MODE0   32     pulled low for 16k expansion
;       MODE1   30     pulled high for 16k expansion ;       Port A Assignments ;       PA0     C               Output
;       PA1     B               Output
;       PA2     A               Output
;       PA3     Ext alm         Output
;       PA4     Drive           Output
;       PA5     Dog             Output
```

```
;       PA6     Cam             Input
;       PA7     Dout            Input
;       Port B Assignments ;       PB0     Blnk            Output
;       PB1     CS              Output
;       PB2     SCK             Output
;       PB3     DAT             Output
;       PB4     Row 4           Input
;       PB5     Row 3           Input
;       PB6     Row 2           Input
;       PB7     Row 1           Input ;       Port C Assignments ;       PC0     TxD             Control Output
;       PC1     RxD             Control Input
;       PC2     Col 2           Output
;       PC3     Col 1           Output
;       PC4     ANNUNCIATOR     Control Output
;       PC5     Flow            Control Input
;       PC6     TEN             Output
;       PC7     DEN             Output ;       Port D Assignments ;       PD0     Mux Address/Data        A0/D0
;       PD1     Mux Address/Data        A1/D1
;       PD2     Mux Address/Data        A2/D2
;       PD3     Mux Address/Data        A3/D3
;       PD4     Mux Address/Data        A4/D4
;       PD5     Mux Address/Data        A5/D5
;       PD6     Mux Address/Data        A6/D6
;       PD7     Mux Address/Data        A7/D7

;       Port F Assignments

;       PF0     Address         A8
;       PF1     Address         A9
;       PF2     Address         A10
;       PF3     Address         A11
;       PF4     Address         A12
;       PF5     Address         A13
;       PF6     DATA            Input/Output
;       PF7     CLK             Output ;*****************************************
;*              Equates                  *
;***************************************** soh:    equ     01h             ;ASCII soh (cntrl-a)
stx:    equ     02h             ;ASCII stx (cntrl-b)
etx:    equ     03h             ;ASCII etx (cntrl-c)
eot:    equ     04h             ;ASCII eot (cntrl-d)
bel:    equ     07h             ;ASCII bell
bs:     equ     08h             ;ASCII backspace
lf:     equ     0ah             ;ASCII linefeed
```

```
cr:      equ    0dh         ;ASCII carriage return
ht:      equ    09h         ;ASCII tab
esc:     equ    01bh        ;ASCII escape
ctlc:    equ    03h         ;ASCII cntrl-c
ctlz:    equ    01ah        ;ASCII cntrl-z
ctlx:    equ    018h        ;ASCII cntrl-x
xon:     equ    011h        ;ASCII xon (cntrl-q)
xoff:    equ    013h        ;ASCII xoff (cntrl-s)
intram:  equ    0ff00h      ;Beginning of internal RAM
cntl_r:  equ    12h         ;ascii control-r
cntl_t:  equ    14h         ;ascii control-t
isize:   equ    23          ;input buffer size c8:      equ    0ffh        ;4186
c8s:     equ    0ffh        ;4434.9
d8:      equ    0ffh        ;4698.6
d8s:     equ    7bh*2       ;4978
e8:      equ    74h*2       ;5274
f8:      equ    6eh*2       ;5587.7
f8s:     equ    68h*2       ;5919.9
g8:      equ    62h*2       ;6271.9
g8s:     equ    5ch*2
a8:      equ    57h*2       ;7040
a8s:     equ    52h*2
b8:      equ    4eh*2       ;7902.1
c9:      equ    49h*2
d9:      equ    41h*2
e9:      equ    3ah*2
b7:      equ    9ch*2 prog:    equ    00000001b
slct:    equ    00000010b
hlp:     equ    00000100b
hold:    equ    00001000b
typ:     equ    00010000b
st:      equ    00100000b
nxt:     equ    01000000b
start:   equ    10000000b timed:   equ    0           ;disp value
stimed:  equ    1
amoded:  equ    2
atimed:  equ    3
sdayd:   equ    4
idayd:   equ    5
mdayd:   equ    6
pvold:   equ    7
vread:   equ    8
pcntd:   equ    9
cntd:    equ    10
avdud:   equ    11
fld:     equ    12
tripd:   equ    13
cycdd:   equ    14
dda1d:   equ    15
dda2d:   equ    16
ddv1d:   equ    17
ddv2d:   equ    18
da1d:    equ    19
```

```
da2d:   equ     20
dv1d:   equ     21
dv2d:   equ     22
totald: equ     23
bmkdd:  equ     24
psgd:   equ     25
sgd:    equ     26
mfctd:  equ     27
endtbl: equ     28
```

;******************************************
;*      Interrupt Vectors                 *
;******************************************

```
        org     0000h           ;Power-on reset entry point
        jmp     puron           ;

org     0004h           ;NMI Interrupt
        ei
        reti org     0008h           ;INTT0/INTT1 Interrupt
        jmp     intt0           ;.5ms interrupt org     0010h           ;INT1/INT2 Interrupt
        jmp     line org     0018h           ;INTE0/INTE1 Interrupt
        jmp     tint            ;Fixed Counter Interrupt org     0020h           ;INTEIN Interrupt
        jmp     flow            ;Edge Detect Interrupt org     0028h           ;INSTR/INTST Interrupt
        jmp     sint org     0030h Object code copyright notice
        db      'V1.5, Copyright (C) 1990 Pensar Corporation'
        org     0060h           ;SOFTI Interrupt
        ei
        reti                    ;Not used
```

;******************************************
;*      Power On Reset                    *
;******************************************

```
puron:  di                      ;Disable interrupts
        lxi     sp,0            ;Set stack pointer to top of internal RAM mvi     a,00001110b     ;Set expansion to 16K and enable internal RAM
        mov     mm,a mvi     mkh,0ffh        ;Mask all high interrupts
        mvi     mkl,0ffh        ;Mask all low interrupts
```

Port A Initialization

```
mvi     pa,0                ;A,B,C off
mvi     a,11000000b         ;PA7 and PA6 inputs, others outputs
mov     ma,a                ;Set Port A
```

Port B Initialization

```
mvi     pb,0                ;clear port b
mvi     a,11110000b         ;PB7 - PB4 inputs, PB3 - PB0 outputs
mov     mb,a                ;Set Port B I/O States
```

Port C Initialization

```
mvi     pc,0                ;clear port c
mvi     a,00110011b         ;CIN, TC, TxD, RxD enabled
mov     mcc,a               ;Set Control/Port States
mvi     a,00100010b         ;input for CIN & RxD
mov     mc,a                ;Set PC5 & PC1 as inputs
mvi     pc,0
```

Ports D/F Initialization

```
mvi     pf,00000000b        ;clear Port F
mvi     a,00000000b
mov     mf,a                ;Set Port F to all outputs
mvi     pf,00000000b        ;write again
``` clear zero cross mode

```
mvi     a,0                 ;a <- 0
db      01001101b           ;mov   zcm,a
db      11101000b
```

Initialize tm0 for 5 ms, tm1 to be used for sound generation

```
mvi     tmm,0ffh            ;Disable Timer
mvi     a,192               ;Delay for 5 milliseconds
mov     tm0,a               ;Set Timer 0
mvi     tmm,00000111b       ;tm0 at clk/384,tm1 at /12, ff disabled
```

Set up event timers

```
mvi     a,0h                ;clear a
mov     etmm,a              ;stop counter
lxi     ea,0ffffh           ;load count
dmov    etm1,ea             ;load counter one
dmov    etm0,ea             ;load counter two
mvi     eom,0               ;not used mvi     anm,00001000b       ;Scan mode, AN7-AN4, > 9 MHz
```

Set up working register, both banks

```
mvi     v,0ffh              ;set up working register
exa                         ;swap working register
mvi     v,0ffh              ;set up alternate working register
exa                         ;swap back
``` initialize serial port

```
        call    bd19200         ;19200, N, 8, 1
        lxi     ea,700          ;hl <- # of counts at 7.3728 MHz / 12
        dmov    etm1,ea         ;load wait to disable transmitter aniw    statw,10111111b ;reset battery flag
        mvi     mk1,10111101b   ;Unmask INTE1 & INTT0
        mvi     mkh,00000101b   ;unmask serial recieve xri     pa,00100000b    ;pulse watchdog
        ei
        xri     pa,00100000b    ;pulse watchdog
``` check for integrity of ram

```
        lxi     ea,5a0fh        ;identity word
        lhld    eeword          ;hl <- eeword
        deq     ea,h            ;equal?
        jre     clram           ;no, clear ram and check eeprom lhld    type            ;compute checksum of ram mirrored in eeprom
        dadd    ea,h            ;add to checksum
        lhld    hz
        dadd    ea,h            ;add to checksum dmov    b,ea            ;use total flow in EEPROM
        mvi     a,3
        call    read
        dmov    h,ea
        mvi     a,4
        call    read
        dadd    ea,h
        dadd    ea,b
        dmov    h,ea            ;hl <- checksum of ram (+ flow from EEPROM)

mvi     a,5             ;address of checksum
        call    READ            ;read checksum stored in eeprom
        dne     ea,h            ;checksums equal?
        jmp     ready           ;yes, RAM OK!

;       clear internal ram (256 bytes)

clram:  lxi     ea,0            ;ea <- 0000h
        lxi     h,intram        ;hl <- start of ram
        mvi     b,127           ;loop counter
clrint: steax   h++             ;clear 2 bytes, bump pointer
        dcr     b               ;do all of ram
        jre     clrint          ;loop ;       Read EEPROM data and store in ram mvi     a,0             ;address 0 = mode
        lxi     h,eeword        ;address in ram for eeword
        lxi     d,0             ;clear accumulator
readlp: call    READ            ;[ea] <- variable
        steax   h++             ;store in ram buffer and decrement address
        dadd    ea,d            ;add to accumulator
        dmov    d,ea            ;de <- keep track of checksum
```

```
        inr     a               ;decrement address
        gti     a,4             ;pointing to checksum?
        jre     readlp          ;no call    READ            ;read checksum
        deq     ea,d            ;do checksums match?
        jre     reset           ;no lhld    eeword          ;hl <- eeword
        lxi     ea,5a0fh        ;test for good data
        dne     ea,h            ;same?
        jmp     dflt            ;yes; EEPROM data OK ;       Checksums do not match or eeword is not right - prompt user for info reset:  mviw    promptw,0       ;set to Programming required display
        mviw    hzw,0           ;reset 60 Hz flag
        mviw    cfgw,0          ;reset configuration
        mviw    typew,0         ;reset type
        mviw    lpcntw,20       ;set scroll to end of display
        oriw    beepw,10h       ;start-up flag
        lxi     h,0
        shld    total
        shld    total+2
        call    badbp           ;beep
;*    Prompt executive routine       * resetlp:call   wait60           ;wait for line cycle
        call    tone            ;process beeps
        mviw    prgtmw,119      ;do not auto pop out of programming mode
        call    clock           ;update real time clock
        nop
        call    pdisp           ;update display
        call    gks             ;read keys, rts if no key
        call    prmpt           ;process any key, rets when all data entered
        jre     resetlp         ;continue prompting ani     pb,11111110b    ;turn off blink neiw    cfgw,0          ;single unit?
        aniw    alnumw,11110111b;yes, reset alarm 4
        lxi     h,eeword        ;address of integrity word
        lxi     ea,5a0fh        ;integrity
        steax   h               ;store save identity to EEPROM and then read back to insure integrity mvi     a,0             ;address 0 = eeword
        lxi     d,0             ;clear accumulator
wrtlp:  ldeax   h++             ;load in ram buffer and increment address
        call    ewen            ;enable EEPROM erase/write
        call    erase           ;erase old value
        call    write           ;write new value
        call    ewds            ;disable EEPROM erase/write
        dadd    ea,d            ;add to accumulator
        dmov    d,ea
        inr     a               ;decrement address
        gti     a,4
        jre     wrtlp
```

```
        call    ewen            ;enable EEPROM erase/write
        call    erase           ;erase old value
        call    write           ;write checksum value
        call    ewds            ;disable EEPROM erase/write
        xri     pa,00100000b    ;pulse watchdog ;       Read EEPROM data again and store in ram lxi     h,eeword        ;address in ram
        lxi     d,0             ;clear accumulator
        mvi     a,0             ;address zero
rdlp:   call    READ            ;[ea] <- variable
        steax   h++             ;store in ram buffer and decrement address
        dadd    ea,d            ;add to accumulator
        dmov    d,ea            ;de <- keep track of checksum
        inr     a               ;decrement address
        gti     a,4             ;pointing to checksum?
        jre     rdlp            ;no
        call    READ            ;read checksum
        deq     ea,d            ;do checksums match?
        jre     reset           ;no ;       Load default values into ram dflt:   oriw    alnumw,00010000b;set alarm 5
        xri     pa,00100000b    ;punch them doggies aviw    mftrw,50        ;set meter factor to 50 [hex]
        avi     a,50h           ;a <- 50h
        mov     mfctr,a         ;set meter factor to 50 [packed BCD]

xri     pa,00100000b    ;punch them doggies
        aviw    hourw,12h       ;set time to noon neiw    typew,1         ;Water batching?
        avi     a,0             ;a <- 0 - midnight
        avi     a,2             ;a <- 2 - 2:00 AM
        mov     strt+1,a        ;set start time avi     a,8             ;a <- 8
        mov     almta+1,a       ;set alarm time to 8:00 AM avi     a,12h           ;a <- 12h
        mov     cyc1,a          ;store 12 minutes in cycle 1
        avi     a,60h           ;a <- 60 h
        mov     cyc2,a          ;store 60 minutes in cycle 2
        avi     a,06h           ;a <- 06h
        mov     cyc3,a          ;store 6 minutes in cycle 3
        call    soc             ;compute sum of all cycle times aviw    stdayw,01010100b;set start days to M,W,F
        aviw    dayw,10000000b  ;set day to Sunday eqiw    typew,0         ;Demand?
        avi     a,02h           ;no, a <- 2
        avi     a,07h           ;a <- 30h
        mov     intday,a        ;store in interval days
        call    refday          ;copy to maxdays
```

```
        mvi     a,10h           ;a <- 10h
        mov     prevol+1,a      ;set preset volume to 1000
        mov     vlrm+1,a        ;set volume remain to 1000
        call    setdb           ;set average daily usage
        call    average         ;compute average daily usage lxi     h,15h           ;default debounce time to 15 minutes
        shld    pcntsg          ;store
        call    refsg           ;update times eqiw    typew,6         ;Count down?
        jre     chkv0           ;no
        lxi     h,720h          ;12 hour default count down
        shld    pcntmn          ;set preset count down minute
        call    refcnt          ;update counters
        jre     waitype chkv0:  eqiw    typew,2         ;Vol 0?
        jre     dflt1 mviw    dispw,amoded    ;yes, set display to alarm mode
        lxi     h,lstrg0        ;set up last regeneration counts for units
        mvi     a,128
        stax    h+
        dcr     a
        stax    h
        eqiw    cfgw,3          ;master twin?
        lxi     h,32400         ;no, 15 minutes of pulses for triple units.
        lxi     h,36000         ;15 minutes of pulses for twin units
        shld    rgcnt           ;reset for next unit dflt1:  eqiw    typew,1         ;Water batching?
        jre     waitype         ;no mvi     a,44h           ;a <- 44h
        mov     ddalm1,a
        mvi     a,01h           ;a <- 1
        mov     ddalm1+1,a
        mov     ddalm2+1,a
        mvi     a,80h           ;a <- 80h
        mov     ddalm2,a        ;set ddalm1 to 144 days & ddalm2 to 180 days
        mvi     a,0             ;clear lower 2 digits
        mov     dvalm1,a        ;set dvalm1 to 4000 gallons
        mov     dvalm2,a        ;set dvalm2 to 5000 gallons
        mvi     a,40h           ;a <- 40h
        mov     dvalm1+1,a      ;set dvalm1 to 4000 gallons
        mvi     a,50h           ;a <- 50h
        mov     dvalm2+1,a      ;set dvalm2 to 5000 gallons
        call    refwbc          ;refresh wbc counters ;       TYPE loop - wait for type key press (or 20 minutes)

waitype:mviw    lpcntw,19       ;set up 20 minute delay
        mviw    prgtmw,59       ;set up programming exit delay
waitlp: call    wait60
        call    tone            ;process beeps
        call    clock           ;update real time clock
        nop
```

```
          eqiw     prgtmw,0          ;minute up?
          jre      waits             ;no
          aviw     prgtmw,59         ;reset for 1 minute
          dcrw     lpcntw            ;decrement 10 minute counter
          jre      waits             ;continue
          jre      waitx             ;times up!
waits:    call     dtype             ;update display
          call     decode            ;read keys
          call     gokey             ;rets if type key
          jre      waitlp waitx:    call     refcnt            ;refresh count down timer
          call     refsg             ;refresh signal debounce
          oriw     modew,00000010b   ;set programming mode
          call     select            ;set cursor
          oriw     sflagw,80h        ;set ok to communicate flag ;         ready to go ready:    aviw     prgtmw,119        ;set up programming exit delay
          avi      mk1,00111101b     ;Unmask INTEIN, INTE1 & INTT0
          call     shrtbp            ;gimme a beep call     help              ;display help message
          lxi      ea,jtbl           ;ea <- base address of jump table
          ldaw     typew             ;a <- type
          mov      b,a               ;b <- display number
          sll      a                 ;a <- a *2
          add      a,b               ;a <- display number * 3
          eadd     ea,a              ;add offset to base
          jea                        ;jump!

;         jump table for different executive routines jtbl:     jmp      dws
          jmp      wbc
          jmp      vol0
          jmp      dlyv0
          jmp      time
          jmp      clndr
          jmp      cntdn
          jmp      sgnal ; subroutine:  GOKEY
; function:    Rets if type key pressed
; destroyed:   all GOKEY:    oni      a,typ             ;type key?
          ret                        ;no
          offi     a,st              ;set key too?
          jmp      scram             ;yes, reset
          rets ; subroutine:  PRMPT
; function:    Prompt for type and configuration information.
; on exit:     Returns with skip when last information has been entered.
```

```
PRMPT:  eqiw    promptw,0       ;programming required?
        jre     ckset           ;no
        oni     a,prog          ;program key?
        ret                     ;no, ignore everything else call    shrtbp          ;beep
        aviw    promptw,1       ;set prompt to 1
        call    help
        ret ckset:  oni     a,st            ;set key?
        jre     cknk1           ;no offi    a,typ           ;type key too?
        jmp     scram           ;yes ;       Process set key call    shrtbp          ;beep
        aviw    debou,32        ;slew entry rate
        ldaw    promptw         ;a <- prompt
        eqi     a,1             ;displaying 50/60 Hz?
        jre     settp           ;no ;       invert 50/60 Hz flag ldaw    hzw             ;a <- hz
        xri     a,80h           ;toggle flag
        staw    hzw             ;store
        ret settp:  eqi     a,2             ;displaying type?
        jre     setcf           ;no ;       increment type number ldaw    typew           ;a <- type number
        inr     a               ;increment
        lti     a,8             ;greater than 7?
        avi     a,0             ;yes, reset
        staw    typew           ;restore
        ret ;       increment configuration number setcf:  ldaw    cfgw            ;a <- configuration number
        inr     a               ;increment
        lti     a,7             ;greater than 6?
        avi     a,0             ;yes, reset
        neiw    typew,2         ;Volume remain?
        jre     stcfg           ;yes, cfg ok
        lti     a,3             ;greater than 2?
        avi     a,0             ;Parallel units only if Volume Remain type
stcfg:  staw    cfgw            ;restore
        ret cknk1:  oni     a,nxt           ;next key pressed?
        jre     cknk2           ;no
```

```
;       Process next key call    shrtbp          ;beep
        aviw    debow,255       ;slew entry rate
        inrw    promptw         ;increase prompt number
        eqiw    promptw,2       ;prompting for type?
        jre     ldcfg           ;no
        call    help
        ret ldcfg:  eqiw    promptw,3       ;prompting for configuration?
        rets                    ;no, all done, we outta here
        neiw    typew,1         ;water batching?
        rets                    ;yes, only single tank
        call    help
        ret cknk2:  cni     a,hlp           ;help key?
        jre     nokey
        call    help            ;yes
        ret nokey:  aviw    lkeyw,0
        ret ; subroutine:   PDISP
; function:     Update prompt display.
; destroyed:    all PDISP:  eqiw    promptw,0       ;Programming required?
        jre     pdsp1           ;no dcrw    debodw          ;decrement debounce
        ret                     ;no aviw    debodw,19       ;restore
        ldaw    lpcntw          ;a <- scroll offset
        inr     a               ;increment
        nei     a,20            ;displaying "required"?
        aviw    debodw,120      ;hold for one second
        nei     a,21            ;end of scroll?
        avi     a,0             ;yes, reset to beginning
        staw    lpcntw lxi     ea,0            ;clear ea
        mov     eal,a           ;move offset to ea
        lxi     d,prgrq         ;de <- point to base of text
        dadd    ea,d            ;add offset
        dmov    h,ea            ;de <- address of first character
        call    dtext           ;display
        ret pdsp1:  bit     2,modew         ;help mode?
        jre     pdsp2           ;no eqiw    hlptaw,0        ;help word timed out?
        ret                     ;no, ignore
```

```
            call    hlp1
            ret pdsp2:      eqiw    promptw,1       ;frequency display?
            jre     pdsp3           ;no oniw    hzw,80h         ;50 or 60 hz?
            lxi     h,ttbl+8        ;hl <- point to 60 Hz text
            lxi     h,ttbl          ;hl <- point to 50 Hz text
            call    dtext           ;display text
            jre     ckblnk pdsp3:      eqiw    promptw,2       ;type display?
            jre     pdsp4 lxi     h,typetbl       ;hl <- point to type text
            ldaw    typew           ;a <- type
ldtxt:      mvi     b,8             ;b <- number of bytes of text
            mul     b               ;ea <- offset to text
            dadd    ea,h            ;ea <- pointing to text
            dmov    h,ea            ;move to de
            call    dtext           ;display text
            jre     ckblnk pdsp4:      lxi     h,cfgtbl        ;hl <- point to configuration text
            ldaw    cfgw            ;a <- configuration
            jre     ldtxt ckblnk:     bit     2,ssecw         ;time to blink?
            jre     blnk            ;no
            eqiw    lkeyw,0         ;any key presses?
            jre     blnk            ;yes
            ori     pb,1            ;hit the blank pin
            ret blnk:       ani     pb,11111110b    ;turn off blank
            ret ; executive:   DWS
; function:    Recharge on demand.

DWS:        call    wait60          ;wait for line cycle
            call    tone            ;update beeper
            call    dsply           ;update display
            call    gks             ;get keys
            call    key             ;process keys
            call    status          ;check mode
            call    alarm           ;check for alarms
            call    clock           ;update clock
            jre     dws             ;continue neiw    maxdayw,0       ;maxdays to start = 0?
            jre     dwsrg           ;yes lxi     h,maxday        ;hl <- point to maxday
            mvi     c,0
            call    decbcd          ;decrement maxdays to start
```

```
        jre     dwsrg               ;underflow!
        neiw    maxdayw,0           ;maxdays to start = 0?
        jre     dwsrg               ;yes ;       today's usage greater than two times 1 week ago?

lhld    day7+2              ;hl <- day7 high word
        dmov    ea,h                ;ea <- day7 high word
        lhld    day7                ;hl <- day7 low word
        call    sl32                ;multiply day7 by 2 lded    day0                ;de <- day0 low word
        lbcd    day0+2               ;bc <- day0 high word
        call    sub32               ;subtract 2*day7 - day0
        sk      cy                  ;borrow?
        jre     dwswav              ;no ;       High flow day!

lbcd    day0+2              ;bc <- today's usage high word
        lded    day0                ;de <- today's usage low word
        jre     antcp               ;use today's usage as tommorows anticipated ;       Compute weighted average dwswav: lhld    day0+2              ;hl <- today's usage high word
        dmov    ea,h                ;hl <- today's usage high word
        lhld    day0                ;hl <- today's usage low word
        call    sl32                ;double for weighted average push    h                   ;save accumulator
        push    ea
        aviw    lpcntw,6            ;loop counter for add loop
        lxi     h,day7              ;hl <- point to day7
avlp:   ldeax   h++                 ;ea <- low word
        dmov    d,ea                ;de <- low word
        ldeax   h++                 ;ea <- high word
        dmov    b,ea                ;bc <- high word
        shld    addr                ;store pointer
        pop     ea                  ;pop accumulator high word
        pop     h                   ;pop accumulator low word
        call    add32               ;add this day's usage
        neiw    lpcntw,0            ;end of week?
        jre     endav               ;yes dcrw    lpcntw              ;decrement loop counter
        push    h                   ;save accumulator
        push    ea
        lhld    addr                ;hl <- address
        jre     avlp endav:  lbcd    day6+2              ;bc <- day6 high word
        lded    day6                ;de <- day6 low word
        call    add32               ;day6 has a weight of 2 lxi     d,10                ;divide by 10 (total of weights)
        call    div32               ;divide
        call    rnd32               ;round
```

```
        shld    wavg                ;store weighted average
        dmov    d,ea                ;hl <- high word
        sded    wavg+2              ;store weighted average
        push    ea                  ;save
        push    h ;       Compute 1.2 * weighted average lxi     d,10                ;de <- 10
        call    div32               ;divide by 10
        call    rnd32               ;round
        call    sl32                ;multiply by 2
        dmov    b,ea                ;bc <- high word weighted average * .2
        dmov    ea,h                ;ea <- low word weighted average * .2
        dmov    d,ea                ;de <- low word weighted average * .2
        pop     h                   ;pop weighted average
        pop     ea
        call    add32               ;add wavg + .2 * wavg = 1.2 * wavg
        dmov    b,ea                ;bc <- high word weighted average
        dmov    ea,h                ;ea <- low word weighted average
        dmov    d,ea                ;de <- low word weighted average antcp:  mov     a,vlra+3            ;a <- volrem 1st
        call    bcd2hx              ;convert to hex
        mov     a,vlra+2            ;a <- volrem 2nd
        call    nx2hx
        mov     a,vlra+1            ;a <- volrem 3rd
        call    nx2hx
        mov     a,vlra              ;a <- volrem 4th
        call    nx2hx
        call    sub32               ;volume remain - anticipated usage
        skn     cy                  ;anticipated usage greater than volume remain?
dwsrg:  call    autorg              ;yes, regenerate ;       Today's usage less than 10% of last week?

lhld    day7+2              ;hl <- day7 high word
        dmov    ea,h                ;ea <- day7 high word
        lhld    day7                ;hl <- day7 low word
        lxi     d,10                ;de <- 10
        call    div32               ;ea,hl <- 10% of day7
        call    rnd32               ;round result
        lbcd    day0+2              ;bc <- day0 high word
        lded    day0                ;de <- day0 low word
        call    sub32               ;.1 * day7 - day0
        skn     cy                  ;borrow?
        jre     notoss              ;yes, day0 is bigger inrw    tossw               ;increment tossdays
        ltiw    tossw,14            ;less than 14?
        jre     shft                ;yes, normal shift lhld    wavg                ;hl <- weighted average low word
        shld    day0                ;store in day0
        lhld    wavg+2              ;hl <- weighted average high word
        shld    day0+2              ;store in day0+2
        jre     shft
```

```
        notoss:  aviw    tossw,0             ;clear tossdays
        shft:    lxi     h,day6              ;hl <- address of day6
                 lxi     d,day7              ;de <- address of day7
                 mvi     c,27                ;7 days, 2 words per day
                 block                       ;shift daily buffers lxi     h,0                 ;clear hl
                 shld    day0                ;clear day0 buffer
                 shld    day0+2
                 call    average             ;compute new average for display
                 jmp     dws ; executive:    WBC
        ; function:     Sound alarms at designated setpoints.

WBC:     call    wait60              ;wait for line cycle
                 call    tone                ;update beeper
                 call    dsply               ;update display
                 call    gks                 ;get keys
                 call    key                 ;process keys
                 call    alarm               ;check for alarms
                 call    clock               ;update clock
                 jre     wbc mvi     c,3                 ;# of bytes - 1
                 call    is_d2_0             ;days to alarm 2 already = 0?
                 jre     wbc                 ;yes lxi     h,dalm2             ;hl <- point to dalm1
                 mvi     c,3
                 call    decbcd              ;decrement days to alarm 2
                 jre     alrm2               ;underflow!

mvi     c,3                 ;# of bytes - 1
                 call    is_d2_0             ;days to alarm 2 = 0?
                 jre     alrm2               ;yes mvi     c,3                 ;# of bytes - 1
                 call    is_d1_0             ;days to alarm 1 = 0?
                 jre     wbc                 ;yes lxi     h,dalm1             ;hl <- point to dalm1
                 mvi     c,3
                 call    decbcd              ;decrement days to alarm 1
                 jre     alrm1               ;underflow!

mvi     c,3                 ;# of bytes - 1
                 call    testd1              ;days to alarm 1 = 0?
                 jre     wbc                 ;no alrm1:   offiw   alnusw,00000011b    ;alarm 2 or 1 already on? (flow)
                 jre     wbc                 ;yes ;        turn alarm 1 oriw    alnuow,00000001b    ;set alarm 1
                 aniw    statw,11110111b     ;reset audible off
```

```
            ori     pa,04h          ;turn on output A
            jre     wbc alrm2:      aniw    alnumw,11111110b;reset alarm 1
            offiw   alnumw,00000010b;alarm 2 already on? (flow)
            jre     wbc             ;yes ;           turn on alarm 2 oriw    alnumw,00000010b;set alarm 2
            aniw    statw,11110111b ;reset silenced
            ori     pa,00000010b    ;turn on output B
            ani     pa,11111011b    ;turn off output A
            jre     wbc ; executive: VOL0
; function:  Recharge when volume remaining is zero.

VOL0:       call    wait60          ;wait for line cycle
            call    tone            ;update beeper
            call    dsply           ;update display
            call    gks             ;get keys
            call    key             ;process keys
            call    status          ;check mode
            call    alarm           ;check for alarms
            call    clock           ;update clock
            nop
            avi     c,3
            call    is_vl_0         ;volume remain = 0?
            call    autorg          ;yes, regenerate
            jre     vol0

; executive: DLYV0
; function:  Recharge at designated time if volume remain is zero.

DLYV0:      call    wait60          ;wait for line cycle
            call    tone            ;update beeper
            call    dsply           ;update display
            call    gks             ;get keys
            call    key             ;process keys
            call    status          ;check mode
            call    alarm           ;check for alarms
            call    clock           ;update clock
            jre     dlyv0 avi     c,3
            call    is_vl_0         ;volume remain = 0?
            call    autorg          ;yes, regenerate
            jre     dlyv0

; executive: TIME
; function:  Recharge at specified time.

TIME:       call    wait60          ;wait for line cycle
```

```
           call    tone            ;update beeper
           call    dsply           ;update display
           call    gks             ;get keys
           call    key             ;process keys
           call    status          ;check mode
           call    alarm           ;check for alarms
           call    clock           ;update clock
           jre     time neiw    maxdayw,0       ;maxdays = 0?
           jre     tim1            ;yes offiw   flagw,00010000b ;standby?
           jre     time            ;yes, do not decrement days remaining lxi     h,maxday        ;hl <- address of maxdays
           mvi     c,0             ;# of bytes - 1
           call    decbcd          ;decrement max days
           jre     tim1            ;underflow!

neiw    maxdayw,0       ;maxdays = 0?
tim1:      call    autorg          ;yes, regenerate
           jre     time ; executive:   CLNDR
; function:    Recharge on specified days at specified time.

CLNDR:     call    wait60          ;wait for line cycle
           call    tone            ;update beeper
           call    dsply           ;update display
           call    gks             ;get keys
           call    key             ;process keys
           call    status          ;check mode
           call    alarm           ;check for alarms
           call    clock           ;update clock
           jre     clndr offiw   flagw,00010000b ;standby?
           jre     clndr           ;yes, do not recharge ldaw    dayw            ;a <- day mask
           offaw   stdayw          ;today a start day?
           call    autorg          ;yes, regenerate
           jre     clndr ; executive:   CNTDN
; function:    Recharge after count down.

CNTDN:     call    wait60          ;wait for line cycle
           call    tone            ;update beeper
           call    dsply           ;update display
           call    gks             ;get keys
           call    key             ;process keys
           call    status          ;check mode
           call    alarm           ;check for alarms
           call    clock           ;update clock
           nop
```

```
        offiw   modew,01000000b  ;out of phase?
        jre     cntdn            ;yes, do not count down offiw   flagw,00010000b  ;standby?
        jre     cntdn            ;yes, do not count down mvi     c,1              ;# of bytes - 1
        call    testcnt          ;minutes zero?
        jre     deccnt
        jre     cnt1 deccnt: dcrw    cntcyw           ;decrement 1/60th second counter
        jre     cntdn mviw    cntcyw,59        ;refresh counter
        dcrw    cntsw            ;decrement second counter
        jre     cntdn mviw    cntsw,59         ;refresh counter
        lxi     h,cntmn          ;hl <- cntmn address
        mvi     c,1              ;# of bytes - 1
        call    decbcd           ;decrement minute counter
        jre     cnt1             ;underflow!
        mvi     c,1              ;# of bytes - 1
        call    testcnt          ;0?
        jre     cntdn            ;no cnt1:   call    autorg           ;yes, regenerate
        jre     cntdn ; executive:    SGNAL
; function:     Recharge when signaled externally.

SGNAL:  call    wait60           ;wait for line cycle
        call    tone             ;update beeper
        call    dsply            ;update display
        call    gks              ;get keys
        call    key              ;process keys
        call    status           ;check mode
        call    alarm            ;check for alarms
        call    clock            ;update clock
        nop offiw   modew,40h        ;phasing?
        jre     sgnal            ;yes, ignore signal mov     a,cr3            ;a <- external regenerate signal
        gti     a,128            ;exist?
        jre     sggood           ;signal aniw    beepw,01111111b  ;reset debounced flag
        aniw    alnuaw,10111111b ;reset stuck alarm
        call    refsg            ;refresh debounce timers
        jre     sgnal sggood: dcrw    sgcycw           ;decrement 1/60th second counter
        jre     sgnal
```

```
            mvi     c,1
            call    testsg          ;signal debounced?
            jre     sg2
            jre     sg1             ;yes sg2:        mviw    sgcycw,59       ;refresh counter
            dcrw    sgsecw          ;decrement second counter
            jre     sgnal mviw    sgsecw,59       ;refresh counter
            lxi     h,cntsg         ;hl <- cntsg address
            mvi     c,1             ;# of bytes - 1
            call    decbcd          ;decrement minute counter
            jre     sg1             ;underflow!
            mvi     c,1             ;# of bytes - 1
            call    testsg          ;0?
            jre     sgnal           ;no sg1:        offiw   beepw,80h       ;same signal
            jre     stuck           ;yes
            oriw    beepw,80h       ;set input debounced
            call    autorg          ;yes, regenerate
            jre     sgnal stuck:      offiw   alnuaw,01000010b;alarm 2 or 7 already on?
            jre     sgnal
            offiw   modew,01000000b ;phase?
            jre     sgnal           ;yes, hold off on alarm
            oriw    alnuaw,01000000b;set stuck signal alarm
            aniw    statw,11110111b ;reset silenced
            jre     sgnal ; subroutine:   WAIT60
; function:     Wait for line cycle, if 10 millisecond timer times
;               to 100 msec, turn off stuff. Update segment and digits
;               on display.
; destroyed:    all WAIT60: ori     pa,00100000b    ;punch doggie high
wait:   sknit   f1              ;line cycle?
        jre     gdline          ;yes gtiw    w60taw,2        ;30 msec gone by?
        jre     wait            ;no call    off             ;power down gdline: ani     pa,11011111b    ;hit doggie low, where it counts
        mviw    w60taw,0        ;reset 100 msec counter
        call    xseg            ;translate ascii to segments and send
        call    com             ;process any communications
        ret ; subroutine:   OFF
; function:     Enter halt mode, keep track of flow and time.
;               Exit when line comes back.
; destroyed:    all
```

```
OFF:    ori     mkh,00000010b       ;mask serial recieve
        ori     pa,00010000b        ;disable RS-422 power
        ori     pb,00000001b        ;blank display
        ani     mkl,00110101b       ;unmask INTEIN, INTEI, INT1 and INTT0
        ori     tmm,00000011b       ;disable flip flop
        ani     pa,11111000b        ;turn off outputs A, B, & C
        call    clrsong             ;clear beeps
        oriw    statw,40h           ;set battery mode
halt:   hlt                         ;halt, save power
        xri     pa,00100000b        ;pulse watchdog offiw   statw,40h           ;still in battery mode?
        jre     halt                ;yes ori     mkl,00001000b       ;mask INT1
        ani     mkh,00000101b       ;unmask serial recieve
        ani     pb,11111110b        ;unblank display
        ani     pa,11101111b        ;enable RS-422 power
        ret ; subroutine:  dsply
; function:    Update dsplylay.  Priority is as follows:
;              1 recharge
;              2 phase
;              3 help
;              4 program (set) mode
;              5a alarm        5b lockout
;              6a standby      6b hold
;
;              5a & 6a are displayed during the 5th & 6th sec.
;              5b & 6b are on during the 7th & 8th sec.
; destroyed:   all dsply:  bit     0,modew             ;regenerating?
        jre     dsp1                ;no eqiw    rcycw,7             ;brine?
        jre     dispcyc bit     2,secw              ;check for time for alternating displays
        jre     dbrn                ;not time bit     1,secw              ;6th or 7th second?
        jre     db1                 ;no, 4th or 5th lxi     h,brntxt            ;display 'DELAY '
        call    dtext
        ret db1:    offiw   modew,01000000b     ;phase?
        jre     dsp1                ;yes dbrn:   lhld    rgmin               ;display brine minute timer
        mvi     c,3
        call    dpack               ;place in dbuf
        ret

;       CYC # XX
```

```
dispcyc: aniw    modew,11111011b    ;disable help mode
         ldaw    rgminw             ;a <- cycle minutes remaining
         lxi     ea,0               ;clear ea and hl
         lxi     h,0
         mov     l,a                ;l <- cycle minutes remaining
         mvi     c,2                ;number of digits
         call    dpack              ;put packed BCD numbers in dbuf
         ldaw    rcycw              ;a <- load recharge cycle
         dcr     a
         call    dcyc               ;put CYC # in dbuf
         ret dsp1:    bit     6,modew            ;phasing?
         jre     dsp2               ;no

;        *PHASE* lxi     h,phs              ;de <- point to phase text
         call    dtext              ;place text in dbuf
         ret dsp2:    bit     2,modew            ;help mode?
         jre     dsp3               ;no

;        HELP eqiw    hlptmw,0           ;help word timed out?
         ret                        ;no, ignore call    hlp1
         ret dsp3:    mviw    hlpdw,0            ;reset help word pointer
         bit     1,modew            ;programming?
         jre     dsp4               ;no call    dfill              ;fill dbuf
         bit     2,ssecw            ;time to blink?
         ret                        ;no ;        Blank cursor positions lxi     h,dbuf             ;hl <- point to dbuf
         ldaw    cursrw             ;a <- cursor mask
         mov     c,a                ;c <- cursor mask
         mvi     b,0                ;b <- digit pointer
         mvi     a,' '              ;a <- space dsp4a:   offi    c,80h              ;cursor here?
         stax    h+b                ;yes, substitute blank
         sll     c                  ;shift next position to test
         inr     b                  ;decrement digit counter
         eqi     b,8
         jre     dsp4a
         ret dsp4:    bit     2,secw             ;check for time for alternating displays
         jre     cfill              ;not time
```

```
        bit     1,secw          ;6th or 7th second?
        jre     dsp6            ;no, 4th or 5th bit     2,flagw         ;lockout?
        jre     dsp5            ;no

;       LOCKOUT lxi     h,lck           ;de <- address of lockout text
        call    dtext           ;display text
        ret dsp5:   bit     3,modew         ;hold mode?
        jre     cfill           ;no, normal display

;       ON HOLD lxi     h,hld           ;de <- point to on hold text
        call    dtext           ;load text into dbuf
        ret dsp6:   neiw    alnumw,0        ;alarms?
        jre     dsp8            ;no

;       ALARM*#* lxi     d,8             ;de <- length of display
        lxi     ea,ala          ;ea <- point to base of alarm text
        ldaw    alnumw          ;a <- alarm buffer
        mvi     c,7 dsp7:   offi    a,01h           ;this alarm on?
        jre     dalm            ;yes, display
        slr     a               ;next position
        dadd    ea,d            ;add 8 to text pointer
        dcr     c
        jre     dsp7            ;try again dalm:   dmov    h,ea            ;de <- point to alarm text
        call    dtext           ;move text into dbuf
        ret dsp8:   bit     4,flagw         ;standby?
        jre     cfill           ;no

;       STANBY lxi     h,stnd          ;de <- point to standby text
        call    dtext           ;move text to dbuf
        ret cfill:  call    dfill           ;normal display, fill dbuf
        ret ; subroutine:   dfill
; function:     Fill dbuf with correct characters.
; destroyed:    all
```

```
dfill:  ldaw    dispw               ;a <- display number
        mov     b,a                 ;b <- display number
        sll     a                   ;a <- a *2
        add     a,b                 ;a <- display number * 3
        lxi     ea,ftbl             ;ea <- base address of fill jump table
        eadd    ea,a                ;add offset
        jea                         ;jump!

ftbl:   jmp     dfill0
        jmp     dfill1
        jmp     dfill2
        jmp     dfill3
        jmp     dfill4
        jmp     dfill5
        jmp     dfill6
        jmp     dfill7
        jmp     dfill8
        jmp     dfpct
        jmp     dfcnt               ;10
        jmp     dfill9
        jmp     dfillfl             ;flow rate enable
        jmp     dftrp
        jmp     dfill10
        jmp     dfill11             ;15
        jmp     dfill12
        jmp     dfill13
        jmp     dfill14
        jmp     dfill15
        jmp     dfill16             ;20
        jmp     dfill17
        jmp     dfill18
        jmp     dftotal
        jmp     dfill19
        jmp     dfpsg               ;25
        jmp     dfsg
        jmp     dfill20

;       time / flow rate display dfill0: bit     6,beepw             ;flow display with time enabled?
        jre     f0b                 ;no offiw   modew,00000010b     ;programming mode?
        jre     f0b                 ;yes ldaw    secw                ;a <- sec
        ani     a,0fh               ;strip upper digit
        gti     a,8-1               ;8th or 9th second?
        jre     f0b                 ;no lxi     d,dbuf              ;de <- point to 7th digit
        mvi     a,' '               ;a <- space
        stax    d+                  ;place space there lxi     h,dflw+2            ;hl <- address of flow rate
        mvi     c,2                 ;c <- number of digits
f0a:    ldax    h-                  ;a <- digit
        eqi     a,' '               ;is it a space
```

```
                adi     a,'0'           ;no, convert number to ascii
                stax    d+              ;store
                dcr     c               ;next digit
                jre     f0a mvi     a,'/'           ;a <- '/'
                stax    d+              ;store
                mvi     a,'M'           ;a <- 'M'
                stax    d+              ;store
                mvi     a,'I'           ;a <- 'I'
                stax    d+              ;store
                mvi     a,'N'           ;a <- 'N'
                stax    d               ;store
                ret f0b:            lxi     h,hour          ;hl <- address of hour
dfill1:         lxi     h,strt+1        ;hl <- address of start time
dfill3:         lxi     h,almtm+1       ;hl <- address of alarm time
                call    dtime           ;display time
                ret ;       Alarm mode dfill2:         offiw   statw,04h       ;delay?
                jre     adly            ;yes offiw   statw,01h       ;silent?
                lxi     h,slntxt        ;hl <- address of silent text
                lxi     h,instxt        ;hl <- address of instant text
adly:           lxi     h,dlytxt        ;hl <- address of delay text
                call    dtext           ;load text into dbuf
                ret ;       Start days dfill4:         ldaw    stdayw          ;a <- start days mask
                mov     b,a             ;b <- start days mask
                mvi     c,6
                lxi     h,week          ;hl <- address of SMTWTFS text
                lxi     d,dbuf          ;de <- address of digit 0 f4:             ldax    h+              ;a <- character representing day of week
                sll     b               ;shift to next day
                sk      cy              ;day selected?
                mvi     a,'_'           ;no, replace with underline
                stax    d+              ;put letter or underline in dbuf
                dcr     c               ;next day
                jre     f4 mvi     a,' '           ;a <- space
                stax    d               ;store space in last digit
                ret ;       Interval days & Max days to start dfill5:         ldaw    intdayw         ;a <- interval days
                jre     f5
dfill6:         ldaw    maxdayw         ;hl <- address of number of max days to start
```

```
f5:      lxi     ea,0            ;clear ea
         lxi     h,0             ;clear hl
         mov     l,a             ;move number into l
         mvi     c,2             ;number of digits
         call    dpack           ;put packed BCD numbers in dbuf
         ret
```

; Desired Volume & Water batching volume displays

```
dfill13:lxi     h,dvalm1        ;hl <- base address of desired vol to alarm 1
dfill14:lxi     h,dvalm2        ;hl <- base address of desired vol to alarm 2
dfill17:lxi     h,valm1         ;hl <- base address of vol to alarm 1
dfill18:lxi     h,valm2         ;hl <- base address of vol to alarm 2
        dmov    ea,h
        dmov    d,ea
        call    pkeahl          ;place packed BCD into ea,hl
        mvi     c,5             ;number of digits
        call    dpack           ;put packed BCD numbers in dbuf
        ret
```

; Preset volume, volume remain, & average daily usage

```
dfill9: lxi     h,davg          ;hl <- address of number of average usage
dfill7: lxi     h,prevol        ;hl <- address of number of desired volume
f8b:    lxi     h,vlrm          ;hl <- address of volume remain
        dmov    ea,h
        dmov    d,ea
        call    pkeahl          ;place packed BCD into ea,hl
        mvi     c,7             ;number of digits
        call    dpack           ;put packed BCD numbers in dbuf
        ret
```

; Volume remaining / flow rate

```
dfill8: ldaw    secw            ;a <- sec
        ani     a,0fh           ;strip upper digit
        gti     a,8-1           ;8th or 9th second?
        jre     f8b             ;no lxi     d,dbuf          ;de <- point to 7th digit
        mvi     a,' '           ;a <- space
        stax    d+              ;place space there lxi     h,dflw+2        ;hl <- address of flow rate
        mvi     c,2             ;c <- number of digits
f8a:    ldax    h-              ;a <- digit
        eqi     a,' '           ;is it a space
        adi     a,'0'           ;no, convert number to ascii
        stax    d+              ;store
        dcr     c               ;next digit
        jre     f8a mvi     a,'/'           ;a <- '/'
        stax    d+              ;store
        mvi     a,'M'           ;a <- 'M'
        stax    d+              ;store
        mvi     a,'I'           ;a <- 'I'
```

```
            stax    d+              ;store
            mvi     a,'N'           ;a <- 'N'
            stax    d               ;store
            ret ;       Display either active state or countdown dfsg:       ldaw    secw            ;a <- sec
            ani     a,0fh           ;strip upper digit
            gti     a,8-1           ;8th or 9th second?
            jmp     dfsg1           ;no mov     a,cr3           ;a <- external regenerate signal
            lti     a,128           ;exist?
            lxi     h,inactv        ;no
            lxi     h,active        ;preload pointer in de
            call    dtext           ;display text
            ret ;       Flow rate with time enable dfillfl:bit         6,beepw         ;flow rate with time enabled?
            lxi     h,flwno         ;hl <- address of disabled text
            lxi     h,flwyes        ;hl <- address of enabled text
            call    dtext           ;load text into dbuf
            ret ;       Cycle dfill10:ldaw        dspcycw         ;a <- cycle number on display
            lxi     h,cyc1          ;hl <- point to cycle times base
            ldax    h+a             ;ea <- cycle time for this cycle
            mov     b,a             ;b <- temp
            ani     a,00001111b     ;strip upper digit
            adi     a,'0'           ;convert to ascii
            mov     dbuf+7,a        ;place in digit 7
            mov     a,b             ;get upper digit
            call    hilo            ;shift
            adi     a,'0'           ;convert to ascii
            mov     dbuf+6,a        ;place in digit 7 ldaw    dspcycw         ;a <- cycle number on display
            call    dcyc            ;display CYC #
            ret ;       Water batching day displays and others dftrp:      lxi     h,trippt        ;hl <- base address of trip point (progressive)
dfsg1:      lxi     h,cntsg         ;hl <- base address of signal debounce
dfpsg:      lxi     h,pcntsg        ;hl <- base address of signal preset debounce
dfill111:lxi        h,ddalm1        ;hl <- base address of desired days to alarm 1
dfill112:lxi        h,ddalm2        ;hl <- base address of desired days to alarm 2
dfill115:lxi        h,dalm1         ;hl <- base address of days to alarm 1
dfill116:lxi        h,dalm2         ;hl <- base address of days to alarm 2
dfill119:lxi        h,brndly        ;hl <- base address of brine delay
            dmov    ea,h
            dmov    d,ea
            call    pkeahl          ;place packed BCD into ea,hl
```

```
            mvi     c,3             ;number of digits
            call    dpack           ;put packed BCD numbers in dbuf
            ret ;       Meter factor and count down dfpct:      lxi     h,pcntmn        ;hl <- base address of preset count down minute
dfcnt:      lxi     h,cntmn         ;hl <- base address of count down minute
dfil120:    lxi     h,mfctr         ;de <- address of meter factor
            dmov    ea,h
            dmov    d,ea
            call    pkeahl          ;place packed BCD into ea,hl
            mvi     c,4
            call    dpack           ;put packed BCD numbers in dbuf
            ret ;       Totalized flow dftotal:    mov     a,total+3       ;convert total flow to BCD for display
            call    hx2bcd
            mov     a,total+2
            call    nx2bcd
            mov     a,total+1
            call    nx2bcd
            mov     a,total
            call    nx2bcd          ;ea,hl <- total flow [packed BCD]
            mvi     c,8             ;8 digits
            call    dpack
            ret ; subroutine:  DTEXT
; function:    Place text pointed to by HL into dbuf.
; destroyed:   de,hl,c DTEXT:      lxi     d,dbuf          ;hl <- address of dbuf
            mvi     c,7             ;c <- digit coutner
            block                   ;transfer
            ret ; subroutine:  PKEAHL
; function:    Move 4 byte packed BCD number pointed to by de to ea,hl
; on exit:     ea,hl <- packed BCD number
; destroyed:   ea,hl,de PKEAHL:     ldeax   d++             ;ea <- lower 4 digits
            dmov    h,ea            ;hl <- lower 4 digits
            ldeax   d               ;ea <- upper 4 digits
            ret ; subroutine:  DPACK
; function:    Unpack BCD number and convert to ascii and place in dbuf.
; on entry:    ea,hl <- packed BCD number, c <- number of digits
; destroyed:   all DPACK:      lxi     d,dbuf+7        ;de <- point to digit 7 in dbuf
            mvi     b,7             ;space counter
```

```
mov     a,l             ;get seventh digit (LSB)
ani     a,0fh           ;strip off sixth digit
adi     a,'0'           ;make it ascii
stax    d-              ;store in buffer
dcr     b               ;decrement number of spaces
dcr     c               ;decrement number of digits
nei     c,0             ;all digits displayed?
jre     fillsp          ;fill the reset with spaces mov     a,l             ;get seventh digit
call    hilo            ;shift sixth digit
adi     a,'0'           ;make it ascii
stax    d-              ;store in buffer
dcr     b               ;decrement number of spaces
dcr     c               ;decrement number of digits
nei     c,0             ;all digits displayed?
jre     fillsp          ;fill the reset with spaces mov     a,h             ;get fifth digit
ani     a,0fh           ;strip fourth digit
adi     a,'0'           ;make it ascii
stax    d-              ;store in buffer
dcr     b               ;decrement number of spaces
dcr     c               ;decrement number of digits
nei     c,0             ;all digits displayed?
jre     fillsp          ;fill the reset with spaces mov     a,h             ;get fourth digit
call    hilo            ;shift fourth digit
adi     a,'0'           ;make it ascii
stax    d-              ;store in buffer
dcr     b               ;decrement number of spaces
dcr     c               ;decrement number of digits
nei     c,0             ;all digits displayed?
jre     fillsp          ;fill the reset with spaces mov     a,eal           ;get third digit
ani     a,0fh           ;strip off second digit
adi     a,'0'           ;make it ascii
stax    d-              ;store in buffer
dcr     b               ;decrement number of spaces
dcr     c               ;decrement number of digits
nei     c,0             ;all digits displayed?
jre     fillsp          ;fill the reset with spaces mov     a,eal           ;get second digit
call    hilo            ;shift second digit
adi     a,'0'           ;make it ascii
stax    d-              ;store in buffer
dcr     b               ;decrement number of spaces
dcr     c               ;decrement number of digits
nei     c,0             ;all digits displayed?
jre     fillsp          ;fill the reset with spaces mov     a,eah           ;get first digit
ani     a,0fh           ;strip off zeroth digit
adi     a,'0'           ;make it ascii
stax    d-              ;store in buffer
dcr     b               ;decrement number of spaces
```

```
            dcr     c               ;decrement number of digits
            nei     c,0             ;all digits displayed?
            jre     fillsp          ;fill the reset with spaces mov     a,eah           ;get zeroth digit
            call    hilo            ;shift zeroth digit
            adi     a,'0'           ;make it ascii
            stax    d               ;store in buffer
            jre     ckpb            ;fill the reset with spaces fillsp: mvi     a,' '           ;a <- space
    stsp:   stax    d-              ;blank for first digit
            dcr     b
            jr      stsp ;       Perform leading 0 blanking on digits
    ckpb:   offiw   modew,00000010b ;programming?
            ret                     ;yes, do not leading zero blank mvi     c,6             ;c <- blank counter
            lxi     d,dbuf          ;de <- point to 2nd digit
    uplp:   ldax    d               ;a <- digit
            lti     a,'1'           ;a <- 0 or space?
            ret                     ;no, get out mvi     a,' '           ;substitute a space
            stax    d+              ;store
            dcr     c               ;next digit
            jre     uplp
            ret ; subroutine:   DCYC
    ; function:     Display CYC # text.
    ; on entry:     a <- cycle number to display.
    ; destroyed:    all DCYC:   lxi     h,cyc           ;hl <- base address of cycle text
            lxi     d,dbuf          ;de <- point MSD of dbuf
            sll     a               ;multiply by 8 to get cycle offset
            sll     a
            sll     a
            mov     b,a
            mvi     c,5             ;number of characters - 1
    dcyc1:  ldax    h+b             ;first letter of text
            stax    d+              ;put digit in dbuf
            inr     b               ;point to next letter
            dcr     c               ;decrement character counter
            jre     dcyc1           ;continue
            ret ; subroutine:   DTIME
    ; function:     Display time and day of week (when appropiate).
    ; on entry:     hl <- address of hour MSD for time.
    ; destroyed:    all
```

```
DTIME:  lxi    d,dbuf+3          ;de <- point to hour position in dbuf
        bit    7,hzw             ;50Hz?
        jre    dtm2              ;no ;       display 50 hz time ldax   h                 ;a <- hour
        call   hilo              ;shift MSD of hour
        nei    a,0               ;leading zero?
        mvi    a,' '-'0'         ;yes, replace zero with a space
        adi    a,'0'             ;convert number to charcter
        stax   d+                ;store ldax   h-                ;a <- hour
        ani    a,00001111b       ;strip upper nibble
        adi    a,'0'             ;convert number to charcter
        stax   d+                ;store ldax   h                 ;a <- minute
        call   hilo              ;shift upper digit
        adi    a,'0'             ;convert number to charcter
        stax   d+                ;store ldax   h-                ;a <- minute
        ani    a,00001111b       ;strip upper nibble
        adi    a,'0'             ;convert number to charcter
        stax   d+                ;store mvi    a,' '             ;blank out AM/PM digit
        stax   d                 ;store
        jre    dtm3

;       display 60 hz time, hour first dtm2:   ldax   h-                ;a <- MSD of hour
        push   h                 ;save address of min
        call   bcd2hx            ;convert to hex
        mov    a,l               ;a <- hour (hex)
        mov    c,a               ;c <- hour (used for AM / PM display)
        mov    b,a               ;b <- hour (hex)
        lxi    h,hrtbl           ;hl <- base address of hour table
        sll    b                 ;double for 2 byte offset
        ldax   h+b               ;a <- MSD of hour
        stax   d+                ;store MSD of hour
        inr    b
        ldax   h+b               ;a <- LSD of hour
        stax   d+                ;store LSD of hour ;       place minute pop    h                 ;hl <- address of minute
        ldax   h                 ;a <- minute
        call   hilo              ;shift MSD to lower nibble
        adi    a,'0'             ;convert number to charcter
        stax   d+                ;store ldax   h                 ;reload minute
        ani    a,00001111b       ;strip off MSD
        adi    a,'0'             ;convert number to charcter
```

```
            stax    d+              ;store and point to AM / PM part of dbuf ;       Place A or P for AM / PM mov     a,c             ;a <- hour (hex)
            gti     a,12-1          ;past noon?
            mvi     a,'A'           ;no, morning
            mvi     a,'P'           ;afternoon
            stax    d               ;store in digit 0

;       Check if day of week is to be displayed.

dtm3:       lxi     d,dbuf          ;de <- address of digit 0
            eqiw    dispw,timed     ;time display?
            jre     dtm6 ldaw    dayw            ;a <- day mask
            mvi     b,6
dtm4:       offi    a,80h           ;day tester
            jre     dtm5            ;found day sll     a               ;shift for next day
            dcr     b               ;decrement counter
            jre     dtm4 dtm5:       lxi     h,daytbl        ;hl <- base daytbl
            sll     b               ;double for 2 byte offset
            ldax    h+b             ;a <- first character
            stax    d+              ;store
            inr     b               ;next character
            ldax    h+b             ;a <- second character
            stax    d+              ;store
            mvi     a,' '           ;space
            stax    d
            ret ;       no day of week dtm6:       mvi     a,' '           ;a <- space
            stax    d+              ;store
            stax    d+              ;store
            stax    d               ;store
            ret ; subroutine:   XSEG
; function:     Translate characters in dbuf into segment information
;               and send to display driver.
; destroyed:    all XSEG:       ;Find location (if any) of decimal point mviw    dpw,8           ;preload no decimal
            bit     0,modew         ;cycle on display?
            jre     nocyc           ; no
            bit     0,secw          ;even or odd second?
            jre     sndsg           ;even
            eqiw    rcycw,7         ;brine?
            mviw    dpw,5           ; no, place dp in digit 5 (from left)
            jre     sndsg           ; yes, no dp
```

```
nocyc:  ltiw    dispw,amoded    ;time, start time, alarm time on display?
        jre     ckmax           ; no
        mov     a,dbuf+7        ;a <- last digit
        gti     a,'A'-1         ;A or P?
        jre     ck50hz          ;no, do not place decimal point
dcm1:   mov     a,dbuf+6        ;next to last digit
        lti     a,'9'+1         ;number?
        jre     sndsg           ; no, not time
        gti     a,'0'-1         ;number?
        jre     sndsg           ; no, not time ltiw    dispw,stimed    ;start time or alarm time?
        jre     setdc           ;yes
        bit     0,secw          ;even or odd second?
        jre     sndsg           ;even setdc:  aviw    dpw,4           ;place decimal in digit 4 (from left)
        jre     sndsg           ;continue ck50hz: eqi     a,' '           ;space (50 Hz)?
        jre     sndsg           ; no
        bit     7,hzw           ;50 hz?
        jre     sndsg           ; no
        jre     dcm1            ; yes ckmax:  lxi     h,dbuf          ;point to buffer
        ldax    h+              ;a <- character
        eqi     a,'M'           ;character M?
        jre     sndsg           ;no
        ldax    h+              ;a <- character
        eqi     a,'A'           ;A?
        jre     sndsg
        ldax    h               ;a <- next character
        eqi     a,'X'           ;X?
        jre     sndsg
        aviw    dpw,2           ;dp in digit 2 position (from left)

sndsg:  lxi     d,1000h         ;de <- dp mask
        mvi     b,7             ;c <- characters to translate
xlp:    lxi     h,dbuf          ;hl <- point to characters in dbuf
        ldax    h+b             ;a <- character
        sui     a,' '           ;get offset in letter table
        sll     a               ;double offset for word
        lxi     h,sgtbl         ;hl <- base address for letter segments
        ldeax   h+a             ;ea <- segment info
        mov     a,b             ;a <- digit position
        neaw    dpw             ;dp in this position?
        dor     ea,d            ; yes, set dp on ori     pc,10000000b    ;set DEN high
        lxi     h,digtbl        ;hl <- base of digit mask
        ldax    h+b             ;a <- digit mask ;       ea contains segment info, a contains digit mask, shift 24 bits mvi     c,23            ;segment transfer counter
sglp:   sll     a               ;rotate digit mask left into carry
        drll    ea              ;rotate segment mask left into carry
        sk      cy              ;segment high?
        jre     lowseg          ;no
```

```
            ori     pf,01000000b    ;yes, set DATA high
            ori     pf,10000000b    ;set CLOCK
            ani     pf,01111111b    ;reset CLOCK
            dcr     c
            jre     sglp
            jre     decdig lowseg: ani     pf,10111111b    ;set DATA low
            ori     pf,10000000b    ;set CLOCK
            ani     pf,01111111b    ;reset CLOCK
            dcr     c
            jre     sglp decdig: ani     pc,01111111b    ;reset DEN to low
            dcr     b               ;next digit
            jre     xlp             ;continue ori     pc,10000000b    ;set DEN high
            ani     pf,10111111b    ;set DATA low
            mvi     c,23            ;loop
offdglp:    ori     pf,10000000b    ;set CLOCK
            ani     pf,01111111b    ;reset CLOCK
            dcr     c
            jre     offdglp
            ani     pc,01111111b    ;reset DEN to low
            ret ; subroutine:  TONE
; function:    Outputs correct frequency for specified length of time.
;              If note = 0,1,2 then it is a control note with following action
;              0 - end of song   1 - pause   2 - wrap to beginning
; destroyed:   all TONE:   offiw   beepw,00000010b ;is the beeper active?
            ret                     ; yes, return lxi     h,song          ;hl <- base address of notes and lengths
            ldaw    notew           ;grab current note
            mov     b,a             ;store in b
            adi     a,3             ;add 3 to note pointer
            staw    notew           ;next note for next time
            ldax    h+b             ;get frequency or dummy parameter
            gti     a,2             ;a control note?
            jre     cntr            ; yes, process mov     tm1,a           ;and store in tm1
            inr     b               ;b points to length of tone
            ldeax   h+b             ;ea <- length
            lxi     d,beepctr       ;get location of beepctr
            steax   d               ;store duration oriw    beepw,00000010b ;set beeper active
            ani     tmm,11111101b   ;timer ff at tm1
            ret cntr:   eqi     a,0             ;Is this the day music died?
            jre     cntr1           ; no mvi     a,0             ; yes, sob, turn off this micro boom box
```

```
          stau    noteu              ;reset note pointer
          mov     song,a             ;wipe out first note so song is not replayed
          aniu    beepw,11111110b    ;reset wrap around flag
          ret cntr1:    eqi     a,1                ;time to shut up?
          jre     cntr2              ; no
          ori     tmm,00000011b      ;disable flip flop
          inr     b                  ;b points to length of tone
          ldeax   h+b
          lxi     d,beepctr          ;get location of beepctr
          steax   d                  ;store duration
          oriw    beepw,00000010b    ;set beeper active
          aniw    beepw,11111110b    ;reset wrap around flag
          ret cntr2:    mvi     a,0                ;a <- 0
          stau    noteu              ;reset note pointer and replay
          oriw    beepw,00000001b    ;wrap on flag
          jre     tone ; subroutine:  SHRTBP
; function:    Turn on beeper as a result of a key closure
; destroyed:   all SHRTBP:   lxi     h,shrt             ;source of music
          lxi     d,song             ;destination
          mvi     c,6-1              ;# of notes / 3 - 1
          block                      ;copy song into music buffer
          ret ; subroutine:  LONGBP
; function:    Turn on beeper as a result of a key closure
; destroyed:   all LONGBP:   lxi     h,long             ;source of music
          lxi     d,song             ;destination
          mvi     c,6-1              ;# of notes / 3 - 1
          block                      ;copy song into music buffer
          aniw    beepw,11111101b    ;reset beeper active
          mviw    noteu,0            ;start beeper over
          ret ; subroutine:  BADBP
; function:    Turn on beeper as a result of a illegal entry or lockout.
; destroyed:   all BADBP:    lxi     h,bad              ;source of music
          lxi     d,song             ;destination
          mvi     c,6-1              ;# of notes / 3 - 1
          block                      ;copy song into music buffer
          aniw    beepw,11111101b    ;reset beeper active
          mviw    noteu,0            ;start beeper over
          call    tone
          ret
```

```
; subroutine:   CLRSONG
; function:     Cancel the music.
; destroyed:    hl,de,c clrsong:lxi     h,end           ;copy control codes to end music
        lxi     d,song          ; into music buffer
        mvi     c,3-1
        block
        ret ; subroutine:   SND_AL
; function:     Turn beeper on because of alarm.
; destroyed:    hl,de,c snd_al: lxi     h,alsong        ;copy control codes to end music
        lxi     d,song          ; into music buffer
        mvi     c,6-1
        block
        ret ; subroutine:   CLOCK
; function:     Keep track of time.
; on exit:      Rets if time = start time.
; destroyed:    all CLOCK:  dcrw    debow           ;decrement debounce counter
        jre     clk1            ;onward
        mviw    debow,0         ;reset debounce counter to zero clk1:   dcrw    hlptsw          ;decrement help display timer
        jre     clk2
        mviw    hlptsw,0        ;reset to 0
clk2:;  call    decode          ;read keys##
;       eqi     a,st            ;set key##
;       jre     ck50            ;##

;       bit     1,mcdew         ;programming mode?##
;       jre     sc              ;no, speed up clock## ck50:   bit     7,hzw           ;50 Hz?
        mvi     a,60h           ;no
        mvi     a,50h           ;yes
        mov     c,a             ;c <- frequency
        lxi     h,ssec          ;hl <- address of ssec
        call    inc1            ;increment 1
        ret ;       add 1 second sc:     dcrw    prgtsw          ;decrement program mode timer
        jre     clk3
        mviw    prgtsw,0        ;reset to 0 clk3:   offiw   modew,01h       ;recharge in progress?
        call    rgclk           ;call regeneration clock clk4:   lxi     h,sec           ;hl <- point to seconds
        mvi     c,60h           ;a <- 60
```

```
            call    inc1            ;increment 1
            jre     ckcal

;       add 1 minute offiw   statw,40h       ;battery mode?
            jre     clk5            ;yes, do not process phase timer dcrw    phstmw          ;decrement phase timer
            jre     clk5
            mviw    phstmw,0        ;reset timer to 0 clk5:       lxi     h,min           ;hl <- point to minute
            mvi     c,60h           ;c <- 60
            call    inc1            ;increment 1
            jre     clk6

;       add 1 hour lxi     h,hour          ;hl <- point to hour
            mvi     c,24h           ;c <- 24
            call    inc1            ;increment 1
            jre     clk6

;       add 1 day call    iday            ;increment day of week
            call    sav_tf          ;update total flow in EEPROM ;       check if time = start time clk6:       lxi     h,strt          ;hl <- address of start time
            ldeax   h               ;ea <- start time
            lhld    min             ;hl <- current time
            deq     ea,h            ;equal?
            ret                     ;no
            rets                    ;yes!

;       check if it is time to update flow rate ckcal:      ldaw    secw            ;a <- sec
            ani     a,0fh           ;strip upper nibble
            eqi     a,8             ;eighth second?
            ret
            call    calflo          ;calculate flow rate
            ret ; subroutine:   GKS
; function:     Detect and debounce key closures.
; on exit:      ret if key debounced.  rets if not.
; destroyed:    all GKS:        offiw   modew,00000100b ;help mode?
            rets                    ;yes call    decode          ;read port lines
            eqi     a,0             ;any keys?
            jre     gk1             ;yes
```

```
;       No keys depressed, check for programming mode gk0:    mvi     a,0             ;sometimes redundant
        staw    lkeyw           ;store in last key
        aniw    flagw,11011111b ;reset auto/prog key already pressed
        bit     1,modew         ;programming?
        rets                    ;no eqiw    prgtmw,0        ;timed out?
        rets                    ;no
        mvi     a,prog          ;simulate program key depress
        staw    lkeyw           ;store
        ret ;       Key press!

gk1:    offiw   modew,02h       ;programming mode?
        aniw    alnumw,11101111b;yes, reset alarm 5 bit     1,statw         ;alarm on?
        jre     gk2             ;no
        oriw    statw,00001000b ;yes, set silenced flag
        call    offbp           ;turn off audibles gk2:    bit     0,modew         ;regenerating?
        jre     gk3             ;no nei     a,start         ;start key?
        jre     gk3             ;yes, step oni     a,st            ;set key?
        jre     gk0             ;no
        oni     a,typ           ;type key?
        jre     gk0             ;no
        jmp     scram           ;reset gk3:    mviw    prgtmw,119      ;reset program mode timer to 120 sec
        lxi     h,lkey          ;point to last key
        eqax    h               ;are they the same?
        jre     gk4             ;no ;       Same key is still pressed eqiw    debow,0         ;debounced yet?
        rets                    ;no
        ret                     ;yes, process key ;       New key, load proper debounce gk4:    staw    lkeyw           ;store new key
        nei     a,start         ;start key?
        jre     stk             ;yes
        nei     a,hold          ;hold key?
        mvi     a,120           ;yes, load 2 second debounce
        mvi     a,2+1           ;standard 33 msec debounce
stk:    mvi     a,180           ;3 second debounce
        staw    debow           ;store debounce
        rets
```

```
; subroutine:    DECODE
; function:      Strobe keys, place map in a.
; destroyed:     all DECODE:  ori      pc,00000100b     ;hit upper bank
         nop                       ;let lines settle
         nop
         nop
         mov      a,pb             ;a <- pb
         ani      pc,11111011b     ;unstrobe upper bank mvi      c,10             ;delay before strobing lower bank
dcdlp:   dcr      c
         jre      dcdlp
         ori      pc,00001000b     ;strobe lower bank
         ani      a,11110000b      ;wipe out low nibble
         mov      b,a              ;b <- upper bank
         mov      a,pb             ;a <- pb
         call     hilo             ;shift to lower nibble
         ora      a,b              ;a <- key map
         ani      pc,11110111b     ;unstrobe lower bank
         ret ; subroutine:    KEY
; function:      Process key.
; destroyed:     all KEY:     offiw    modew,01000000b  ;phasing?
         jre      ky2              ;yes, check start, set and type ldaw     lkeyw            ;a <- key map
         eqi      a,hold           ;auto-semi key?
         jre      ky1              ;no ;        Process Auto-Semi key neiw     typew,1          ;WBC?
         ret                       ;yes, ignore this key
         call     auto             ;process
         ret ky1:     oni      a,hlp            ;help key?
         jre      ky2              ;no ;        Process Help key ky1a:    call     help             ;HELP!
         ret ky2:     eqi      a,start          ;start-step key?
         jre      ky3              ;no ;        Process Start key neiw     typew,1          ;WBC?
         ret                       ;yes, ignore this key
         call     rginit           ;process
         ret
```

```
ky3:    mviw    debow,16            ;slew entry rate
        oni     a,st                ;set key?
        jre     ky5                 ;no ;       Set key depressed, Select too?

oni     a,slct              ;select?
        jre     ky3a

;       Reset all counters to preset values offiw   modew,01000000b     ;phasing?
        ret
        call    shrtbp              ;beep a little
        call    refvol              ;refresh volume remaining
        call    refday              ;refresh interval days
        call    refcnt              ;refresh count down timers if neccessary
        call    refsg               ;refresh signal debounce eqiw    typew,1             ;WBC?
        ret                         ;no
        call    refwbc              ;refresh water batching counters
        aniw    alnuaw,11111100b    ;reset alarms 1 and 2
        ret ky3a:   oni     a,typ               ;type & set keys?
        jre     ky4                 ;no scram:  mvi     a,0                 ;address zero
        lxi     ea,0ffffh           ;ea <- ffffh
        lxi     h,eeword            ;corrupt RAM
        steax   h
        call    ewen                ;enable EEPROM erase/write
        call    erase               ;erase old value
        call    write               ;write new value, corrupt EEPROM
        call    ewds                ;disable EEPROM erase/write
        jmp     puron               ;yes, Reprompt user for type, and configuration ;       Process Set key ky4:    offiw   modew,01000000b     ;phasing?
        ret                         ;yes
        call    set                 ;set digit
        ret ky5:    offiw   modew,01000000b     ;phasing?
;       ret                         ;yes
        nop
        eqi     a,slct              ;select?
        jre     ky6

;       Process Select key call    select
        ret ky6:    eqi     a,typ               ;type key?
        jre     ky7                 ;no ;       Process Type key
```

```
;       lxi     h,0ff00h
;       shld    dmpadr
;       mvi     a,ctlz
;       call    co
;       call    dumps
;       call    newln call    shrtbp
        call    dtype
        ret ky7:    eqi     a,prog          ;program key?
        jre     ky8             ;no ;       Process Program key call    prgm
        ret ky8:    eqi     a,nxt           ;next function key?
        ret                     ;no ;       Process Next function key call    nxtfn           ;point to next display
        bit     1,modew         ;programming?
        ret                     ;no
        mviw    cursrw,0        ;reset cursor
        call    selct           ;initialize cursor
        ret ; subroutine:   AUTO
; function:     Put controller in auto or semi-auto mode.
; destroyed:    all AUTO:   offiw   modew,00000111b ;help, regeneration or program mode?
        ret                     ;yes, ignore key offiw   flagw,00100000b ;this key still pressed
        ret                     ;yes, return oriw    flagw,00100000b ;set key pressed
        mviw    lkeyw,0         ;no slew entry for this key
        call    shrtbp          ;beep
        ldaw    modew           ;a <- mode
        xri     a,00001000b     ;invert hold mode
        staw    modew           ;store
        ret ; subroutine:   RGINIT
; function:     Check all parameters and execute start-step key.
; destroyed:    all RGINIT: mviw    lkeyw,0         ;no slew entry for this key
        mviw    alnumw,0        ;clear all alarms
        offiw   flagw,00100000b ;start key been cleared?
        ret                     ;no, ignore
```

```
         oriw    flagw,00100000b  ;set start key depressed flag
         bit     0,modew          ;regeneration already?
         jre     rg0              ;no call    incyc            ;increment regeneration cycle
         call    shrtbp           ;beep
         eqiw    rcycw,9          ;finished?
         ret                      ;no, continue with regeneration oriw    flagw,1          ;set recharge canceled by key
         aniw    modew,11111110b  ;reset regeneration flag
         neiw    maxdayw,0        ;maxdays = 0?
         aviw    maxdayw,1        ;reset maxdays to 1 mvi     c,3              ;number of bytes - 1
         call    testvol          ;vlrm = 0?
         jre     tcnt             ;no
         mvi     a,10h            ;yes, reset to ten
         mov     vlrm,a           ;store tcnt:    eqiw    typew,6          ;COUNT DOWN?
         ret aviw    dispw,cntd       ;set display to count down minutes
         mvi     c,1
         call    testcnt          ;zero?
         ret
         lxi     h,2              ;set minute timer to 2 minute
         shld    cntmn
         mviw    cntsw,59
         aviw    cntcyw,59
         ret rg0:     bit     2,flagw          ;lockout?
         jre     rg1              ;no aniw    flagw,11111011b  ;reset lockout flag
         aniw    modew,01111111b  ;reset request regeneration
         oriw    beepw,00100000b  ;set remove lockout condition
         call    badbp            ;beep shortly
         ret ;        Check for semi-auto, (auto initiate only)

autorg:  offiw   modew,00001000b  ;semi-auto mode?
         jre     rg2              ;yes rg1:     bit     1,modew          ;program mode?
         jre     rg3              ;no ;        Red Alert, set alarm 2 rg2:;    offiw   flagw,00000010b  ;Does the master say reg?
;        jre     rg3              ;yes!

offiw   alnumw,00000010b ;alarm already on?
         ret                      ;yes
         oriw    alnumw,00000010b ;turn it on
         aniw    statw,11110111b  ;reset silenced
         ret
```

```
rg3:      offiw    modew,01000000b   ;out of phase?
          ret                        ;yes, do not regenerate ;         Check for multiple tank operation neiw     cfgw,0            ;SINGLE TANK UNIT?
          jre      rgok              ;yes, regenerate eqiw     cfgw,1            ;ALTERNATING MASTER UNIT?
          jre      rgm1              ;no offiw    beepw,00001000b   ;any communication problems?
          jre      setlk             ;yes
          oniw     smodew,11000001b  ;slave unit phasing, recharging or requesting?
          jre      rgok              ;no, regenerate setlk:    offiw    flagw,00000100b   ;lockout already set?
          ret                        ;yes
          oriw     flagw,00000100b   ;yes, set lockout condition
          call     badbp             ;beeep
          ret rgm1:     neiw     cfgw,2            ;ALTERNATING SLAVE UNIT?
          jre      setrq             ;yes
          gtiw     cfgw,2            ;PARALLEL or PROGRESSIVE UNIT?
          jre      rgok              ;no
          ltiw     cfgw,7
          jre      rgok setrq:    offiw    flagw,02h         ;Does master say regenerate?
          jre      rgok              ;yes!
          oriw     modew,80h         ;set request for regeneration flag
          ret rgok:     ori      mk1,80h           ;mask flow interupt
          oriw     modew,01h         ;set regeneration flag
          aniw     modew,01111011b   ;reset help mode & request regeneration flag
          aniw     flagw,11111011b   ;reset lockout flag
          mviw     rcycw,0           ;set cycle to 0
          call     incyc             ;increment cycle
          call     shrtbp            ;beep
          ret ; executive:   RGNEXE
; function:    This is the executive loop when in regeneration.

RGNEXE:   call     rgout             ;update outputs
          call     wait60            ;wait for line cycle
          call     tone              ;update beeper
          call     dsply             ;update display
          call     gks               ;get keys
          call     key               ;process keys
          call     clock             ;update clock
          nop eqiw     rcycw,9           ;ninth cycle yet?
          jre      rgnexe            ;no, continue aniw     alnuaw,11111101b  ;reset recharge required
          call     alarm             ;clear alarm 2 to allow a short beep
```

```
            call    shrtbp              ;beep
            ani     mk1,01111111b       ;unmask flow interupt
            offiw   flagw,1             ;recharge ended by key?
            jre     rexe1 call    refday              ;reload max days to start
            call    refvol              ;reload volume remain
            call    refcnt              ;refresh count down timer
            call    refsg               ;refresh signal debounce
    rexe1:  aniw    flagw,11111100b     ;reset recharge ended by key flag & master reg
            aniw    modew,01111110b     ;reset request recharge and recharge mode
            mviw    rcycw,0             ;reset cycle ;   Check cam for phase offi    pa,01000000b        ;cam out of phase?
            jre     rexe2               ;no oriw    modew,01110000b     ;set phase, phase w/c & request phase w/c
            mviw    phstaw,15           ;set 15 minute timer
            oriw    flagw,80h           ;set phase with AB on
            ret                         ;no ;   Check for standby condition rexe2:  neiw    cfgw,0              ;single unit?
            jre     rexe5               ;yes ltiw    cfgw,3              ;alternating unit?
            jre     rexe4               ;no rexe3:  oriw    flagw,00010000b     ;set standby flag
            ori     pa,00000001b        ;turn on Output C
            ret rexe4:  offiw   statw,80h           ;Parallel unit - output C on during recharge?
            jre     rexe3               ; yes rexe5:  aniw    modew,11011111b     ;reset standy flag
            ani     pa,11111000b        ;all Outputs off
            ret ; subroutine:  RGCLK
; function:    Decrement cycle time remaining.  Call incyc when underflow
; destroyed:   all RGCLK:  dcrw    rgsecw              ;hl <- point to rgsec
            ret                         ;no underflow rgck1:  mviw    rgsecw,59           ;reset
            lxi     h,rgmin             ;hl <- point to rgmin
            mvi     c,1                 ;number of bytes - 1
            call    decbcd              ;subtract 1
            nop                         ;do not skip
            mvi     c,1
            call    is_rg_0             ;zero?
            call    incyc               ;increment cycle
            ret
```

```
; subroutine:    INCYC
; function:      Increment cycle.
; destroyed:     all INCYC:  ldaw    rcycw           ;a <- cycle number
        inr     a               ;increment cycle
        gti     a,8-1           ;cycle 8?
        jre     in1             ;no mviw    rcycw,8         ;rcyc <- 8
        call    shrtbp          ;beep
        ret in1:    staw    rcycw           ;store new cycle
        nei     a,7             ;brine time?
        jre     ldbrn           ;yes dcr     a               ;decrement for correct offset
        lxi     h,cyc1          ;hl <- point to base of cycle minutes
        ldax    h+a             ;a <- cycle minutes
        nei     a,0             ;skip this cycle?
        jre     incyc           ;yes staw    rgminw          ;set rgmin
        mvi     a,0             ;upper byte 0 during cycles 1-6
        mov     rgmin+1,a
        mviw    rgsecw,59       ;reset rgsec
        ret ldbrn:  gtiw    cfgw,2          ;parallel / progressive unit?
        jre     incyc           ;no, there is no brine delay lhld    brndly          ;hl <- preset brine delay
        lxi     ea,0
        dne     ea,h
        jre     incyc shld    rgmin           ;load cycle minutes
        mviw    rgsecw,59       ;reset rgsec
        call    shrtbp
        ret ; subroutine:    RGOUT
; function:      Update outputs during regeneration.
; destroyed:     all RGOUT:  neiw    rcycw,7         ;brine?
        jre     rgphs           ;yes oriw    statw,80h       ;set output C on flag
        bit     0,rcycw         ;even cycle?
        jre     even            ;yes ani     pa,11111101b    ;B off
        ori     pa,00000101b    ;A & C on
        ret even:   ani     pa,11111011b    ;A off
        ori     pa,00000011b    ;B & C on
```

```
rgphs:   offi    pa,01000000b    ;cam out of phase?
         jre     no_ab ori     pa,00000111b    ;turn on A, B, C
         oriw    modew,01100000b ;set phasing with C flags
         oriw    statw,80h       ;set output C on flag
         ret no_ab:   ani     pa,11111000b    ;turn off A, B, C
         aniw    modew,10001111b ;reset phasing with C flags
         aniw    statw,01111111b ;reset output C on
         ret ; subroutine:  HELP
; function:    Display help text.
; destroyed:   all HELP:    call    shrtbp
         aviw    hlptmw,80       ;Display each word for 8/6ths sec
         oriw    modew,00000100b ;set help mode oniw    modew,02h       ;programming?
         jre     hlp1            ;no neiw    dispw,amoded    ;alarm mode
         jre     dslct
         neiw    dispw,fld
dslct:   lxi     h,slctxt
         lxi     h,enter         ;display 'ENTER'
         call    dtext           ;put letters in buffer
         ret hlp1:    offiw   sflagw,80h      ;configuring unit?
         jre     hp1             ;no
         ldaw    promptw         ;a <- disp
         dcr     a
         avi     b,33            ;b <- 33 bytes per entry
         mul     b               ;ea <- offset
         lxi     d,ptbl          ;de <- base of table
         jre     getxt hp1:     ldaw    dispw           ;a <- disp
         avi     b,33            ;b <- 33 bytes per entry
         mul     b               ;ea <- offset
         lxi     d,dtbl          ;de <- base of table
getxt:   dadd    ea,d
         dmov    d,ea            ;hl <- base of entry text
         inrw    hlpdw           ;increment hlpd
         ldax    d+              ;a <- number of flash words
         inr     a
         gtaw    hlpdw           ;end of text?
         jre     hlpx            ;yes ldaw    hlpdw           ;a <- hlpd
         dcr     a
         sll     a               ;multiply by 8 to get word offset
         sll     a
```

```
        sll     a
        lxi     ea,0            ;clear ea
        mov     eal,a           ;ea <- word offset
        dadd    ea,d            ;add
        dmov    h,ea            ;de <- point to helpword to display
        call    dtext           ;display
        aviw    hlptmw,80       ;Display each word for 3/8ths sec
        ret hlpx:   aviw    hlpdw,0         ;reset help word counter
        aniw    modew,11111011b ;reset help mode
        ret ; subroutine:  SET
; function:    Process set key.
; destroyed:   all SET:    bit     1,modew         ;programming mode?
        ret                     ;no, ignore call    shrtbp          ;beep
        ldaw    dispw           ;a <- display
        mov     b,a             ;b <- display number
        sll     a               ;a <- a * 2
        add     a,b             ;a <- display number * 3
        lxi     ea,setbl        ;hl <- base address for jump table
        eadd    ea,a            ;ea <- address of jump vector
        jea setbl:  jmp     set0
        jmp     set1
        jmp     set2
        jmp     set3
        jmp     set4
        jmp     set5
        jmp     set5
        jmp     set7
        jmp     set7
        jmp     setpct
        jmp     setpct          ;10
        jmp     set10
        jmp     setfl
        jmp     settrp
        jmp     set10
        jmp     set11
        jmp     set12
        jmp     set13
        jmp     set14
        jmp     set11
        jmp     set12
        jmp     set13
        jmp     set14
        jmp     set14
        jmp     set19
        jmp     setpsg
        jmp     setpsg
        jmp     set20
```

```
;       TIME set0:   mviw    ssecw,0         ;reset ssec
        mviw    secw,0          ;reset sec
        ldaw    cursrw          ;a <- cursor
        oni     a,00000110b     ;setting minutes?
        jre     tma             ;no lxi     h,min           ;hl <- min
stmin:  lxi     h,strt          ;hl <- start time minute almin:  lxi     h,alatm         ;hl <- alarm time minute
        mvi     c,60h           ;c <- overflow value
        call    inc1            ;increment
        nop
        ret tma:    oni     a,00011001b     ;setting hour?
        jre     tm2             ;no lxi     h,hour          ;hl <- point to hour
sthour: lxi     h,strt+1        ;hl <- point to start time hour
alhour: lxi     h,alatm+1       ;hl <- point to alarm time hour
        mvi     c,24h           ;c <- overflow
        call    inc1            ;increment
        nop
        ret tm2:    offi    a,11000000b     ;setting day?
        call    iday            ;yes, increment day
        ret                     ;no

;       START TIME set1:   oniw    cursrw,00000110b;set minutes?
        jre     sthour
        jre     stmin

;       ALARM TIME set3:   oniw    cursrw,00000110b;set minutes?
        jre     alhour
        jre     almin

;       ALARM MODE set2:   offiw   statw,00000101b ;instant mode?
        jre     ckdly           ;no
        neiw    typew,2         ;Vol 0 type?
        jre     slt             ;yes, no delay for Vol 0
        oriw    statw,00000100b ;set to delay
        ret ckdly:  bit     2,statw         ;delay on?
        jre     slnt            ;no
slt:    aniw    statw,11111011b ;reset delay
        oriw    statw,00000001b ;set silent
        ret
```

```
slnt:   aniw    statw,11111110b  ;reset silent, go to instant
        ret

;       START DAYS set4:   ldaw    stdayw           ;a <- start days
        xraw    cursrw           ;toggle day using cursor mask
        staw    stdayw           ;restore
        ret

;       INTERVAL DAYS set5:   lxi     h,intday         ;hl <- intday
        call    incdig           ;increment digit pointed to by cursor
        call    refday           ;refresh maxdays
        ret

;       PRESET VOLUME set7:   lxi     h,prevol         ;hl <- prevol
        call    incdig           ;increment digit pointed to by cursor
        call    refvol           ;refresh volume remain
        call    setdb            ;set daily buffers
        call    average          ;compute average daily usage
        ret

;       PRESET MINUTES setpct: lxi     h,pcntmn         ;hl <- prevol
        call    incdig           ;increment digit pointed to by cursor
        call    refcnt
        ret

;       SIGNAL DEBOUNCE MINUTES setpsg: lxi     h,pcntsg         ;hl <- preset minutes
        call    incdig           ;increment digit pointed to by cursor
        call    refsg
        ret

;       FLOW RATE ENABLE setfl:  bit     6,beepw          ;enabled?
        jre     enabl
        aniw    beepw,10111111b  ;disable
        ret enabl:  oriw    beepw,01000000b  ;enable
        ret

;       TRIP POINT settrp: lxi     h,trippt         ;hl <- trip point
        call    incdig           ;increment
        ret

;       CYCLE TIME set10:  ldaw    dspcyw           ;a <- cycle on display
```

```
        lxi     ea,0            ;clear ea
        mov     eal,a           ;ea <- cycle on display
        lxi     h,cyc1          ;hl <- base of cycle displays
        dadd    ea,h            ;add offset
        dmov    h,ea            ;hl <- point to cycle time
        call    incdig          ;increment digit pointed to by cursor
        call    soc             ;sum cycle times
        ret

;       DESIRED DAYS TO ALARM 1 set11:  lxi     h,ddala1        ;hl <- point to desired days to alarm 1
        call    incdig          ;increment digit pointed to by cursor
        call    refd1           ;refresh days to alarm 1
        ret

;       DESIRED DAYS TO ALARM 2 set12:  lxi     h,ddalm2        ;hl <- point to desired days to alarm 2
        call    incdig          ;increment digit pointed to by cursor
        call    refd2           ;refresh days to alarm 2
        ret

;       DESIRED VOLUME TO ALARM 1 set13:  lxi     h,dvala1        ;hl <- point to desired vol to alarm 1
        call    incdig          ;increment digit pointed to by cursor
        call    refv1           ;refresh vol to alarm 1
        ret

;       DESIRED VOLUME TO ALARM 2 set14:  lxi     h,dvala2        ;hl <- point to desired vol to alarm 2
        call    incdig          ;increment digit pointed to by cursor
        call    refv2           ;refresh vol to alarm 2
        ret

;       METER FACTOR set20:  lxi     h,mfctr         ;hl <- point to meter factor
        call    incdig          ;increment digit lbcd    mfctr           ;bc <- meter factor [packed BCD]
        mov     a,b             ;4th digit
        call    bcd2hx          ;convert to hex
        mov     a,c             ;3rd digit
        call    nx2hx
        shld    mftr            ;save meter factor [hex]
        ret

;       BRINE DELAY set19:  lxi     h,brndly        ;hl <- point to meter factor
        call    incdig          ;increment digit
        lbcd    brndly          ;bc <- brine delay [packed BCD]
        mov     a,b             ;4th digit
        call    bcd2hx          ;convert to hex
        mov     a,c             ;3rd digit
```

```
        call    nx2hx
        shld    bdlyhx          ;save brine delay [hex]
        ret ; subroutine:  SELECT
; function:    Process select key.
; destroyed:   all SELECT: bit     1,modew         ;programming mode?
        ret                     ;no, ignore call    shrtbp          ;beep
selct:  ldaw    dispw           ;a <- display
        mov     b,a             ;b <- display number
        sll     a               ;a <- a *2
        add     a,b             ;a <- display number * 3
        lxi     ea,selbl        ;ea <- base address for jump table
        eadd    ea,a            ;ea <- address of jump vector
        jea selbl:  jmp     sel0            ;0
        jmp     sel1
        jmp     sel2
        jmp     sel1
        jmp     sel4
        jmp     sel5            ;5
        jmp     sel5
        jmp     selpv           ;pvold
        jmp     selpv jmp     selpct          ;pcntan
        jmp     selpct
        jmp     sel7
        jmp     selfl
        jmp     seltrp
        jmp     sel5            ;10
        jmp     sel11
        jmp     sel11
        jmp     sel7
        jmp     sel7
        jmp     sel7            ;15
        jmp     sel7
        jmp     sel7
        jmp     sel7
        jmp     sel7
        jmp     selbrn          ;19
        jmp     selpsg          ;pcntsg
        jmp     selpsg
        jmp     sel20           ;20

;       TIME sel0:   ldaw    cursrw
        offi    a,00000110b     ;cursor on minutes?
        aviw    cursrw,00011001b;yes, set to hour
        offi    a,00011001b     ;cursor on hour?
        aviw    cursrw,11000000b;yes, set to day
```

```
        offi    a,11000000b      ;cursor on day?
        aviw    cursrw,00000110b ;set to minute
        nei     a,0              ;no cursor?
        aviw    cursrw,00000110b ;set to minute
        ret

;       START TIME & ALARM TIME sel1:   ldaw    cursrw
        offi    a,00000110b      ;cursor on minutes?
        aviw    cursrw,00011001b ;yes, set to hour
        offi    a,00011001b      ;cursor on hour?
        aviw    cursrw,00000110b ;set to minute
        nei     a,0              ;no cursor?
        aviw    cursrw,00000110b ;set to minute
        ret

;       ALARM MODE self1:
sel2:   aviw    cursrw,0ffh      ;cursor on whole word
        ret

;       START DAYS sel4:   ldaw    cursrw           ;a <- cursor
        sll     a                ;shift to next day
        nei     a,0              ;no cursor?
        avi     a,02h            ;reset to Saturday
        staw    cursrw           ;store
        ret

;       INTERVAL DAYS sel5:   ldaw    cursrw           ;a <- cursor
        sll     a                ;shift to next digit
        nei     a,00000100b      ;too far?
        avi     a,1              ;reset
        nei     a,0              ;no cursor?
        avi     a,1
        staw    cursrw
        ret ;       PRESET VOLUME
selpv:  ldaw    cursrw           ;a <- cursor
        sll     a                ;shift to next digit
        nei     a,10000000b      ;too far?
        avi     a,1              ;reset
        nei     a,0              ;no cursor?
        avi     a,1
        staw    cursrw
        ret

;       WATER BATCHING sel7:   ldaw    cursrw           ;a <- cursor
        sll     a                ;shift to next digit
        nei     a,00100000b      ;too far?
```

```
            avi     a,1             ;reset
            nei     a,0             ;no cursor?
            avi     a,1
            staw    cursrw
            ret

;       WATER BATCHING DAYS, BRINE DELAY, PRESET MINUTES, SIGNAL DEBOUCE selpsg:
seltrp:
selbrn:
sel11:      ldaw    cursrw          ;a <- cursor
            sll     a               ;shift to next digit
            nei     a,00001000b     ;too far?
            avi     a,1             ;reset
            nei     a,0             ;no cursor?
            avi     a,1
            staw    cursrw
            ret

;       METER FACTOR selpct:
sel20:      ldaw    cursrw          ;a <- cursor
            sll     a               ;shift to next digit
            nei     a,00010000b     ;too far?
            avi     a,1
            nei     a,0             ;no cursor?
            avi     a,1             ;reset
            staw    cursrw
            ret ; subroutine:   PRGM
; function:     Process program key.
; destroyed:    all PRGM:       offiw   flagw,00100000b ;key still pressed?
            ret                     ;yes
            oriw    flagw,00100000b ;set key pressed
            aviw    cursrw,0        ;clear cursor
            bit     1,modew         ;programming mode?
            jre     prg_on          ;no pgoff:      call    legal           ;check for illegal entries
            jmp     illgl           ;simulate next function key press ;       all entries are legal, turn off programming mode call    shrtbp          ;beep
            avi     a,timed         ;a <- 0 (Time)
            neiw    typew,2         ;Vol 0?
            avi     a,vread         ;a <- 8 (Volume remain)
            staw    dispw           ;set new display
            lxi     h,done          ;de <- point to '* DONE *' text
            call    dtext           ;display
            oriw    modew,00000100b ;set help mode
            aviw    hlptmw,180      ;set timer for display
            aviw    hlpdw,4         ;emulate last word of help display
```

```
            mviw    typew,0           ;DEMAND?
            mviw    tossw,0           ;clear toss days
            aniw    beepw,11101111b   ;reset start-up (nop if not start-up)
            aniw    modew,11111101b   ;reset program mode
            call    longbp            ;beep long
            ret ;       Turn on programming mode prg_on:     call    shrtbp            ;beep
            lxi     h,fnctbl+11       ;hl <- point to programming display functions
            ldaw    typew             ;a <- type
            mvi     b,22              ;b <- offset for eac type
            mul     b                 ;ea <- offset
            dadd    ea,h              ;add to base
            dmov    h,ea              ;hl <- point to first function
            ldax    h                 ;a <- first display
            staw    dispw             ;store
notlg:      oriw    modew,00000010b   ;set programming mode
            call    select            ;set cursor
            call    help              ;display help text
            ret ;   subroutine:     LEGAL
;   function:       Check for entries that are 0.
;   on exit:        rets if OK
;   destroyed:      all LEGAL:      lxi     ea,0
            lded    sumcyc            ;de <- sumcyc
            deq     ea,d              ;sumcyc = 0?
            jre     lgl1              ;no
            mviw    dispw,cycdd       ;point back at cycle display
            mviw    dspcycw,0         ;first cycle
            ret lgl1:       eqiw    intdayw,0         ;interval days = 0?
            jre     lgl2
            mviw    dispw,idayd       ;move display to Interval days
            ret lgl2:       eqiw    stdayw,0          ;start days = 0?
            jre     lgl3
            mviw    dispw,stimed      ;display start days again
            ret lgl3:       mvi     c,3               ;number of bytes - 1
            call    testpv            ;preset volume = 0?
            jre     lgl4              ;no
            mviw    dispw,pvold
            ret lgl4:       mvi     c,1               ;number of bytes - 1
            call    testaf            ;meter factor = 0?
            jre     lgl4a             ;no
            mviw    dispw,afctd       ;point back to meter factor
            ret
```

```
lg14a:  eqiw    typew,6          ;Count down?
        jre     lglwbc           ;no
        mvi     c,1
        call    testpct          ;count down timer zero?
        rets                     ;no
        mviw    dispw,pcntd
        ret lglwbc: eqiw    typew,1          ;Water batching?
        rets                     ;no mvi     c,3              ;number of bytes - 1
        call    testdd1          ;desired days to alarm 1 = 0?
        jre     lg15             ;no
        mviw    dispw,dda1d
        ret lg15:   mvi     c,3              ;number of bytes - 1
        call    testdd2          ;desired days to alarm 2 = 0?
        jre     lg16             ;no
        mviw    dispw,dda2d
        ret lg16:   mvi     c,3              ;number of bytes - 1
        call    testdv1          ;desired vol to alarm 1 = 0?
        jre     lg17             ;no
        mviw    dispw,ddv1d
        ret lg17:   mvi     c,3              ;number of bytes - 1
        call    testdv2          ;desired vol to alarm 2 = 0?
        rets
        mviw    dispw,ddv2d
        ret ; subroutine:   DTYPE
; function:     Display 'TYPE XY'.
; destroyed:    all DTYPE:  lxi     h,typtxt         ;de <- point to type text
        call    dtext            ;load text ldaw    typew            ;a <- type
        adi     a,'0'            ;convert to ascii
        mov     dbuf+6,a         ;place in dbuf ldaw    cfgw             ;a <- configuration
        adi     a,'0'            ;convert to ascii
        mov     dbuf+7,a         ;place in dbuf bit     7,sflagw         ;main loop?
        ret
        oriw    modew,00000100b  ;set help mode
        mviw    hlptmw,80        ;set timer for display
        mviw    hlpdw,4          ;emulate last word of help display
        ret
```

```
; subroutine:   NXTFN
; function:     Display next function.  ILLGL entered only when an illegal
;               entry has been attempted.
; destroyed:    all illgl:  aviw    prgtmw,119          ;reset program mode timer to 120 sec
        aviw    cursrw,0            ;reset cursor
        call    select              ;set cursor
        dcrw    dispw               ;back up one display
        call    badbp               ;beep hard
        jr      nxt0

NXTFN:  call    shrtbp              ;beep
nxt0:   bit     1,modew             ;programming?
        lxi     h,fnctbl            ;hl <- point to normal display functions
        lxi     h,fnctbl+11         ;hl <- point to programming display functions
        ldaw    typew               ;a <- type
        mvi     c,22                ;b <- offset for eac type
        mul     c                   ;ea <- offset
        dadd    ea,h                ;add to base
        dmov    h,ea                ;hl <- point to first function
        ldaw    dispw               ;a <- display
        eqi     a,cycdd             ;displaying cycle?
        jre     nxtd                ;no
        neiw    dspcycw,5           ;cycle 6 on display?
        jre     nxtd                ;yes, displayed last cycle inrw    dspcycw             ;increment display cycle
        call    help                ;place help text
        ret nxtd:   aviw    dspcycw,0           ;reset cycle number display
        inr     a                   ;increment to next possible display
nxt1:   gtax    h+                  ;a <- first display
        jre     bingo               ;found a number => a
        jre     nxt1                ;number too small, bingo:  dcx     h                   ;wooo!, back up
        ldax    h                   ;a <- next valid display bit     1,modew             ;programming?
        jre     nopg
        nei     a,endtbl            ;end of table?
        jmp     pgoff               ;yes, exit programming mode eqi     a,atimed            ;alarm time display?
        jre     cktrp               ;no
        oniw    statw,00000100b     ;delayed mode?
        jre     nxtd                ;no, skip this display cktrp:  nei     a,tripd             ;trip level display?
        jre     ckcfgw              ;yes, check for parallel master
        eqi     a,bakdd             ;bring wake-up delay?
        jre     nopg                ;no
        jre     ckprll              ;yes, check for parallel ckcfgw: ltiw    cfgw,5              ;parallel / progressive master?
        jre     nxtd
```

```
ckprll: gtiw    cfgw,2              ;parallel / progressive unit?
        jre     nxtd                ;no nopg:   eqi     a,endtbl            ;end of table?
        jre     stdsp               ;no mvi     a,timed             ;a <- 0 (Time)
        neiw    typew,2             ;Vol 0?
        mvi     a,pvold             ;a <- Volume remain display number
stdsp:  staw    dispw               ;store new disp
        call    help                ;display help text
        ret ; subroutine:  ALARM
; function:    Service external input alarm then process all alarms.
; destroyed:   all ALARM:  mov     a,cr2               ;a <- A2D count for external ala
        lti     a,128               ;check at half way
        jre     noxala              ;no external alarms ;       external alarm 3 offiw   alnumw,00000100b    ;alarm 3 already on?
        jre     p_alm               ;yes, process alarms oriw    alnumw,00000100b    ;turn on alarm 3
        aniw    statw,11110111b     ;reset silenced
        jre     p_alm noxala: aniw    alnumw,11111011b    ;reset alarm 3

;       check alarms and set beeper status' p_alm:  eqiw    alnumw,0            ;any alarms present?
        jre     alrm                ;yes bit     1,statw             ;alarm flag on?
        ret                         ;no ani     pa,11110111b        ;reset external alarm
        aniw    statw,11110101b     ;reset silenced and alarm on flags
        jre     offbp               ;turn beepers off ;       there are alarms alrm:   bit     1,statw             ;alarm flag on?
        jre     on_alm              ;no bit     3,statw             ;silenced?
        jre     on_alm              ;no dlyad:  bit     2,statw             ;delay?
        ret                         ;no lxi     h,almts             ;check if time = delay time
        ldeax   h                   ;ea <- delay time
        lhld    ain                 ;hl <- hour
```

```
        deq     ea,h            ;delay time = time?
        ret                     ;no eqiw    secw,0          ;fresh second?
        ret                     ;yes ;       turn on beeper and external alarm onbp:   ori     pa,00001000b    ;turn on external alarm
        call    snd_al          ;turn on beeper
        ret ;       turn off beeper and external alarm
offbp:  ani     pa,11110111b    ;turn off external alarm
        call    clrsong         ;turn off beeper
        ret ;       turn on alarm and check if instant on_alm: oriw    statw,00000010b ;turn on alarm condition
        offiw   beepw,10h       ;start-up?
        ret                     ;no
        offiw   statw,00000101b ;instant?
        jre     dlyad           ;no
        jre     onbp            ;yes ; subroutine:   CALFLO
; function:     Calculate flow rate and place in display flow buffer.
; destroyed:    all CALFLO: lhcd    pls10           ;ea <- number of pulses / 10 sec
        lxi     d,0             ;de <- 0
        sded    pls10           ;clear pls for next 10 seconds
        lxi     d,6             ;multiply by 6 for 60 seconds
        call    mul16           ;ea,hl <- [pulses / 10 sec] * 6
        lded    mftr            ;de <- meter factor [hex]
        call    div32           ;divide pulses by meter factor
        call    rnd32           ;ea,hl <- gpm [hex]
        shld    flw             ;store in flow [hex]

dmov    ea,h            ;ea <- flow rate
        dmov    d,ea            ;de <- flow [hex]
        mov     a,d             ;upper byte
        call    hx2bcd
        mov     a,e             ;lower byte
        call    nx2bcd lxi     d,dflw+2        ;de <- point to dflw
        mov     a,h             ;a <- upper byte
        ani     a,0fh           ;strip upper nibble
        nei     a,0             ;equal 0?
        mvi     a,' '           ;leading zero blank
        stax    d-              ;store mov     a,l
        call    hilo            ;shift upper nibble
        eqi     h,0             ;upper byte 0?
```

```
            jre      dflo1              ;no, do not blank zero
            nei      a,0                ;0?
            mvi      a,' '              ;substitute space
dflo1:      stax     d-                 ;store 2nd digit mov      a,l                ;unpack
            ani      a,0fh              ;strip upper nibble
            stax     d                  ;store 3rd digit
            ret
; subroutine:    SAV_TF
; function:      Update total flow accumulator in EEPROM with todays data.
; destroyed:     all SAV_TF:     lhld     total              ;hl <- total flow accumulated today
            dmov     ea,h               ;low word in ea
            mvi      a,3                ;total flow address
            call     ewen               ;enable EEPROM erase/write
            call     erase              ;erase old value
            call     write              ;write new value
            call     ewds               ;disable EEPROM erase/write lhld     total+2             ;get today's flow
            dmov     ea,h
            mvi      a,4                ;total flow address
            call     ewen               ;enable EEPROM erase/write
            call     erase              ;erase old value
            call     write              ;write new value
            call     ewds               ;disable EEPROM erase/write call     EEcksm             ;store checksum
            ret ; subroutine:    EEcksm
; function:      Calculate checksum of data stored in EEPROM
; destroyed:     all EEcksm:     lxi      h,eeword           ;hl <- point to first address in EEPROM data
            mvi      a,0                ;address 0 = eeword
            lxi      d,0                ;clear accumulator
sumlp:      ldeax    h++                ;load in ram buffer and increment address
            dadd     ea,d               ;add to accumulator
            dmov     d,ea
            inr      a                  ;increment address
            gti      a,4
            jre      sumlp call     ewen               ;enable EEPROM erase/write
            call     erase              ;erase old value
            call     write              ;write checksum value
            call     ewds               ;disable EEPROM erase/write
            ret ; subroutine:    INCDIG
; function:      Increment digit in number pointed to by the cursor by 1.
; on entry:      hl <- points to variable base
; destroyed:     a,b,c
```

```
INCDIG: ldaw    cursrw          ;a <- cursor
        mvi     b,0             ;b <- offset for variable
nc1:    slr     a               ;shift twice for packed BCD
        slr     a
        skn     cy              ;carry flag?
        jre     inhi            ;yes
        nei     a,0             ;cursor gone?
        jre     inlo            ;yes
        inr     b               ;increment offset, cursor not found yet
        jre     nc1 inhi:   ldax    h+b             ;a <- packed BCD digits
        adi     a,10h           ;add 1 to digit
        lti     a,9bh           ;overflow?
        sui     a,0a0h          ;overflow, subtract to make digit 0
        stax    h+b             ;restore
        ret inlo:   ldax    h+b             ;a <- packed BCD digits
        mov     c,a             ;c <- number
        ani     c,0f0h          ;strip lower and save for later OR
        ani     a,0fh           ;strip upper
        adi     a,01h           ;increment lower digit by 1
        lti     a,0ah           ;overflow?
        mvi     a,0             ;reset
        ora     a,c             ;reunite digits
        stax    h+b
        ret ; subroutine:  DECBCD
; function:    Decrement packed BCD number by 1.
; on entry:    hl points to base of number, c <- number of bytes - 1
; on exit:     ret if underflow, rets if normal
; destroyed:   a,hl DECBCD: clc                     ;reset carry
declp:  mvi     a,99h           ;a <- 99h
        aci     a,0             ;a <- a + 0 + CY
        addx    h               ;add to number to decrement
        daa                     ;decimal adjust
        stax    h+              ;store new number
        dcr     c               ;last byte?
        jre     declp           ;no sk      cy              ;carry flag?
        ret                     ;no
        rets                    ;yes, normal return ; subroutine:  STATUS
; function:    Check status, mode and inputs and update outputs.
; destroyed:   all STATUS: offiw   modew,01h       ;time to regenerate?
        call    rgnexe          ;yes
```

```
            offi    pa,01000000b        ;cam out of phase?
            jre     cam_ok              ;no ;       Cam out of phase ori     mk1,80h             ;mask flow interupt
            offiw   modew,01000000b     ;first detection?
            jre     ck15m               ;no ;       First detection oriw    modew,01010000b     ;set phase & request for C (no effect on mastr)
            offiw   flagw,00010000b     ;standby?
            oriw    modew,00100000b     ;yes, set phase w/C mviw    phstmw,15           ;set phase timer to 15 minutes
            jre     out                 ;update outputs ;       Still out of phase ck15m:      eqiw    phstmw,0            ;timer timed out?
            jre     out                 ;no offiw   flagw,10000000b     ;AB on yet?
            jre     phsalm              ;yes
            oriw    flagw,10000000b     ;set AB flag
            mviw    phstmw,15           ;set phase timer for another 15 minutes
            jre     out phsalm:     offiw   alnumw,00100000b    ;phase alarm already on?
            jre     out                 ;yes ;       Set phase alarm oriw    alnumw,00100000b    ;set phase alarm
            aniw    statw,11110111b     ;reset silenced ;       Check which outputs are to be on out:        bit     7,flagw             ;AB flag set?
            jre     ab_off              ;no ori     pa,00000110b        ;A,B on
            jre     ck_c                ;check C ab_off:     ani     pa,11111110b        ;A,B off ;       check C status ck_c:       offiw   smodew,01000001b    ;slave phasing or regenerating?
            jre     c_off               ;turn off C
            gtiw    cfgw,1              ;alternating slave / parallel?
            jre     c_on                ;no
            bit     5,modew             ;phase with C?
            jre     c_off               ;no c_on:       ori     pa,00000001b        ;C on
            ret
```

```
c_off:   ani     pa,11111110b        ;C off
         ret

;        Cam is OK, check external start (if not SGNAL)

cam_ok:  neiw    typew,7             ;SIGNAL type?
         jre     cam1                ; yes mov     a,cr3               ;a <- external regenerate signal
         gti     a,128               ;exist?
         jre     sng1                ;signal aniw    beepw,01111111b     ;reset debounced flag
         aniw    alnumw,10111111b    ;reset stuck alarm
         call    refsg               ;refresh debounce timers
         jre     cam1 sng1:    dcrw    sgcycw              ;decrement 1/60th second counter
         jre     cam1 mvi     c,1                 ;2 bytes
         call    testsg              ;signal debounced?
         jre     sng2
         jre     sng3                ;yes sng2:    mviw    sgcycw,59           ;refresh counter
         dcrw    sgsecw              ;decrement second counter
         jre     cam1 mviw    sgsecw,59           ;refresh counter
         lxi     h,cntsg             ;hl <- cntsg address
         mvi     c,1                 ;# of bytes - 1
         call    decbcd              ;decrement minute counter
         jre     sng3                ;underflow!
         mvi     c,1                 ;# of bytes - 1
         call    testsg              ;0?
         jre     cam1                ;no sng3:    offiw   beepw,80h           ;same signal
         jre     sng4                ;yes
         oriw    beepw,80h           ;set input debounced
         call    autorg              ;yes, regenerate
         jre     cam1 sng4:    offiw   alnumw,01000010b    ;alarm 2 or 7 already on?
         jre     cam1                ; yes
         oriw    alnumw,01000000b    ;set stuck signal alarm
         aniw    statw,11110111b     ;reset silenced
;        Update outputs cam1:    ani     mk1,01111111b       ;unmask flow
         ani     pa,11111001b        ;turn A,B off eqiw    cfgw,1              ;alternating master?
         jre     exslv               ;no
         oniw    modew,01000000b     ;exiting phase mode?
         jre     r_ph
```

```
        oniw    smodew,01000001b;slave out of phase or reg?
        oriw    flagw,00010000b ;yes, set standby flag (keep C on)
        jre     r_ph exslv:  eqiw    cfgw,2          ;alternating slave?
        jre     r_ph            ;no
        offiw   modew,00100000b ;exiting phase w/c mode?
        oriw    flagw,00010000b ;yes, set standby flag (keep C on)

r_ph:   aniw    modew,10001111b ;reset phase flags
        aniw    flagw,01110111b ;reset AB flag, alarm, and master say phase / c
        aniw    alnumw,11011111b;reset phase alarm bit     1,flagw         ;does the master say to recharge?
        jre     lockout         ;no
        call    autorg          ;recharge!
        ret lockout:;bit    2,flagw         ;Lockout?
;       jre     standby         ;no
;       call    autorg          ;try to regenerate again
;       ret standby:bit     4,flagw         ;Standby?
        jre     c_off           ;no
        jre     c_on            ;yes ; subroutine:   AVERAGE
; function:     Calculate average daily usage and convert to BCD for display.
; destroyed:    all AVERAGE:eqiw    typew,0         ;demand unit?
        ret                     ;no lhld    day7+2          ;hl <- today's usage high word
        dmov    ea,h            ;hl <- today's usage high word
        lhld    day7            ;hl <- today's usage low word push    h               ;save accumulator
        push    ea
        mviw    lpcntw,5        ;loop counter for add loop
        lxi     h,day6          ;hl <- point to day1
avglp:  ldeax   h++             ;ea <- low word
        dmov    d,ea            ;de <- low word
        ldeax   h++             ;ea <- high word
        dmov    b,ea            ;bc <- high word
        shld    addr            ;store pointer
        pop     ea              ;pop accumulator high word
        pop     h               ;pop accumulator low word
        call    add32           ;add this day's usage
        neiw    lpcntw,0        ;end of week?
        jre     dav             ;yes dcrw    lpcntw          ;decrement loop counter
        push    h               ;save accumulator
        push    ea
        lhld    addr            ;hl <- address
        jre     avglp
```

```
dav:    lxi     d,7             ;7 days
        call    div32           ;compute average for 7 days
        call    rnd32 dmov    b,ea            ;bc <- average high word
        dmov    ea,h
        dmov    d,ea            ;de <- average low word
        mov     a,b             ;a <- MSB
        call    hx2bcd          ;convert to BCD
        mov     a,c             ;next byte
        call    nx2bcd
        mov     a,d             ;next byte
        call    nx2bcd
        mov     a,e             ;next byte
        call    nx2bcd
        shld    davg            ;store low word [packed BCD]
        dmov    h,ea
        shld    davg+2          ;store high word [packed BCD]
        ret
```

```
; subroutine:   SETDB
; function:     Fill day buffers [hex] with 1/2 preset volume [BCD].
; destroyed:    all SETDB:  eqiw    typew,0         ;demand type?
        ret                     ;no mov     a,prevol+3      ;a <- digit
        call    bcd2hx          ;convert
        mov     a,prevol+2      ;a <- digit
        call    nx2hx           ;convert
        mov     a,prevol+1      ;a <- digit
        call    nx2hx           ;convert
        mov     a,prevol        ;a <- digit
        call    nx2hx           ;convert
        call    sr32            ;divide by 2 shld    day7            ;store in day 7
        dmov    h,ea
        shld    day7+2 lxi     h,day7          ;hl <- source
        lxi     d,day6          ;de <- destination
        mvi     c,23
        block                   ;fill daily buffers
        ret
```

```
; subroutine:   TEST???
; function:     Rets if variable is zero.
; on entry:     c <- number of bytes - 1
; destroyed:    a,c,hl TESTPSG:lxi     h,pcntsg        ;hl <- preset signal debounce minute timer
TESTSG: lxi     h,cntsg         ;hl <- signal debounce minute timer
TESTPCT:lxi     h,pcntmn        ;hl <- preset count down minutes
TESTCNT:lxi     h,cntmn         ;hl <- count down minute timer
TESTMF: lxi     h,mfctr         ;hl <- meter factor
```

```
TESTVOL: lxi    h,vlrm          ;hl <- volume remain
TESTPV:  lxi    h,prevol        ;hl <- preset volume
TESTD1:  lxi    h,dalm1         ;hl <- days to alarm 1
TESTDD1: lxi    h,ddalm1        ;hl <- desired days to alarm 1
TESTDD2: lxi    h,ddalm2        ;hl <- desired days to alarm 2
TESTDV1: lxi    h,dvalm1        ;hl <- desired vol to alarm 1
TESTDV2: lxi    h,dvalm2        ;hl <- desired vol to alarm 2 test:    ldax   h+              ;a <- digit
         eqi    a,0             ;zero?
         ret                    ;no
         dcr    c                ;next digit
         jre    test
         rets                   ;all zero ; subroutine:  IS_??_0
; function:    Ret if variable is zero.
; on entry:    c <- number of bytes - 1
; destroyed:   a,c,hl IS_D1_0: lxi    h,dalm1         ;hl <- desired days to alarm 1
IS_D2_0: lxi    h,dalm2         ;hl <- desired days to alarm 2
IS_V1_0: lxi    h,valm1         ;hl <- desired volume to alarm 1
IS_V2_0: lxi    h,valm2         ;hl <- desired volume to alarm 2
IS_RG_0: lxi    h,rgmin         ;hl <- regeneration minute timer
IS_VL_0: lxi    h,vlrm          ;hl <- vlrm isit:    ldax   h+              ;a <- digit
         eqi    a,0             ;zero?
         rets                   ;no
         dcr    c                ;next digit
         jre    isit
         ret                    ;all zero ; subroutine:  REFSG
; function:    Refresh signal debounce timers.
; destroyed:   hl REFSG:   lhld   pcntsg          ;hl <- point to preset minute count down
         shld   cntsg           ;store minute count down
         aviw   sgcycw,179      ;3 second debounce for new signals
         aviw   sgsecw,59
         ret ; subroutine:  REFCNT
; function:    Refresh minutes remaining.
; destroyed:   hl REFCNT:  eqiw   typew,6         ;COUNT DOWN?
         ret                    ;no
         lhld   pcntmn          ;hl <- point to preset minute count down
         shld   cntmn           ;store minute count down
         aviw   cntsw,59        ;reset seconds counters
         aviw   cntcyw,59
         ret
```

```
; subroutine:    REFVOL
; function:      Refresh volume remaining.
; destroyed:     hl,de,c REFVOL: lxi     h,prevol        ;hl <- point to preset volume
        lxi     d,vlrm          ;de <- destination
        mvi     c,3             ;4 bytes
        block
        ret ; subroutine:    REFDAY
; function:      Refresh days remaining.
; destroyed:     hl,de,c REFDAY: mov     a,intday        ;a <- to preset volume
        mov     maxday,a        ;maxday <- preset volume
        ret ; subroutine:    REFWBC
; function:      Refresh waterbatching parameters.
; destroyed:     hl,de,c REFWBC: lxi     h,ddalm1        ;hl <- point to desired parameters
        lxi     d,dalm1         ;de <- destination
        mvi     c,15            ;16 bytes (4 X 4)
        block
        ani     pa,11111100b    ;reset outputs A & B
        ret ; subroutine:    REFD1
; function:      Refresh days to alarm 1.
; destroyed:     hl,de,c REFD1:  lxi     h,ddalm1        ;hl <- point to desired parameters
        lxi     d,dalm1         ;de <- destination
        mvi     c,3             ;4 bytes
        block
        ret ; subroutine:    REFD2
; function:      Refresh days to alarm 2.
; destroyed:     hl,de,c REFD2:  lxi     h,ddalm2        ;hl <- point to desired parameters
        lxi     d,dalm2         ;de <- destination
        mvi     c,3             ;4 bytes
        block
        ret ; subroutine:    REFV1
; function:      Refresh volume to alarm 1.
; destroyed:     hl,de,c
```

```
REFV1:   lxi     h,dvalm1        ;hl <- point to desired parameters
         lxi     d,valm1         ;de <- destination
         mvi     c,3             ;4 bytes
         block
         ret ; subroutine:   REFV2
; function:     Refresh volume to alarm 2.
; destroyed:    hl,de,c REFV2:   lxi     h,dvalm2        ;hl <- point to desired parameters
         lxi     d,valm2         ;de <- destination
         mvi     c,3             ;4 bytes
         block
         ret ; subroutine:   INC1
; function:     Increment packed BCD byte.
; on entry:     c <- overflow, hl <- address of number
; on exit:      rets if overflow
; destroyed:    a INC1:    ldax    h               ;a <- number
         adi     a,1             ;add 1
         daa                     ;decimal adjust
         lta     a,c             ;overflowed?
         jre     inc             ;yes stax    h               ;store
         ret inc:     mvi     a,0             ;reset to zero
         stax    h
         rets ; subroutine:   IDAY
; function:     Increment day of week.
; destroyed:    all IDAY:    ldaw    dayw            ;a <- day of week
         slr     a               ;point to next day
         oni     a,1             ;time to wrap around?
         jre     id1             ;no mvi     a,80h           ;reset to Sunday
id1:     staw    dayw            ;store new day
         ret ; subroutine:   SOC
; function:     Sum cycle times.
; destroyed:    all SOC:     lxi     d,cyc1          ;hl <- base address of cycle times
         lxi     ea,0            ;clear accumulator
         mvi     c,5             ;6 cycles
```

```
soclp:  ldax    d+              ;a <- cycle time
        push    ea              ;save accumulator
        call    bcd2hx          ;convert to hex
        pop     ea              ;ea <- accumulator
        dadd    ea,h            ;add next cycle time
        dcr     c
        jre     soclp
        lxi     d,sumcyc        ;de <- destination for sum of cycles
        steax   d               ;stored in hex
        ret ; subroutine:  COM
; function:    Process communications
; destroyed:   all
com:    bit     7,sflagw        ;ok to communicate?
        ret                     ;no
        neiw    cfgw,0          ;single unit?
        ret                     ;yes, return gtiw    cfgw,2          ;Parallel master unit?
        jre     ckcom           ;no
        ltiw    cfgw,5          ;maybe
        jre     ckcom           ;no neiw    slvmsgw,0       ;Masters turn communicating?
        jmp     mstcom          ;yes
        jre     ckcom ;       Check for communication problems ckcom:  call    ci              ;get input
        eqi     a,0             ;anything?
        jre     com0            ;yes, character received comerr: aviw    bufptrw,0
        inrw    comtaw          ;increment no character count
        gtiw    comtaw,6
        ret                     ;no
        aviw    comtaw,0        ;reset timer offiw   alnumw,00001000b;alarm 4 already on?
        jre     ckid            ;yes
        oriw    alnumw,00001000b;set communication alarm
        aniw    statw,11101111b ;reset silenced ;       ltiw    cfgw,5          ;
;       jre     ckid
;       lxi     h,0ff00h
;       shld    dmpadr
;       call    dumps
;       call    newln ckid:   eqiw    cfgw,1          ;master alternating?
        jre     mstp            ;no, check for master parallel ;       what we have here is a failure to communicate!
```

```
           lxi     d,scoai         ;de <- point to identity command text
           call    msg             ;send it
           mviw    bufptrw,0       ;clear buffer pointer
           oriw    beepw,08h       ;set communication error flag
           ret mstp:      gtiw    cfgw,2          ;master parallel?
           ret                     ;no
           ltiw    cfgw,5
           ret                     ;no
;          parallel slave did not respond ldaw    slvmsgw         ;a <- slave communicating to
           dcr     a               ;subtract master communication
           mvi     b,7             ;length of slave message
           mul     b               ;ea <- offset to slave message
           lxi     d,islvmsg       ;de <- beginning of slave command text
           dadd    ea,d
           dmov    d,ea            ;de <- point to proper message
           call    msg             ;send it
           mviw    bufptrw,0       ;clear buffer pointer
           oriw    beepw,08h       ;set communication error flag
           ret ;          Received response com0:      eqiw    cfgw,1          ;master alternating?
           jre     com1            ;no

;          * ALTERNATING MASTER * eqiw    bufptrw,0       ;Is the buffer empty?
           jre     nwchar          ;no, continue nei     a,'A'           ;incoming character 'A'?
           jre     nwchar          ;yes
           eqi     a,'N'           ;character 'N'?
           jmp     com             ;no ;          add new character to combuf nwchar:    lxi     h,combuf        ;hl <- point to command buffer
           mov     b,bufptr        ;b <- position of last character in buffer
           stax    h+b             ;put character in buffer
           inrw    bufptrw         ;increment buffer pointer
           ltiw    bufptrw,22      ;Is the pointer past the string length?
           mviw    bufptrw,22      ; yes, keep at 22 eqi     a,cr            ;was the character a carriage return?
           jmp     com             ;no, get more characters call    cksum           ;verify checksum
           jmp     comerr lxi     h,combuf        ;point to SOC character
           ldax    h+              ;a <- SOC character
           eqi     a,'A'           ;positive response?
           jre     ck_n            ;no
```

```
        aniw    alnumw,11110111b ;reset alarm 4
        aviw    comtmw,0         ;clear communication timeout ;       recover slave mode register
        ldax    h+               ;a <- first mode character in ascii-hex
        call    ath              ;convert to hex
        jmp     comerr
        call    lohi             ;shift to upper nibble
        mov     b,a              ;move to b ldax    h                ;a <- second mode character in ascii-hex
        call    ath              ;convert to hex
        jmp     comerr
        ani     a,0fh            ;strip upper nibble
        ora     a,b              ;concatenate
        staw    smodew           ;store slave mode
        aniw    beepw,11110111b  ;reset com error flag ;       check for request for regeneration arps:   oni     a,80h            ;request regeneration flag set?
        jre     ckrp offiw   modew,01000001b  ;regenerating or phasing?
        jre     send_l           ;yes, send lockout command oriw    smodew,00000001b ;set slave mode register
        aniw    flagw,11101111b  ;reset master standby flag
send_r: lxi     d,scomr          ;de <- point to recharge command text
        call    msg              ;send it
        aviw    bufptrw,0        ;clear buffer pointer
        ret send_l: lxi     d,scoml          ;de <- point to lockout command text
        call    msg              ;send it
        aviw    bufptrw,0        ;clear buffer pointer
        ret ;       check for request for phase with output C on ckrp:   oni     a,10h            ;request phase with C? -
        jre     cksr             ;no offiw   modew,01000001b  ;regenerating or phasing?
        jre     send_o           ;yes, do not let slave phase with C oriw    smodew,00100000b ;set slave phasing with C on
        aniw    flagw,11101111b  ;reset master standby
        lxi     d,scomp          ;de <- point to phase w/c command text
        call    msg              ;send it
        aviw    bufptrw,0        ;clear buffer pointer
        ret ;       check if slave is regenerating cksr:   oni     a,01h            ;slave regenerating?
        jre     ckmol            ;no
```

```
send_s:  lxi    d,scoms         ;de <- point to Standby w/c command text
         call   msg             ;send it
         aviw   bufptrw,0       ;clear buffer pointer
         bit    1,modew         ;master regenerating too?
         ret ;        oh no! get out of regeneration aviw   rcycw,9         ;end of regeneration
         oriw   flagw,01h       ;set regeneration ended prematurely
         ret ;        slave is on line or in standby ckmol:   bit    2,flagw         ;Master in Lockout?
         jre    ckmrp           ;no call   send_o          ;send on_line message to slave
         call   autorg          ;recharge
         ret ckmrp:   oniw   modew,01000001b ;master regenerating or phasing?
         jre    ckmsb           ;no send_o:  lxi    d,scomo         ;de <- point to On Line command text
         call   msg             ;send it
         aviw   bufptrw,0       ;clear buffer pointer
         ret ;        check if master is in Standby mode ckmsb:   bit    4,flagw         ;standby?
         jre    send_s          ;send Standby
         jre    send_o          ;send On Line ;        check for negative response ck_n:    nei    a,'N'           ;negative response?
         jmp    comerr          ;yes clbuf:   aviw   bufptrw,0
         ret comi:    eqiw   cfgw,2          ;slave alternating?
         jre    com2            ;no

;        * ALTERNATING SLAVE * eqiw   bufptrw,0       ;is the buffer empty?
         jre    newchar         ;no, continue eqi    a,'>'           ;is the character a '>'?
         jmp    com             ;no ;        add new character to combuf newchar: lxi    h,combuf        ;hl <- point to command buffer
         mov    b,bufptr        ;b <- position of last character in buffer
```

```
        stax    h+b                     ;put character in buffer
        inrw    bufptrw                 ;increment buffer pointer
        ltiw    bufptrw,22              ;Is the pointer past the string length?
        aviw    bufptrw,22              ; yes, keep at 22 eqi     a,cr                    ;was the character a carriage return?
        jmp     com                     ;no, get another character ;       check for valid command call    cksum                   ;verify checksum
        jmp     E2                      ;checksum error aniw    alnumw,11110111b        ;reset alarm 4
        aviw    comtmw,0                ;clear communication timeout
        mov     a,combuf+1              ;a <- command eqi     a,'O'                   ;On line command?
        jre     ckr                     ;no
        aniw    flagw,11101111b         ;reset standby flag
        aniw    modew,11011111b         ;reset recharge with C flag
        aniw    beepw,11011111b         ;reset remove lockout
        call    respond                 ;send positive response
        ret ckr:    eqi     a,'R'                   ;regenerate command?
        jre     ckph                    ;no
        oriw    flagw,00000010b         ;set master says regenerate flag
        aniw    flagw,11111011b         ;reset lockout flag
;       aniw    beepw,11011111b         ;reset remove lockout
        call    autorg
        call    respond                 ;send positive response
        ret ckph:   eqi     a,'P'                   ;phase with C command?
        jre     cklck                   ;no
        oriw    modew,00100000b         ;set phase with C flag
        call    respond                 ;send positive response
        ret cklck:  eqi     a,'L'                   ;Lockout command?
        jre     ckstnd                  ;no
        bit     2,flagw                 ;lockout already set?
        call    badop                   ;no, beep just this once
        aniw    modew,11011111b         ;reset recharge with C flag bit     5,beepw                 ;remove lockout command set?
        jre     stlk                    ;no
        aniw    beepw,11011111b         ;reset remove lockout
        aniw    modew,01111111b         ;reset request regeneration flag
        call    respond                 ;send positive response
        ret stlk:   oriw    flagw,00000100b         ;set Lockout flag
        call    respond                 ;send positive response
        ret ckstnd: eqi     a,'S'                   ;Standby command?
        jre     ckidnt                  ;no
```

```
            oriw    flagw,00010000b     ;set Standby flag
            call    respond             ;send positive response
            ret ckidnt:     eqi     a,'I'               ;Identify command?
            jmp     E1                  ;no
            call    respond             ;yes, respond but take no action
            ret com2:       ltiw    cfgw,5              ;master parallel / progressive?
            jmp     com3                ;no

;       * PROGRESSIVE / PARALLEL MASTER * eqiw    bufptrw,0           ;Is the buffer empty?
            jre     n_chr               ;no, continue nei     a,'A'               ;incoming character 'A'?
            jre     n_chr               ;yes
            eqi     a,'N'               ;character 'N'?
            jmp     com                 ;no ;       add new character to combuf n_chr:      lxi     h,combuf            ;hl <- point to command buffer
            mov     b,bufptr            ;b <- position of last character in buffer
            stax    h+b                 ;put character in buffer
            inrw    bufptrw             ;increment buffer pointer
            ltiw    bufptrw,22          ;Is the pointer past the string length?
            aviw    bufptrw,22          ; yes, keep at 22 eqi     a,cr                ;was the character a carriage return?
            jmp     com                 ;no, get more characters call    cksum               ;verify checksum
            jmp     comerr lxi     h,combuf            ;point to BOC character
            ldax    h+                  ;a <- BOC character
            eqi     a,'A'               ;positive response?
            jmp     ck_n                ;no
            aniw    alnuaw,11110111b    ;reset alarm 4
            aviw    comtmw,0            ;clear communication timeout ;       recover slave data call    gethxw              ;get flow rate
            jmp     comerr
            lxi     d,flow1             ;load base address of array
            call    stword              ;store data from slave call    gethxw              ;get upper word of volume remain
            jmp     comerr
            lxi     d,vlrm1+2
            call    stdword call    gethxw              ;get lower word of volume remain
            jmp     comerr
```

```
        lxi     d,vlrm1
        call    stdword call    gethxw          ;get time remaining
        jmp     comerr
        lxi     d,tarm1         ;load base address of array
        call    stword call    gethxb          ;get mode register
        jmp     comerr
        lxi     d,mod0          ;load base address of array
        call    stbyte aniw    beepw,11110111b ;reset com error flag
        jre     slvcom ;       Transfer master data altcom: mov     a,vlrm+3        ;a <- volrem 1st digit
        call    bcd2hx          ;convert to hex
        mov     a,vlrm+2        ;a <- volrem 2nd digit
        call    nx2hx
        mov     a,vlrm+1        ;a <- volrem 3rd digit
        call    nx2hx
        mov     a,vlrm          ;a <- volrem 4th digit
        call    nx2hx
        shld    vlrm0           ;copy volume remain of master to vlrm0
        dmov    d,ea
        sded    vlrm0+2 lded    flw             ;transfer flow rate ###
        sded    flow0 call    div32           ;ea,hl <- time remaining
        lxi     d,0
        deq     ea,d            ;check for overflow
        lxi     h,0ffffh
        shld    tarm0 ldaw    modew           ;copy mode register
        staw    mod0w           ;into mode0

;       talk to next slave slvcom: ldaw    slvmsgw         ;a <- slave msg pointer
        inr     a               ;talk to next slave
        mov     b,a             ;b <- slave msg pointer ldaw    cfgw            ;a <- configuration number
        sui     a,1             ;subtract off single and alternating types
        lta     b,a             ;wrap pointer?
        mvi     b,0             ;yes
        mov     a,b
        staw    slvmsgw         ;store ;       check if this unit is recharging ldaw    slvmsgw         ;a <- slave unit
        lxi     h,mod0          ;hl <- point to mode register for first unit
```

```
          ldax    h+a             ;a <- mode register of slave
          oni     a,01h           ;regenerating?
          jre     rqrg eqiw    cfgw,3          ;master twin?
          lxi     h,02400         ;no, 15 minutes of pulses for triple units
          lxi     h,36000         ;15 minutes of pulses for twin units
          shld    rgcnt           ;reset for next unit
          lxi     h,lstrg0        ;hl <- # of recharges past address
          ldax    h+b             ;a <- # of recharges past
          nei     a,0             ;recharged already?
          jap     sndp_c mvi     a,0             ;clear it out
          stax    h+b             ;store
          eqi     b,0             ;increment regeneration counters
          inrw    lstrg0w
          nop
          eqi     b,1
          inrw    lstrg1w
          nop
          eqiw    cfgw,4          ;third unit?
          jap     sndp_c          ;no, send standby to regenerating unit
          eqi     b,2
          inrw    lstrg2w
          nop ;         send standby or on line to regenerating unit sndp_c:   ldaw    slvasgw         ;a <- slave unit
          lxi     h,mod0          ;hl <- point to mode register for first unit
          ldax    h+a             ;a <- mode register of slave
          oni     a,40h           ;phasing?
          jap     sndp_o          ; no, send on line
          jap     sndp_s          ; yes, send standby ;         check if this unit requests a regeneration rqrg:     offi    a,80h           ;request reg?
          jap     req_reg         ;yes ;         check if this unit is oudda faze offi    a,40h           ;oudda faze?
          jap     req_phc         ;yes ;         unit does not request a recharge or phase with C ldaw    cfgw            ;make sure no unit is recharging
          sui     a,2
          mov     c,a
          lxi     h,mod0
rqlp:     ldax    h+
          offi    a,01h           ;any recharges?
          jap     sndp_o          ;yes, send on line to this unit
          dcr     c
          jre     rqlp ;         Rank units according to least time remaining
```

```
            lxi     h,rank0         ;default rank buffers
            mvi     a,5
            stax    h+
            stax    h+
            stax    h ldaw    cfgw            ;a <- configuration
            sui     a,2             ;subtract non-parallel configurations
            mov     b,a             ;b <- rank counter ranklp:     lxi     d,0             ;de <- mock highest value
            lxi     h,tarm0         ;hl <- point to tarm
            mvi     c,0             ;c <- unit counter rankilp:    ldeax   h++             ;ea <- value
            dlt     ea,d            ;is this new tarm >= than the previous?
            jre     newhi           ;yes
            jre     rk3             ;no newhi:      push    h               ;[save tarm pointer
            push    b               ;[save rank & unit offset pointers
            lxi     h,rank0         ;hl <- point to rank
            mov     a,c             ;check if unit has been ranked already
            mvi     c,2             ;number of possible units - 1
rk1:        neax    h+              ;unit ranked already?
            jre     rk2             ;yes
            dcr     c
            jre     rk1 pop     b               ;]unit not ranked
            lxi     h,rank0         ;hl <- point to base address of ranks
            mov     a,c             ;a <- unit pointer
            stax    h+b             ;store unit at this rank
            pop     h               ;]recover pointer to tarm
            dmov    d,ea            ;store new high value
            jre     rk3 rk2:        pop     b               ;recover rank & unit pointers
            pop     h
rk3:        inr     c               ;next unit
            ldaw    cfgw            ;a <- configuration
            sui     a,1             ;subtract non-parallel configurations
            eqa     a,c             ;tested each unit?
            jre     rankilp         ;no dcr     b               ;all units ranked?
            jre     ranklp          ;no ;   All units are ranked, Check each unit for regeneration mviw    lpcntw,0        ;rank counter
            lxi     d,rank0
ckrglp:     ldax    d+
            mov     c,a             ;c <- unit under mock recharge
            push    d               ;[save rank pointer ;   Calculate total flow of other units lxi     h,flow0         ;hl <- point to flow 0
```

```
            lxi     d,0             ;de <- accumulator
            mvi     a,0             ;unit pointer
flowtlp:    ldeax   h++             ;ea <- flow for unit
            nea     a,c             ;skip this units flow?
            jre     skipflw         ;yes
            dadd    ea,d            ;add
            dmov    d,ea            ;place back in accumulator
skipflw:    inr     a               ;point to next unit
            mov     b,cfg           ;a <- configuration number
            sui     b,2             ;subtract non-parallel configurations
            gta     a,b             ;accumulated all units?
            jre     flowtlp         ;no
            dmov    ea,d            ;ea <- accumulated flow total ;       ea <- flow total, add flow proportionately to units that stay on line push    ea              ;[save flow total
            lxi     d,0             ;de <- accumulator
            ldaw    lpcntw          ;a <- rank
            mov     b,a             ;b <- counter
avflp:      lxi     h,rank0         ;find unit with current rank
            ldax    h+b             ;a <- unit with current rank
            sll     a               ;double for word offset
            lxi     h,flow0         ;hl <- base address of flow
            ldeax   h+a             ;ea <- flow for unit
            dadd    ea,d            ;add flow
            dmov    d,ea            ;put back in accumulator
            dcr     b
            jre     avflp eqiw    lpcntw,1        ;just one unit recharging?
            jre     flw2            ;yes dslr    ea              ;no, divide by two
            skn     cy              ;carry
            inx     ea              ;round up ;       Calculate anticipated flow of unit with next least time remaining flw2:       push    ea              ;[save average flow of recharging units
            lxi     h,rank0
            ldaw    lpcntw          ;a <- rank
            inr     a               ;look for unit with next least time remain.
            ldax    h+a             ;unit
            sll     a               ;double for word offset
            lxi     h,flow0         ;get flow rate of this unit (unit x)
            ldeax   h+a             ;ea <- flow rate of unit x
            dmov    b,ea            ;bc <- flow rate of unit x
            pop     d               ;de <- average flow
            call    mul16           ;ea,hl <- flow (unit x) * flow (unit(s) reg.)

pop     d               ;de <- flow total of units not recharging
            push    b               ;[save flow (unit x)
            eqi     d,0             ;average flow 0?
            jre     dvd32           ;no
            eqi     e,0
            jre     dvd32
```

```
                lxi     h,0                     ;yes, do not divide
                jre     addfl                   ;

dvd32:          call    div32                   ;ea,hl <- unit x flow * % of reg. units flow
                push    d
                lxi     d,0ffffh                ;don't overflow while rounding
                dne     ea,d
                jre     nord
                pop     d
                call    rnd32                   ;hl <- unit x flow * % of reg. units flow
                jre     addfl nord:           pop     d
addfl:          pop     ea                      ;lea <- flow (unit x)
                dadd    ea,h                    ;ea <- flowx + flowx*(avflow/flowt)

;       ea has anticipated flow, calculate time remaining
                dmov    d,ea                    ;de <- anticipated flow
;               sded    davg+2                  ;
                lxi     h,rank0
                ldaw    lpcntw                  ;a <- rank
                inr     a                       ;look for unit with next least time remain
                ldax    h+a                     ;unit
                sll     a                       ;quadruple for double word offset
                sll     a
                lxi     h,vlra0                 ;get volume remain (unit x)
                ldeax   h+a                     ;ea <- volume remain low byte (unit x)
                push    ea                      ;[
                adi     a,2
                ldeax   h+a                     ;ea <- volume remain low byte (unit x)
                pop     h                       ;]ea,hl <- volume remain unit x
                call    div32                   ;ea,hl <- time remaining if other unit regs push    d
                lxi     d,0ffffh                ;don't overflow while rounding
                dne     ea,d
                jre     nrnd                    ;ea = 0ffffh
                pop     d
                call    rnd32                   ;hl <- time remaining if other unit regs
                jre     chkovf nrnd:           pop     d
chkovf:         lxi     d,0                     ;make sure ea is 0
                deq     ea,d
                lxi     h,0ffffh                ;overflow!
;               shld    davg+2                  ;

;       hl has time remaining, calculate cycle times of units with lower ranks lded    sumcyc
                dmov    ea,d                    ;ea <- sum of cycles
                lded    bdlyhx                  ;de <- brine delay
                dadd    ea,d                    ;add brine delay eqiw    lpcntw,0                ;single recharge
                dsll    ea                      ;no, double out of service time dlt     ea,h                    ;tarm < sum of cycle times
                jre     calrg                   ;yes!
```

```
            pop     d               ;1pop rank pointer
            ldaw    cfgw            ;a <- configuration number
            sui     a,3             ;subtract non-parallel configurations
            mov     b,a
            ldaw    lpcntw          ;a <- lpcntw
            inr     a
            staw    lpcntw          ;restore
            lta     b,a             ;check all units?
            jre     ckrglp          ;no
;           Check how many units should be on lxi     h,mod0          ;any phasing units?
            mvi     c,2
ckallp:     ldax    h+              ;a <- mode of unit c
            offi    a,01000000b     ;any phasing?
            jmp     sndp_o          ;yes, all other units should be on line
            dcr     c
            jre     ckallp lxi     h,flow0         ;add flow rates of all units
            ldaw    cfgw
            sui     a,2             ;a <- # of total units
            lxi     d,0             ;de <- accumulator
calstd:     ldeax   h++             ;ea <- flow rate
            dadd    ea,d            ;add
            dmov    d,ea
            dcr     a
            jre     calstd mov     a,trippt+1      ;convert trippt to hex
            call    bcd2hx
            mov     a,trippt
            call    nx2hx           ;hl <- trip point dmov    ea,d            ;ea <- accumulated flow
            dlt     ea,h            ;above threshold?
            jre     flo_gtr         ;yes
            jre     unit_0          ;no flo_gtr:    eqiw    cfgw,4          ;two slaves?
            jmp     sndp_o          ;no dmov    d,ea            ;de <- flow
            dmov    ea,h            ;ea <- trip
            dsll    ea              ;ea <- 2 * threshold
            dgt     ea,d            ;above second threshold?
            jmp     sndp_o          ;yes, send on line ;           Two units should be on neiw    cfgw,3          ;only two units?
            jmp     sndp_o          ;yes, both are on line unit_1:     mvi     c,1             ;unit testing
            mvi     b,0             ;b <- low unit
            lxi     h,lstrg0        ;hl <- point to base of last unit to recharge
            ldax    h+              ;a <- # of past recharges
ordlp:      gtax    h
            jre     nextodr
```

```
            mov     a,c
            mov     b,a                 ;b <- low unit
            ldax    h                   ;a <- # of past recharges
nextodr:    inx     h
            inr     c
            gti     c,2
            jre     ordlp ldaw    slvmsgw             ;a <- slave about to send to
            eqa     a,b                 ;same?
            jre     sndp_o              ;no, this unit is on line
            jap     sndp_s              ;yes, this unit is in standby ;       One unit should be on unit_0:     avi     c,1                 ;unit testing
            avi     b,0                 ;b <- main unit
            lxi     h,lstrg0            ;hl <- point to base of last unit to recharge
            ldax    h+                  ;a <- # of past recharges
ordrlp:     ltax    h
            jre     nxtodr
            mov     a,c
            mov     b,a                 ;b <- main unit
            ldax    h                   ;a <- # of past recharges
nxtodr:     inx     h
            inr     c
            gti     c,2
            jre     ordrlp ldaw    slvmsgw             ;a <- slave about to send to
            eqa     a,b                 ;same?
            jap     sndp_s              ;no, this unit is in standby ;       This unit requires nothing and likes it sndp_o:     ldaw    slvmsgw             ;a <- slave to transmitt to
            nai     a,0                 ;master?
            jap     o_mstr              ;yes
            dcr     a
            avi     b,7                 ;length of command table
            mul     b
            lxi     d,oslvmsg           ;de <- base address of on-line messages
            dadd    a,d
            dmov    d,ea                ;address in de
            call    msg
            ret o_mstr:     aniw    modew,11011111b     ;reset phase with C
            aniw    flagw,11101101b     ;reset standby & master says recharge flag
            ret ;       A unit has been calculated to require recharging, could it be this one?

calrg:      pop     d                   ;keep stack straight
            lhld    rgcnt               ;hl <- number of regeneration pulses
            lxi     ea,0                ;ea <- number of regeneration pulses
            dne     ea,h                ;time to recharge?
            jre     calrg1              ;yes
```

```
               dcx     h              ;decrement count
               shld    rgcnt          ;save new reg count value
               deq     ea,h           ;time to recharge?
               jre     sndp_o         ;send on line calrg1:   lxi     h,rank0        ;find unit that should recharge
               ldax    h              ;unit calculated to need recharge
               eqaw    slvmsgw        ;a = slave about to transmitt to?
               jre     sndp_o         ;no
```

;       This unit requires recharging, check what others are doing

```
     req_reg:avi       c,0            ;make sure no other unit is in recharge / phase
             lxi       h,mod0
     modlp:  mov       a,c
             neaw      slvmsgw        ;testing the same unit?
             jre       nextmod
             ldax      h
             offi      a,01000001b    ;phasing or recharging?
             jre       sndp_l         ;yes, send lockout for this unit
     nextmod:inx       h
             inr       c
             ldaw      cfgw           ;a <- configuration number
             sui       a,2
             lta       a,c            ;a > c? (not checked them all)
             jre       modlp          ;yes
```

;       Send regenerate command

```
     sndp_r: ldaw      slvmsgw        ;a <- slave to transmit to
             mov       b,a            ;b <- unit
     ;       lxi       h,mod0         ;hl <- point to mode registers
     ;       ldax      h+b            ;a <- mode register
     ;       ori       a,01h          ;set regeneration flag for that unit
     ;       stax      h+b
             nei       b,0            ;master?
             jre       regmst         ;yes
             avi       a,7            ;length of command table
             dcr       b              ;subtract master comm
             mul       b
             lxi       d,rslvmsg      ;de <- base address of on-line messages
             dadd      ea,d
             dmov      d,ea           ;address in de
             call      msg
             ret regmst: oriw      flagw,00000010b ;set Master says regenerate
             call      autorg         ;see if unit is ready
             ret
```

;       Send lockout to the sorry unit

```
     sndp_l: ldaw      slvmsgw        ;a <- slave to transmit to
             nei       a,0            ;master?
             jre       lckmstr        ;yes
             dcr       a              ;subtract master comm
             avi       b,7            ;length of command table
             mul       b
             lxi       d,lslvmsg      ;de <- base address of lockout messages
```

```
             dadd      ea,d
             dmov      d,ea         ;address in de
             call      msg
             ret lckmstr:aniw flagw,11111101b ;reset master says recharge
        offiw flagw,00000100b ;lockout flag set already?
        jre   ckrmov          ;yes
        oriw  flagw,00000100b ;set lockout flag
        call  badbp           ;beeeeep
        ret ckrmov: bit   5,beepw         ;remove lockout flag set?
        ret                   ;no
        aniw  beepw,11011111b ;reset remove lockout flag
        aniw  flagw,11111101b ;reset lockout
        jre   sndp_o          ;send on line command ;       Unit is out of phase, check if others are req / phasing req_phc:offi  a,20h           ;phasing with C
        jmp   sndp_p          ;yes, continue mvi   c,0
        lxi   h,mod0          ;make sure no other unit is in recharge / phase
phsloop:mov   a,c
        neaw  slvmsgw         ;testing the same unit?
        jre   nextphs
        ldax  h
        offi  a,01000001b     ;other unit phasing or recharging?
        jre   sndp_o          ;yes, send on-line for this unit
nextphs:inx   h
        inr   c
        ldaw  cfgw            ;a <- configuration number
        sui   a,2
        lta   a,c             ;a > c? (not checked them all)
        jre   phsloop         ;yes ;       Send phase command sndp_p: ldaw  slvmsgw         ;a <- slave to transmit to
        nei   a,0             ;master?
        jre   phsmstr         ;yes
        dcr   a                ;subtract master comm
        mvi   b,7             ;length of command table
        mul   b
        lxi   d,pslvmsg       ;de <- base address of phase messages
        dadd  ea,d
        dmov  d,ea            ;address in de
        call  msg
        ret phsmstr:oriw  modew,00100000b ;set phase with C flag
        aniw  flagw,11111101b ;reset master says recharge
        ret ;       Send standby command sndp_s: ldaw  slvmsgw         ;a <- slave to transmit to
```

```
            nei     a,0                 ;master?
            jre     stdmstr             ;yes
            dcr     a                   ;subtract master comm
            mvi     b,7                 ;length of command table
            mul     b
            lxi     d,sslvmsg           ;de <- base address of phase messages
            dadd    ea,d
            dmov    d,ea                ;address in de
            call    msg
            ret stdmstr:oriw    flagw,00010000b ;set standby flag
        aniw    flagw,11111101b ;reset master says recharge
        ret com3:   ltiw    cfgw,7              ;progressive / parallel slave?
        ret                         ;no

;       *  PROGRESSIVE / PARALLEL SLAVE  * eqiw    bufptrw,0           ;Is the buffer empty?
        jre     nw_chr              ;no, continue eqi     a,'>'               ;is the character a '>'?
        jmp     com                 ;no, continue ;       add new character to combuf nw_chr: lxi     h,combuf            ;hl <- point to command buffer
        mov     b,bufptr            ;b <- position of last character in buffer
        stax    h+b                 ;put character in buffer
        inrw    bufptrw             ;increment buffer pointer
        ltiw    bufptrw,22          ;Is the pointer past the string length?
        mviw    bufptrw,22          ; yes, keep at 22 eqi     a,cr                ;was the character a carriage return?
        jmp     com                 ;no, get another character ;       Make sure address is correct ldaw    cfgw                ;a <- configuration
        sui     a,4                 ;subtract master and non-parallel configs
        mov     b,a
        mov     a,combuf+1          ;a <- address
        call    ath                 ;convert to hex
        jre     nomatch
        nea     a,b                 ;address match?
        jre     match               ;yes
nomatch:mviw    bufptrw,0           ;no, clear buffer pointer
        ret ;       check for valid command match:  call    cksum               ;verify checksum
        jmp     E2                  ;checksum error aniw    alnumw,11110111b;reset alarm 4
        mviw    comtmw,0            ;clear communication timeout
```

```
            mov     a,combuf+2      ;get command
            eqi     a,'O'           ;On line command?
            jre     ckrgn           ;no
            aniw    beepw,11011111b ;reset remove lockout
            aniw    modew,11011111b ;reset phase with C flag
            aniw    flagw,11101101b ;reset standby & master says recharge flag
            call    pllrspd         ;send positive response
            ret ckrgn:      eqi     a,'R'           ;regenerate command?
            jre     ck_phs          ;no
            oriw    flagw,00000010b ;set master says regenerate flag
;           aniw    flagw,11101011b ;reset lockout and standby flags
;           aniw    beepw,11011111b ;reset remove lockout
            call    autorg          ;check if it is time to recharge
            call    pllrspd         ;send positive response
            ret ck_phs:     eqi     a,'P'           ;phase with C command?
            jre     ck_lock         ;no
            oriw    modew,00100000b ;set phase with C flag
            aniw    flagw,11111101b ;reset master says recharge
            call    pllrspd         ;send positive response
            ret ck_lock:eqi a,'L'           ;Lockout command?
            jre     ck_idt          ;no
            aniw    flagw,11111101b ;reset master says recharge
            bit     2,flagw         ;lockout already set?
            call    badbp           ;no, beep just this once
            aniw    modew,11011111b ;reset recharge with C flag bit     5,beepw         ;remove lockout set?
            jre     st_lck          ;no
            aniw    beepw,11011111b ;reset remove lockout
            aniw    modew,01111111b ;reset request regeneration flag
            call    pllrspd         ;send positive response
            ret st_lck:     oriw    flagw,00000100b ;set Lockout flag
            call    pllrspd         ;send positive response
            ret ck_idt:     eqi     a,'I'           ;Identify command?
            jre     ck_stnd         ;no
            call    pllrspd         ;yes, respond but take no action
            ret ck_stnd:eqi a,'S'           ;Standby command?
            ret aniw    flagw,11111101b ;reset master says recharge
            oriw    flagw,00010000b ;set standby flag
            call    pllrspd
            ret ;subroutine:    GETHXB
;function:      Get hex byte pointed to by hl from combuf and store in a.
```

```
;on exit:       ret if error, hl <- hl + 2
;destroyed:     c

GETHXB: ldax   h+              ;a <- first mode character in ascii-hex
        call   ath             ;convert to hex
        ret
        call   lohi            ;shift to upper nibble
        mov    c,a             ;move to c ldax   h+              ;a <- second mode character in ascii-hex
        call   ath             ;convert to hex
        ret
        ani    a,0fh           ;strip upper nibble
        ora    a,c             ;concatenate
        rets ;subroutine:    GETHXW ;function:      Get hex word pointed to by hl from combuf and store in ea.
;on exit:       ret if error, hl <- hl + 4
;destroyed:     b GETHXW: call   gethxb
        ret
        mov    eah,a
        call   gethxb
        ret
        mov    eal,a
        rets ;subroutine:    STWORD
;function:      Store value in ea into ram location based on which slave
;               is responding.
;on entry:      ea <- value to be stored, de <- address of base
;destroyed:     a STWORD: push   h
        push   d
        pop    h              ;move storage address to hl
        ldaw   slvmsgw        ;a <- slave msg pointer
        dcr    a              ;subtract master
        sll    a              ;double for word offset
        steax  h+a            ;store
        pop    h
        ret ;subroutine:    STDWORD
;function:      Store value in ea into ram location based on which slave
;               is responding.
;on entry:      ea <- value to be stored, de <- address of base
;destroyed:     a STDWORD:push   h
        push   d
        pop    h              ;move storage address to hl
        ldaw   slvmsgw        ;a <- slave msg pointer
```

```
            dcr     a                   ;subtract master
            sll     a                   ;double for word offset
            sll     a                   ;double again for double word offset
            steax   h+a                 ;store
            pop     h
            ret ;subroutine:    STBYTE
;function:      Store value in a into ram location based on which slave
;               is responding.
;on entry:      a <- value to be stored, de <- address of base
;destroyed:     b STBYTE: push    h
        push    d
        pop     h
        mov     b,slvmsg            ;b <- slave msg pointer
        stax    h+b                 ;store
        pop     h
        ret ; subroutine:   RESPOND
; function:     Respond to alternating master's command.
; destroyed:    all RESPOND:call    boc                 ;send beginning of command
        ldaw    modew               ;a <- mode register
        mvi     c,0                 ;clear checksum
        call    phbwc               ;send mode register as ascii-hex
        call    eoc                 ;send end of command
        mviw    bufptrw,0           ;clear buffer pointer
        ret ; subroutine:   PLLRSPD
; function:     Respond to parallel master's command.
; destroyed:    all PLLRSPD:call    boc                 ;send beginning of command
        mvi     c,0                 ;clear checksum lded    flw                 ;de <- flow rate
        mov     a,d                 ;send flow rate
        call    phbwc               ;send upper byte of flow register as ascii-hex
        mov     a,e
        call    phbwc               ;send low byte of flow register as ascii-hex mov     a,vlrm+3            ;get volume remaining
        call    bcd2hx              ;convert to hex
        mov     a,vlrm+2
        call    nx2hx
        mov     a,vlrm+1
        call    nx2hx
        mov     a,vlrm
        call    nx2hx
        mov     a,eah               ;highest byte of volume remain
```

```
        call    phbwc           ;send volume remain as ascii-hex
        mov     a,eal           ;highest byte of volume remain
        call    phbwc           ;send volume remain as ascii-hex
        mov     a,h             ;middle byte of volume remain
        call    phbwc           ;send volume remain as ascii-hex
        mov     a,l             ;low byte of volume remain
        call    phbwc push    b
        call    div32           ;ea,hl <- volume remain / flow rate
        lxi     d,0
        deq     ea,d            ;check for overflow
        lxi     h,0ffffh
        pop     b
        mov     a,h             ;high byte of time remain
        call    phbwc           ;send volume remain as ascii-hex
        mov     a,l             ;low byte of time remain
        call    phbwc ldaw    modeu           ;a <- mode register
        call    phbwc           ;send mode register as ascii-hex
        call    eoc             ;send end of command
        aviw    bufptrw,0       ;clear buffer pointer
        ret ; subroutine:  Error table
; function:    Send negative acknowledge response 'N#<cr>'.
; destroyed:   a E0:     avi     a,'0'           ;expected power up clear command
E1:     avi     a,'1'           ;invalid command
E2:     avi     a,'2'           ;checksum error
E3:     avi     a,'3'           ;command buffer overrun
E4:     avi     a,'4'           ;non-ascii text received
E5:     avi     a,'5'           ;time delay set-up error mov     b,a             ;b <- error code
        avi     a,'N'           ;A for acknowledge
        call    co              ;send 'N'
        mov     a,b             ;get back error code
        call    co              ;Send error code
        avi     a,cr            ;CR to finish
        call    co
        aviw    bufptrw,0       ;clear buffer
        ret ; subroutine:  BOC
; function:    Send beginning of command character. (A)
; destroyed:   nothing BOC:    push    v
        avi     a,'A'           ;a <- 'A'
        call    co              ;send 'A'
        pop     v
        ret
```

```
; subroutine:   EOC
; function:     Send end of command characters
; destroyed:    a,c EOC:    mov     a,c             ;a <- checksum
        call    phb             ;send checksum
        mvi     a,cr            ;a <- carriage return
        call    co              ;send character
        jmp     clbuf ; subroutine:   PHBWC, PHDWC
; function:     Print Hex Byte routine and keep track of checksum
;               in register c.
; on exit:      c <- checksum
; destroyed:    a PHBWC:  push    v               ;save v,a
        slr     a               ;shift upper to lower nibble
        slr     a               ;
        slr     a               ;
        slr     a               ;
        call    phdwc           ;print msd
        pop     v               ;restore v,a
        call    phdwc           ;print lsd
        ret PHDWC:  ani     a,0fh           ;strip upper nibble
        lti     a,0ah           ;check for 'a' - 'f'
        adi     a,07h           ;convert 'a' - 'f'
        adi     a,30h           ;convert to ascii
        call    co              ;send to output
        add     c,a
        ret ; subroutine:   CKSUM
; function:     Calculate checksum and verify it. RETS if all ok.
; Destroyed:    b,hl CKSUM:  mov     b,bufptr        ;Get count of characters
        sui     b,4+1           ;Take out BOC, cksum(2), & cr
        lxi     h,combuf+1      ;hl <- point to msd of address
        mvi     a,0             ;a <- 0
csl:    addx    h+              ;add character to the bunch
        dcr     b               ;decrement loop counter
        jre     csl             ;loop mov     c,a             ;c <- save calculated checksum
        ldax    h+              ;Get first byte of sent check sum
        call    ath             ;change it to hex
        ret                     ;ERROR! ignore this command call    lohi            ;move to upper nibble
        mov     b,a             ;store in b
        ldax    h+              ;get next character
        call    ath             ;change it to hex
        ret                     ;ERROR! ignore this command
```

```
        ora     a,b                 ;combine the two bytes
        eqa     a,c                 ;two check sums equal?
        ret                         ; no, return
        rets                        ; yes, return and skip ;subroutine:   CI
;function:     (a) <- console input from spooler.
;              (a) <- 0 if nothing available
;              FOR USE WITH INPUT SPOOLER
;destroyed:    v CI:     push    ea                  ;save registers
        push    h bit     1,sflagw            ;receive buffer empty flag?
        jre     ci1                 ;no, continue
        mvi     a,0                 ;buffer empty, return 0
        pop     h                   ;restore registers
        pop     ea
        ret                         ;exit ci1:    di                          ;mask interrupts
        lxi     h,itail
        ldeax   h                   ;ea <- tail
        lxi     h,ispool            ;hl <- base of input spool buffer
        ldax    h+ea                ;a <- data from input buffer
        ani     a,7fh               ;strip parity bit
        inx     ea                  ;tail <- tail + 1
        lxi     h,isize             ;hl <- size of buffer
        dlt     ea,h                ;tail < size?
        lxi     ea,0                ;no, reset tail
        lxi     h,itail
        steax   h                   ;store new tail
        lhld    ihead               ;hl <- head
        dne     ea,h                ;head = tail?
        oriw    sflagw,00000010b    ;yes, set receive buffer empty flag aniw    sflagw,11111011b    ;reset receive buffer full flag
        ei                          ;enable interrupts
        pop     h                   ;restore registers
        pop     ea
        ret                         ;exit ; Subroutine:  CO
; Function:    Console <- Character in (A) (polled).
; Destroyed:   nothing CO:     skit    fst                 ;transmit buffer empty?
        jr      co                  ;no, wait until it is ori     pc,01000000b        ;turn on transmitter
        push    v                   ;save
        mvi     a,0                 ;clear counter
        mov     etam,a
        mvi     a,00001100b         ;start counting
        mov     etam,a
```

```
            pop     v                       ;recover
            mov     txb,a                   ;load transmit buffer
            ret                             ;exit ;******************************************************************
; subroutine:  INTT0
; function:    Decrement beepctr for beeper.
;              Entered every 5ms during normal operation.
; destroyed:   nothing
;******************************************************************

INTT0:      exa                             ;swap registers
            exx offiw   statu,40h               ;battery?
            jre     t0bat                   ;yes ;       Normal run mode dcrw    c10msw                  ;decrement 5 msec counter
            jre     t0x
            aviw    c10msw,1                ;reset 5 msec counter to 10 msec lhld    beepctr                 ;hl <- beep count down counter
            lxi     ea,0                    ;ea <- 0
            dne     ea,h                    ;beep counter = 0?
            jre     beepoff                 ; yes, turn off beeper dcx     h                       ;ctr = ctr - 1
            shld    beepctr
            jre     i10 beepoff:    aniw    beepw,11111101b         ;reset beep enabled flag
            bit     0,beepw                 ;wrap around on?
            ori     tmm,00000011b           ;no, reset timer ff i10:        inrw    w60tmu                  ;increment 60 Hz wait timer
            nop t0x:        exx                             ;swap registers back
            exa
            ei                              ;re-enable interrupts
            reti ;       Battery mode, keep track of time.

t0bat:      dcrw    c1sw                    ;decrement 1 sec counter
            jre     t0x aviw    c1sw,199                ;reset to 1 sec
            call    clk4                    ;increment clock registers
            jre     t0x                     ;exit oriw    almmw,01h               ;set time for recharge went by in battery mode
            aniw    statu,11110111b         ;reset silenced alarm
            jre     t0x                     ;exit
```

```
;************************************************************
; subroutine:   FLOW
; function:     Count pulses, keep track of flow, vlrm, valm132.
; destroyed:    nothing

;************************************************************

FLOW:   push    v
        push    b
        push    d
        push    h
        push    ea ;       pls10 is used only in the displaying of flow rate lhld    pls10           ;hl <- pls10
        inx     h               ;increment
        shld    pls10           ;store ;       check to see if full gallon has passed lhld    mftr            ;hl <- meter factor [hex]
        dmov    ea,h            ;ea <- meter factor
        lhld    pls             ;hl <- pulse counter
        inx     h               ;increment
        dlt     ea,h            ;pulse count greater than or equal to mftr?
        jre     spls            ;no, store new value ;       Increment total flow register lhld    total           ;increment total flow counter
        inx     h
        shld    total
        lxi     ea,0
        deq     ea,h            ;overflow?
        jre     ck9999          ;no lhld    total+2         ;increment upper word
        inx     h
        shld    total+2
        jre     fl1 ck9999: lxi     ea,0e0ffh       ;low word representing 99999999
        deq     ea,h            ;same?
        jre     fl1             ;no lxi     ea,5f5h         ;high word representing 99999999
        lhld    total+2         ;hl <- high word of total flow
        deq     ea,h            ;99999999?
        jre     fl1             ;no
        lxi     h,0             ;reset total flow accumulator
        shld    total
        shld    total+2 fl1:    neiw    typew,1         ;Water batching?
        jre     valo            ;yes ;       Decrement volume remaining
```

```
            eqiw    typew,0         ;demand unit
            jre     flowt
            lxi     ea,0            ;clear ea
            lhld    day0            ;hl <- day 0 usage lower word
            inx     h               ;increment
            shld    day0            ;store
            deq     ea,h            ;overflow?
            jre     flowt           ;no lhld    day0+2          ;hl <- day 0 usage upper word
            inx     h               ;increment
            shld    day0+2          ;store flowt:  mvi     c,3
            call    is_v1_0         ;volume remain = 0?
            jre     rstpls          ;yes, do nothing lxi     h,vlrm          ;hl <- point to volume remain
            mvi     c,3
            call    decbcd          ;decrement volume remaining
            nop
            jre     rstpls          ;reset pls to zero ;       Water batching, decrement volume to alarm 1 & 2 vala:   lxi     h,vlrm          ;hl <- point to volume remain
            mvi     c,3             ;# of bytes - 1
            call    is_v2_0         ;volume to alarm 2 already = 0?
            jre     rstpls          ;yes lxi     h,vala2         ;hl <- point to valal
            mvi     c,3
            call    decbcd          ;decrement volume to alarm 2
            jre     alm2            ;underflow!

mvi     c,3             ;# of bytes - 1
            call    is_v2_0         ;volume to alarm 2 = 0?
            jre     alm2            ;yes mvi     c,3             ;# of bytes - 1
            call    is_v1_0         ;volume to alarm 1 = 0?
            jre     rstpls          ;yes lxi     h,valal         ;hl <- point to valal
            mvi     c,3
            call    decbcd          ;decrement volume to alarm 1
            jre     alm1            ;underflow!

mvi     c,3             ;# of bytes - 1
            call    is_v1_0         ;volume to alarm 1 = 0?
            jre     alm1            ;yes
            jre     rstpls alm1:   offiw   alnumw,00000011b;alarm 2 or 1 already on?
jre     rstpls                  ;no oriw    alnumw,00000001b;set alarm 1
ori     pa,00000100b    ;turn on output A
jre     alrmon
```

```
alm2:   aniw    alnumw,11111110b ;reset alarm 1
        offiw   alnumw,00000010b ;alarm 2 already on?
        jre     rstpls           ;no oriw    alnumw,00000010b ;set alarm 2
        ori     pa,00000010b     ;turn on output B
        ani     pa,11111011b     ;turn off output A
alrmon: aniw    statw,11110111b  ;reset silenced rstpls: lxi     h,1              ;reset pulse
spls:   shld    pls              ;store pulse flowx:  pop     ea
        pop     h
        pop     d
        pop     b
        pop     v
        ei
        reti ;****************************************
; subroutine: LINE
; function:   Pull micro out of halt mode
; destroyed:  nothing
;****************************************

LINE:   aniw    statw,10111111b ;reset battery flag
        ei
        reti

;****************************************
; subroutine: SINT
; function:   Console Serial Input Interrupts
; destroyed:  nothing
;****************************************

;       Serial Receive sint:   push    v               ;save registers
        mov     a,rxb           ;a <- receive data
        push    ea
        push    h
        ani     a,7fh           ;strip parity bit lxi     h,ihead         ;hl <- address of input head
        ldeax   h               ;ea <- ihead
        lxi     h,ispool        ;hl <- address of input spool
        stax    h+ea            ;store in input spooler
        inx     ea              ;increment head
        lxi     h,isize         ;hl <- size of spooler
        dlt     ea,h            ;head < isize?
        lxi     ea,0            ;no, reset head
        lxi     h,ihead         ;hl <- address of input head
        steax   h               ;save new head value aniw    sflagw,11111101b ;reset receive buffer empty flag
```

```
            pop     h               ;restore registers
            pop     ea
            pop     v
            ei                      ;enable interrupts
            reti                    ;return from interrupt ;*******************************************
; subroutine:   TINT
; function:     Disable Transmitter Enable
; destroyed:    nothing
;*******************************************

TINT:       push    v
            mvi     a,0             ;stop counter
            mov     etmm,a
            ani     pc,10111111b    ;disable transmitter
            pop     v
            ei
            reti nclud   w9346.asm       ;EEPROM routines
            nclud   util.asm        ;math32 and character handling routines
;           nclud   mon7810.asm     ;monitor
            nclud   wstbl.asm       ;tables ;*******************************************
;*      Internal 256 Byte RAM Assignments      *
;******************************************* org     0ff00h          ;Start of Internal RAM

;dmpadr:    ds      2                       ;Needed by MON7810 dbuf:       ds      2               ;buffer holding unpacked characters
dp:         ds      1               ;decimal point required in digit #
dpw:        equ     dp \ 100h disp:       ds      1               ;display function
dispw:      equ     disp \ 100h prompt:     ds      1               ;prompt display
promptw:    equ     prompt \ 100h ;1 - 50/60 Hz   2 - Type        3 - Configuration song:       ds      6               ;song buffer
beepctr:    ds      2               ;duration of beep or note
note:       ds      1               ;pointer to note in song
notew:      equ     note \ 100h
beep:       ds      1               ;beeper status
```

```
beepw:   equ    beep \ 100h
;        7 6 5 4 3 2 1 0
;        ! ! ! ! ! ! ! !_____ wrap around
;        ! ! ! ! ! ! !_____ beeper active
;        ! ! ! ! ! !_____ start key depressed
;        ! ! ! ! !_____ com error (master only)
;        ! ! ! !_____ silent alarm 4 during start-up
;        ! ! !_____ remove lockout
;        ! !_____ flow rate enabled
;        !_____ debounced lpcnt:   ds     1                 ;temporary buffer for loop counter
lpcntw:  equ    lpcnt \ 100h
addr:    ds     2                 ;temporary buffer for address pointer ;        console spooler control for I/O serial interrupt ihead:   ds     2                 ;input spooler head
itail:   ds     2                 ;input spooler tail sflag:   ds     1                 ;serial transmit / receive spooler flags
sflagw:  equ    sflag \ 100h      ;1 = TRUE ;        7 6 5 4 3 2 1 0
;        ! ! ! ! ! ! ! !__ console transmit spool buffer full
;        ! ! ! ! ! ! !____ console receive spool buffer empty
;        ! ! ! ! ! !_____ console receive spool buffer full
;        ! ! ! ! !_____ console XON / XOFF (1 = suspend wait)
;        ! ! ! !_____ console Echo (1 = no echo )
;        ! ! !_____
;        ! !_____
;        !_____

;        spoolers
ispool:  ds     isize             ;reserve input spooler space comtm:   ds     1                 ;missed communication counter
comtmw:  equ    comtm \ 100h
bufptr:  ds     1                 ;pointer in command buffer
bufptrw: equ    bufptr \ 100h
combuf:  ds     23                ;command buffer smode:   ds     1                 ;mode register of slave (if master)
smodew:  equ    smode \ 100h
;        7 6 5 4 3 2 1 0   PARALLEL FORMAT
;        ! ! ! ! ! ! ! !__ regeneration 0 (master)
;        ! ! ! ! ! ! !____ regeneration 1
;        ! ! ! ! ! !_____ regeneration 2
;        ! ! ! ! !_____ regeneration 3
;        ! ! ! !_____ phase 0 (master)
;        ! ! !_____ phase 1
;        ! !_____ phase 2
;        !_____ phase 3 stat:    ds     1                 ;status register
statw:   equ    stat \ 100h
```

```
;       7 6 5 4 3 2 1 0
;       ! ! ! ! ! ! ! !__ silent = 1
;       ! ! ! ! ! ! !____ alarm condition = 1
;       ! ! ! ! ! !_____ delay = 1
;       ! ! ! ! !_____ audible off
;       ! ! ! !_____ 15 minute delay for phase
;       ! ! !_____ additional 15 minutes has passed
;       ! !_____ battery
;       !_____ output C on during recharge mode:   ds      1               ;mode register
modew:  equ     mode \ 100h
;       7 6 5 4 3 2 1 0  ALTERNATING FORMAT
;       ! ! ! ! ! ! ! !__ regeneration
;       ! ! ! ! ! ! !____ programming
;       ! ! ! ! ! !_____ help
;       ! ! ! ! !_____ hold
;       ! ! ! !_____ request to phase with C
;       ! ! !_____ phase with C
;       ! !_____ phase
;       !_____ request to regenerate flag:   ds      1               ;state flags
flagw:  equ     flag \ 100h
;       7 6 5 4 3 2 1 0
;       ! ! ! ! ! ! ! !__ Recharge ended by key press
;       ! ! ! ! ! ! !____ Master says regenerate
;       ! ! ! ! ! !_____ Lockout
;       ! ! ! ! !_____ Master says phase with C
;       ! ! ! !_____ Standby
;       ! ! !_____ Auto/prog key still be pressed
;       ! !_____ Phasing with AB & alarm
;       !_____ Phasing with AB on alnum:  ds      1               ;alarm type
alnumw: equ     alnum \ 100h
;       7 6 5 4 3 2 1 0
;       ! ! ! ! ! ! ! !__ start time
;       ! ! ! ! ! ! !____ recharge required
;       ! ! ! ! ! !_____ external alarm
;       ! ! ! ! !_____ serial alarm
;       ! ! ! !_____ running on rom defaults alarm
;       ! ! !_____ phase alarm
;       ! !_____ continuous external signal
;       !_____ almode:  ds     1               ;alarm mode
almodew: equ    almode \ 100h
; 0 - Silent   1 - Instant    2 - Delayed w60tm:  ds      1               ;60 Hz wait timer
w60tmw: equ     w60tm \ 100h
c10ms:  ds      1               ;counts 10 msec duration
c10msw: equ     c10ms \ 100h
c1s:    ds      1               ;battery mode 1 second counter
c1sw:   equ     c1s \ 100h
ssec:   ds      1               ;60 Hz counter [packed BCD]
ssecw:  equ     ssec \ 100h
```

```
sec:     ds    1              ;second counter [packed BCD]
secw:    equ   sec \ 100h
min:     ds    1              ;minute counter [packed BCD]
minw:    equ   min \ 100h
hour:    ds    1              ;hour counter [packed BCD]
hourw:   equ   hour \ 100h strt:    ds    2              ;start time (min - hour)
strtw:   equ   strt \ 100h almta:   ds    2              ;alarm time (min - hour)
almtaw:  equ   almta \ 100h debo:    ds    1              ;debounce counter
debow:   equ   debo \ 100h
hlpta:   ds    1              ;help timer
hlptaw:  equ   hlpta \ 100h
debodw:  equ   hlpta \ 100h   ;prompt display scroll debounce (sharing hlpta)
hlpd:    ds    1              ;help word counter
hlpdw:   equ   hlpd \ 100h
prgta:   ds    1              ;program timer
prgtaw:  equ   prgta \ 100h
phsta:   ds    1              ;phase timer
phstaw:  equ   phsta \ 100h cyc1:    ds    1              ;cycle 1 timer [packed BCD]
cyc2:    ds    1              ;cycle 2 timer
cyc3:    ds    1              ;cycle 3 timer
cyc4:    ds    1              ;cycle 4 timer
cyc5:    ds    1              ;cycle 5 timer
cyc6:    ds    1              ;cycle 6 timer
sumcyc:  ds    2              ;sum of all cycle timers [hex]

rgsec:   ds    1              ;regeneration second counter [hex]
rgsecw:  equ   rgsec \ 100h
rgmin:   ds    2              ;regeneration minute counter [packed BCD]
rgminw:  equ   rgmin \ 100h   ;second byte only used in cycle 7 dspcyc:  ds    1              ;recharge cycle on display during programming
dspcycw: equ   dspcyc \ 100h
rcyc:    ds    1              ;recharge cycle in progress
rcycw:   equ   rcyc \ 100h day:     ds    1              ;day of week (mask)
dayw:    equ   day \ 100h stday:   ds    1              ;start days of week
stdayw:  equ   stday \ 100h ;       7 6 5 4 3 2 1 0
;       ! ! ! ! ! ! ! !__
;       ! ! ! ! ! ! ! !_____ Saturday
;       ! ! ! ! ! ! !_____ Friday
;       ! ! ! ! ! !_____ Thursday
;       ! ! ! ! !_____ Wednesday
;       ! ! ! !_____ Tuesday
;       ! ! !_____ Monday
;       ! !_____ Sunday
```

```
cursr:    ds      1                    ;mask that show which digits are incremented
cursrw:   equ     cursr \ 100h
lkey:     ds      1                    ;last key pressed
lkeyw:    equ     lkey \ 100h intday:   ds      1                    ;interval days
intdayw:  equ     intday \ 100h
maxday:   ds      1                    ;max days to start
maxdayw:  equ     maxday \ 100h
prevol:   ds      4                    ;desired volume [packed BCD]
vlrm:     ds      4                    ;volume remain [packed BCD]
wavg:     ds      4                    ;weighted average [hex]
davg:     ds      4                    ;display average [packed BCD]
mfctr:    ds      2                    ;meter factor [packed BCD]

brndly:   equ     wavg                 ;brine make-up delay [packed BCD]
bdlyhx:   equ     brndly+2             ;brine make-up delay [hex]
trippt:   equ     davg                 ;brine delay counter [packed BCD]

mftr:     ds      2                    ;meter factor [hex]
mftrw:    equ     mftr \ 100h
pls10:    ds      2                    ;10 second pulse accumulator for display only
pls:      ds      2                    ;pulse accumulator
plsw:     equ     pls \ 100h
flw:      ds      2                    ;flow rate accumulator [hex]
dflw:     ds      3                    ;flow rate on display [unpacked BCD]

;         ALM double words & day# double words mapped to same location day7:     ds      4                    ;day 7 [hex]
day6:     ds      4                    ;day 6
day5:     ds      4                    ;day 5
day4:     ds      4                    ;day 4
day3:     ds      4                    ;day 3
day2:     ds      4                    ;day 2
day1:     ds      4                    ;day 1
day0:     ds      4                    ;today's usage
toss:     ds      1                    ;toss days
tossw:    equ     toss \ 100h ddalm1:   equ     day7                 ;desired days to alarm 1 [packed BCD]
ddalm2:   equ     day6                 ;desired days to alarm 2
dvalm1:   equ     day5                 ;desired volume to alarm 1
dvalm2:   equ     day4                 ;desired volume to alarm 2
dalm1:    equ     day3                 ;days to alarm 1
dalm2:    equ     day2                 ;days to alarm 2
valm1:    equ     day1                 ;volume to alarm 1
valm2:    equ     day0                 ;volume to alarm 2

;         Parallel registers - mapped memory flow0:    equ     day7                 ;flow rate of unit 0
flow1:    equ     day7+2               ;flow rate of unit 1
flow2:    equ     day7+4               ;flow rate of unit 2 vlrm0:    equ     day7+6               ;volume remain of unit 0
vlrm1:    equ     day7+10              ;volume remain of unit 1
vlrm2:    equ     day7+14              ;volume remain of unit 2
```

```
mod0:     equ     day7+18         ;mode register of unit 0
mod0w:    equ     mod0 \ 100h
mod1:     equ     day7+19         ;mode register of unit 1
mod2:     equ     day7+20         ;mode register of unit 2 rank0:    equ     day7+21         ;rank of least time remain for unit 0 mapped
rank1:    equ     day7+22         ;rank of least time remain for unit 1
rank2:    equ     day7+23         ;rank of least time remain for unit 2 tarm0:    equ     day7+24         ;time remaining before volume 0 unit 0
tarm1:    equ     day7+26         ;time remaining before volume 0 unit 1
tarm2:    equ     day7+28         ;time remaining before volume 0 unit 2 slvmsg:   equ     day7+30         ;slave communicating to
slvmsgw:  equ     slvmsg \ 100h lstrg0:   equ     day7+31         ;# of regenerations past
lstrg0w:  equ     lstrg0 \ 100h
lstrg1:   equ     toss            ;# of regenerations past
lstrg1w:  equ     lstrg1 \ 100h
lstrg2:   ds      1
lstrg2w:  equ     lstrg2 \ 100h cntcy:    equ     day7            ;count down 60 Hz counter
cntcyw:   equ     cntcy \ 100h
cnts:     equ     day7+1          ;count down second counter
cntsw:    equ     cnts \ 100h
cntmn:    equ     day7+2          ;count down minute timer [packed BCD]
pcntmn:   equ     day7+4          ;preset count down minute timer [packed BCD]

sgcyc:    ds      1               ;signal 60 Hz timer
sgcycw:   equ     sgcyc \ 100h
sgsec:    ds      1               ;signal second timer
sgsecw:   equ     sgsec \ 100h
cntsg:    ds      2               ;signal minute timer [packed BCD]
pcntsg:   ds      2               ;preset signal minute timer [packed BCD]

rgcnt:    ds      2               ;regeneration calculated counter

; Mirrored in 93C46 EEPROM eeword:   ds      2               ;5a0fh - memory integrity check type:     ds      1               ;type of controller
typew:    equ     type \ 100h
; 0 - Demand                      3 - Delay after 0
; 1 - Water Batching              4 - Interval Time
; 2 - Volume 0                    5 - Calendar cfg:      ds      1               ;configuration of controller
cfgw:     equ     cfg \ 100h
; 0 - Single
; 1 - Master Alternating          4 - Master Parallel 2 slaves
; 2 - Slave Alternating           5 - Slave Parallel 1
; 3 - Master Parallel 1 slaves    6 - Slave Parallel 2 hz:       ds      1               ;frequency of line
```

```
hzw:     equ     hc \ 100h
;         7   6   5   4   3   2   1   0
;         !   !   !   !   !   !   !   !
;         !   !   !   !   !   !   !   !____
;         !   !   !   !   !   !   !_____
;         !   !   !   !   !   !_____
;         !   !   !   !   !_____
;         !   !   !   !_____
;         !   !   !_____
;         !   !_____
;         !_____          ;SC Hz = ?

bob:     ds      1
total:   ds      4                            ;total flow for history of unit [packed BCD]

END
```

What is claimed is:

1. A method for providing treated water on a continuous basis with a variable water demand employing a progressive flow water treatment system having a first treatment tank and a second treatment tank, and having a controller programmable by input from an operator, the method comprising the steps of:

receiving an input designating a progressive flow program type;
   receiving an input for a total volume for a regeneration parameter;
   receiving an input for a flow rate trip level value;
   directing water flow to provide treated water through the first treatment tank;
   monitoring the flow rate of water through the first treatment tank;
   comparing the flow rate to the received flow rate trip level value;
   additionally directing water flow through the second treatment tank if the flow rate exceeds the flow rate trip level value;
   monitoring the total volume through each treatment tank; and,
   initiating a regeneration of each treatment tank when total volume exceeds the input total volume regeneration parameter.

2. A method as described in claim 1 further comprising the step of directing water flow through the second treatment tank during regeneration of the first treatment tank.

3. A method as described in claim 1 wherein the water treatment system includes a third treatment tank, the method further comprising the steps of:

monitoring a flow rate of water through the second treatment tank;
   determining a combined flow rate through the first and second tanks; and
   additionally directing water flow through the third treatment tank if the combined flow rate exceeds twice the trip level value.

4. A method as described in claim 3 further comprising the step of directing water flow through the treatment tank having the lowest total flow during regeneration of other treatment tanks.

5. A method for providing treated water on a continuous basis with a variable water demand employing a progressive flow water treatment system having a first treatment tank and a second treatment tank, and having a controlled programmable by input from an operator, the method comprising the steps of:

receiving an input designating a progressive flow program type;
   receiving an input for a total volume for a regeneration parameter;
   receiving an input for a flow rate trip level value;
   directing water flow to provide treated water through the first treatment tank;
   monitoring the flow rate of water through the first treatment tank;
   comparing the flow rate to the received flow rate trip level value;
   additionally directing water flow through the second treatment tank if the flow rate exceeds the flow rate trip level value;
   monitoring the total volume through each treatment tank;
   initiating a regeneration of each treatment tank when total volume exceeds the input total volume regeneration parameter;
   receiving an input for a programmed time to initiate regeneration of a tank;
   calculating the average flow rate for each tank;
   calculating the time remaining until the input total volume is reached;
   comparing the calculated time to a benchmark time of the programmed time plus time for regeneration and brine makeup of the tank; and,
   initiating regeneration of a tank if the benchmark time exceeds the calculated time.

6. A method as described in claim 5 further comprising the steps of:

monitoring the tanks to determine if a regeneration is in process; and,
   inhibiting the regeneration of each tank if regeneration of another tank is in progress.

7. A method for providing treated water on a continuous basis with a variable water demand employing a progressive flow water treatment system having a first treatment tank and a second treatment tank, and having a controller programmable by input from an operator, the method comprising the steps of:

receiving an input designating a progressive flow program type;

receiving an input for a total volume for a regeneration parameter;

receiving an input for a flow rate trip level value;

directing water flow to provide treated water through the first treatment tank;

monitoring the flow rate of water through the first treatment tank;

comparing the flow rate to the received flow rate trip level value;

additionally directing water flow through the second treatment tank if the flow rate exceeds the flow rate trip level value;

monitoring the total volume through each treatment tank;

initiating a regeneration of each treatment tank when total volume exceeds the input total volume regeneration parameter;

designating one of the first and second tanks as the initial primary tank to operate below the trip level;

designating the other of the tanks as the initial standby tank to be activated by the trip level; and, altering the designation of primary and secondary upon the regeneration of either tank to designate the regenerated tank as the standby tank.

8. A method for providing treated water on a continuous basis with a variable water demand employing a progressive flow water treatment system having a first treatment tank and a second treatment tank, and having a controller programmable by input from an operator, the method comprising the steps of:

receiving an input designating a progressive flow program type;

receiving an input for a total volume for a regeneration parameter;

receiving an input for a flow rate trip level value;

directing water flow to provide treated water through the first treatment tank;

monitoring the flow rate of water through the first treatment tank;

comparing the flow rate to the received flow rate trip level value;

additionally directing water flow through the second treatment tank if the flow rate exceeds the flow rate trip level value;

monitoring the total volume through each treatment tank;

initiating a regeneration of each treatment tank when total volume exceeds the input total volume regeneration parameter;

monitoring the flow rate of water through the second treatment tank;

determining the flow rate through the first and second tanks;

additionally directing water flow through the third treatment tank if the flow rate exceeds twice the trip level value;

designating a first one of the first, second and third tanks as the initial primary tank to operate below the trip level;

designating a second one of the first, second and third tanks as an initial standby tank number 1;

designating a third one of the first, second and third tanks as an initial standby tank number 2; and, altering the designation of the standby tank number 2, upon completion of the regeneration of any of the first, second or third one of the tanks, to the newly regenerated tank.

* * * * *

UNITED STATES PATENT AND TRADEMARK OFFICE
CERTIFICATE OF CORRECTION

PATENT NO. : 5,351,199
DATED : Sept. 27, 1994
INVENTOR(S) : Robert W. Colburn and James E. Ticcioni It is certified that error appears in the above-indentified patent and that said Letters Patent is hereby corrected as shown below:

Column 216,

In Claim 5, line 31, please change "controlled"

to —controller —.

Signed and Sealed this

Sixteenth Day of May, 1995

Attest:

BRUCE LEHMAN

Attesting Officer

Commissioner of Patents and Trademarks